(12) United States Patent
Mabry et al.

(10) Patent No.: US 7,582,688 B2
(45) Date of Patent: *Sep. 1, 2009

(54) ELASTOMER COMPOSITES, METHOD AND APPARATUS

(75) Inventors: Melinda Ann Mabry, Newton, MA (US); Frederick Harry Rumpf, Billerica, MA (US); Ivan Zlatko Podobnik, Nashua, NH (US); Scott Adrian Westveer, Westford, MA (US); Allan Clark Morgan, Manchester, MA (US); Bin Chung, Nashua, NH (US); Malcolm John Andrews, Bryan, TX (US)

(73) Assignee: Cabot Corporation, Boston, MA (US)

( * ) Notice: Subject to any disclaimer, the term of this patent is extended or adjusted under 35 U.S.C. 154(b) by 658 days.

This patent is subject to a terminal disclaimer.

(21) Appl. No.: 11/321,298

(22) Filed: Dec. 23, 2005

(65) Prior Publication Data

US 2006/0111475 A1    May 25, 2006

Related U.S. Application Data

(63) Continuation of application No. 10/189,332, filed on Jul. 2, 2002, now abandoned, which is a continuation of application No. 09/407,773, filed on Sep. 28, 1999, now Pat. No. 6,413,478, which is a continuation of application No. 08/823,411, filed on Mar. 25, 1997, now Pat. No. 6,048,923, which is a continuation-in-part of application No. 08/625,163, filed on Apr. 1, 1996, now abandoned.

(51) Int. Cl.
B01F 1/00 (2006.01)
(52) U.S. Cl. .................. 523/318; 524/492; 524/495
(58) Field of Classification Search ................. 523/318; 524/492, 495
See application file for complete search history.

(56) References Cited

U.S. PATENT DOCUMENTS

| | | | |
|---|---|---|---|
| 1,611,278 A | 12/1926 | Petersen |
| 1,846,820 A | 2/1932 | Darling |
| 2,769,795 A | 11/1956 | Braendle |
| 3,048,559 A | 8/1962 | Heller |
| 3,108,982 A | 10/1963 | Barclay |
| 3,335,200 A | 8/1967 | Thorn |
| 3,403,121 A | 9/1968 | Hare |
| 3,494,740 A | 2/1970 | Speck |
| 3,767,605 A | 10/1973 | Gerlicher |
| 3,887,532 A | 6/1975 | Neubert |
| 4,025,711 A | 5/1977 | Davidson |
| 4,029,633 A | 6/1977 | Hagopian |
| 4,064,093 A | 12/1977 | Dalton |
| 4,103,074 A | 7/1978 | Hertel |
| 4,124,550 A | 11/1978 | Kobayashi |
| 4,213,957 A | 7/1980 | Hunt |
| 4,265,939 A | 5/1981 | Tebbens |
| 4,299,952 A | 11/1981 | Pingel |
| 4,302,377 A | 11/1981 | Gurak |
| 4,303,569 A | 12/1981 | Guurak |
| 4,375,497 A | 3/1983 | Sandstrom |
| 4,446,309 A | 5/1984 | Jiroumaru |
| 4,456,381 A | 6/1984 | Inoue |
| 4,542,992 A | 9/1985 | Markhart |
| 4,552,725 A | 11/1985 | Audeh |
| 4,643,890 A | 2/1987 | Schramm |
| 4,718,771 A | 1/1988 | Asai |
| 4,744,744 A | 5/1988 | Sugimori |
| 4,914,186 A | 4/1990 | Miss et al. |
| 4,917,211 A | 4/1990 | Yamada |
| 4,917,501 A | 4/1990 | Simonet |
| 5,009,849 A | 4/1991 | Ebner |
| 5,047,287 A | 9/1991 | Horiuchi |
| 5,119,927 A | 6/1992 | Bruggemann |
| 5,205,972 A | 4/1993 | Kafka |
| 5,227,425 A | 7/1993 | Rauline |
| 5,264,290 A | 11/1993 | Touchet |
| 5,328,949 A | 7/1994 | Sandstrom |
| 5,430,088 A | 7/1995 | Ohashi |
| 5,472,928 A | 12/1995 | Scheuerman |
| 5,516,833 A | 5/1996 | Ohashi |
| 5,558,316 A | 9/1996 | Lee |
| 5,599,868 A | 2/1997 | Bohm |
| 5,639,817 A | 6/1997 | Probst |
| 5,658,657 A | 8/1997 | Tomizawa |
| 5,733,440 A | 3/1998 | Stangland |

(Continued)

FOREIGN PATENT DOCUMENTS

CH    581 493    11/1976

(Continued)

OTHER PUBLICATIONS

PCT/US97/05276 International Search Report Patent Family Annex.

(Continued)

Primary Examiner—Edward J Cain

(57) ABSTRACT

Elastomer composites are produced by novel continuous flow methods and apparatus in which fluid streams of particulate filler and elastomer latex are fed to the mixing zone of a coagulum reactor to form a mixture in semi-confined flow continuously from the mixing zone through a coagulum zone to a discharge end of the reactor. The particulate filler fluid is fed under high pressure to the mixing zone, such as to form a jet stream to entrain elastomer latex fluid sufficiently energetically to substantially completely coagulate the elastomer with the particulate filler prior to the discharge end. Highly efficient and effective elastomer coagulation is achieved without the need for a coagulation step involving exposure to acid or salt solution or the like. Novel elastomer composites are produced. Such novel elastomer composites may be cured or uncured, and combine material properties, such as choice of filler, elastomer, level of filler loading, and macro-dispersion, not previously achieved.

68 Claims, 30 Drawing Sheets

U.S. PATENT DOCUMENTS

| | | | |
|---|---|---|---|
| 6,040,364 A * | 3/2000 | Mabry et al. | 523/318 |
| 6,048,923 A * | 4/2000 | Mabry et al. | 524/496 |
| 6,075,084 A * | 6/2000 | Mabry et al. | 524/495 |
| 6,365,663 B2 * | 4/2002 | Mabry et al. | 524/495 |
| 6,372,822 B1 | 4/2002 | Chung et al. | |
| 6,413,478 B1 | 7/2002 | Mabry et al. | |
| 7,105,595 B2 * | 9/2006 | Mabry et al. | 524/495 |
| 2002/0086917 A1 | 7/2002 | Chung et al. | |
| 2003/0091775 A1 | 5/2003 | Wang et al. | |
| 2003/0125446 A1 | 7/2003 | Wang et al. | |
| 2003/0195276 A1 | 10/2003 | Mabry et al. | |

FOREIGN PATENT DOCUMENTS

| | | |
|---|---|---|
| DE | 1 063 364 | 8/1959 |
| DE | 1 620 918 | 3/1972 |
| DE | 3 916 981 | 7/1989 |
| DE | 44 04 701 | 7/1996 |
| EP | 0 051 450 | 5/1982 |
| EP | 0 278 743 | 8/1988 |
| EP | 0 287 138 | 10/1988 |
| EP | 287 392 | 10/1988 |
| EP | 0 423 759 | 4/1991 |
| EP | 0 570 715 | 11/1993 |
| EP | 0 620 250 | 3/1994 |
| EP | 0 763 558 | 3/1997 |
| GB | 705 334 | 3/1954 |
| GB | 1 421 011 | 10/1972 |
| GB | 2 098 972 | 12/1981 |
| GB | 2 196 547 | 5/1988 |
| JP | 57 053340 | 3/1982 |
| WO | WO 96/37547 | 11/1996 |
| WO | WO 97/36724 | 10/1997 |

OTHER PUBLICATIONS

PCT/US97/05276, Jan. 13, 1998 Written Opinion.
PCT/US98/20279, Nov. 2, 1999 International Search Report.
PCT/US98/20279, Jan. 20, 2000 Preliminary Examination Report.
Wahab, Shukri Bin Abdul et al., Natural Rubber Carbon Black Masterbatches from Field Latex, pp. 29-41 Proceedings of NR Technology Seminar, Rubber Research Institute of Malaysia, Kuala Lumpur, Malaysia, Dec. 1978.
Database WPI, Week 9345, Derwent Publications Ltd., London, GB, AN 93-357278, XP002036310 & JP 05 262 918A (Yokohama Rubber Co., Ltd.), Oct. 12, 1993.
"Functionalization of Elastomer by Reactive Mixing" by the Malaysian Rubber Producers' Research Associate, the Common Fund for Commodities, p. 308-312, Research Disclosure, Jun. 1994.
PCT/US00/09925 International Search Report.
Marcin, J. Zitek, P. Pneumatiky, SNTL, Praha, pp. 250-252 (1985)—English translation.
Marcin, J. Zitek, P. Pneumatiky, SNTL, Praha, pp. 250-252 (1985)—Czechoslovakian version (previously submitted on Jan. 11, 2005).

* cited by examiner

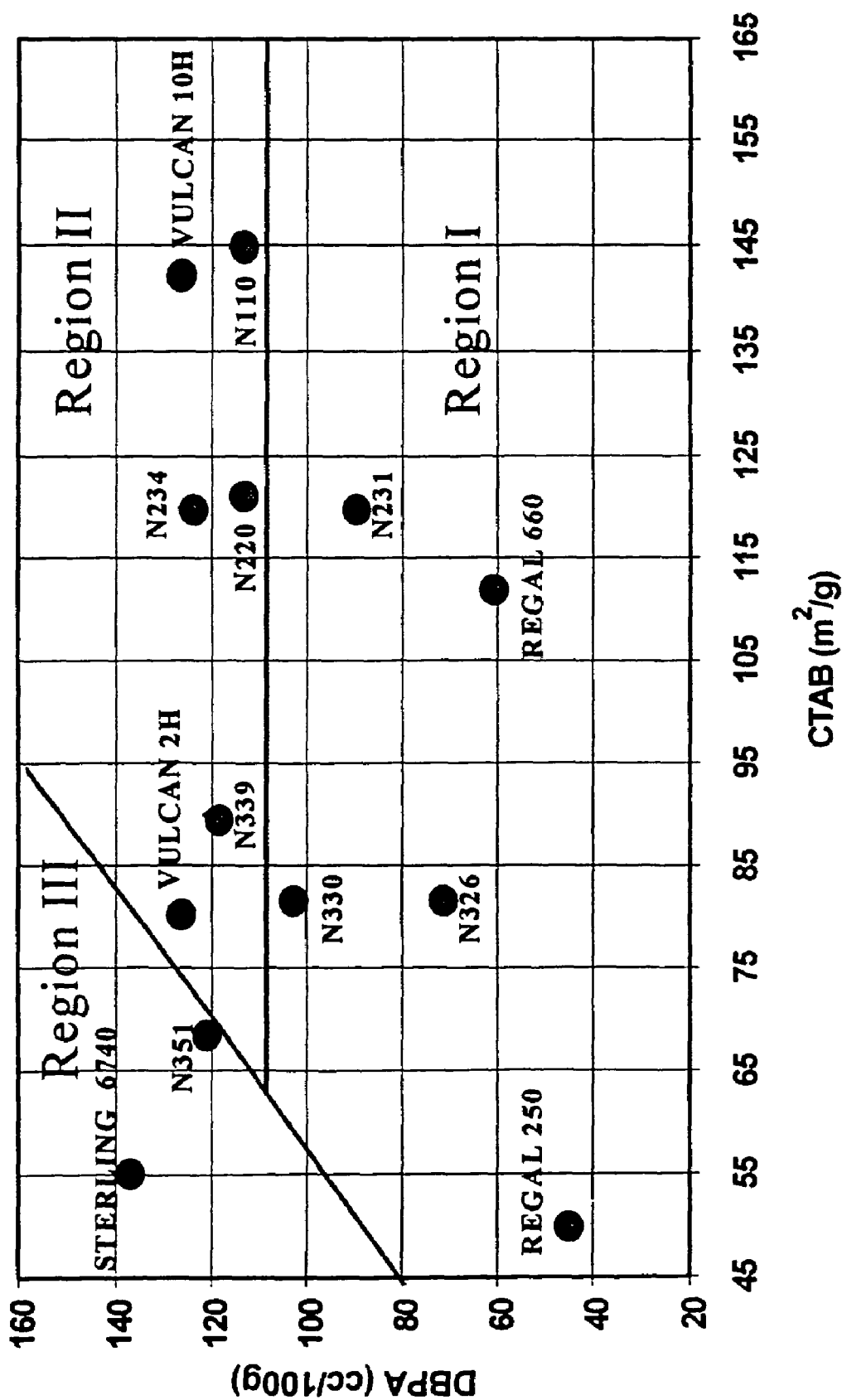
Figure 8 Carbon Black Morphology Map

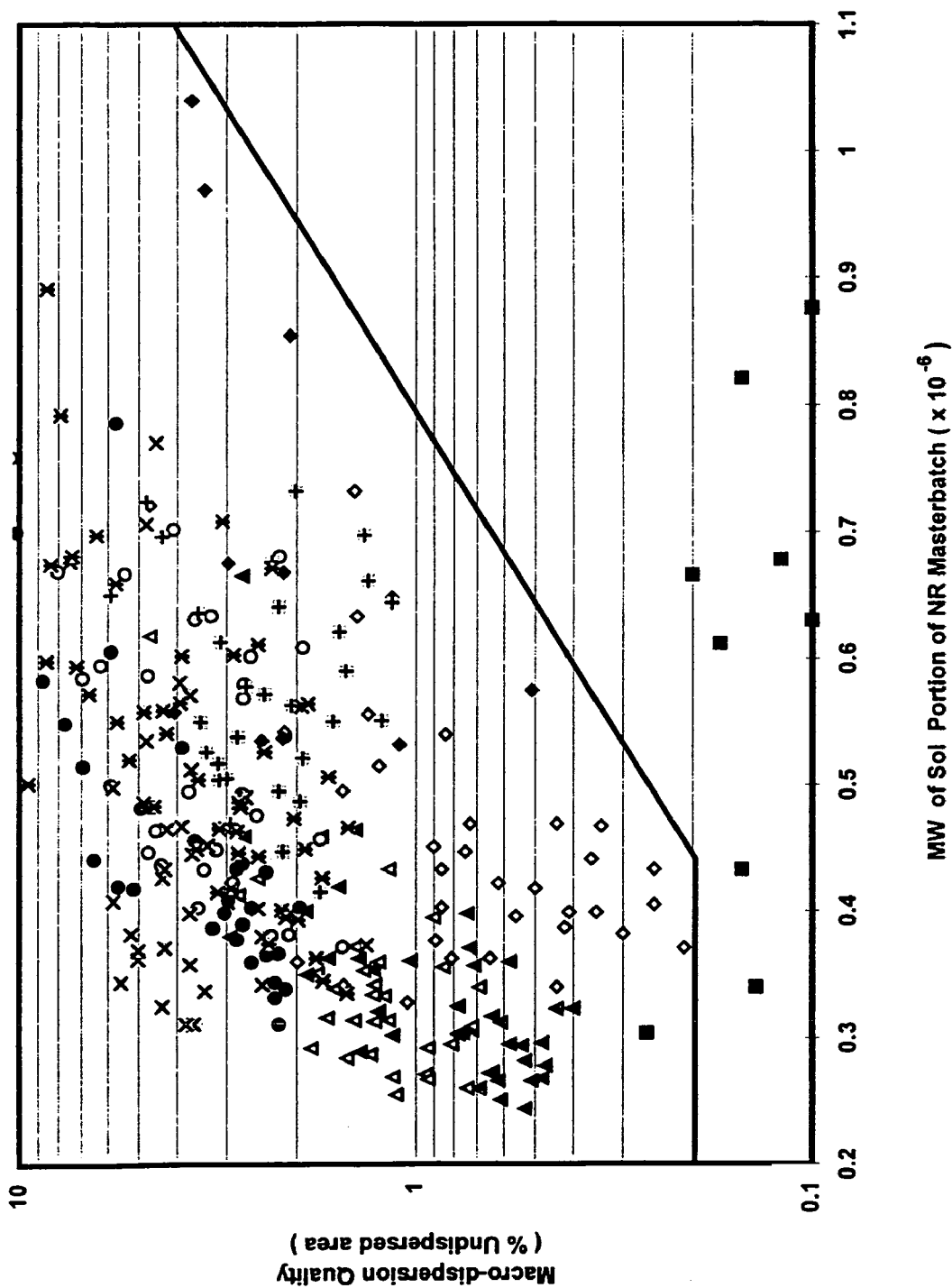
Figure 9  Dispersion Quality and MW$_{sol}$ of NR Masterbatches

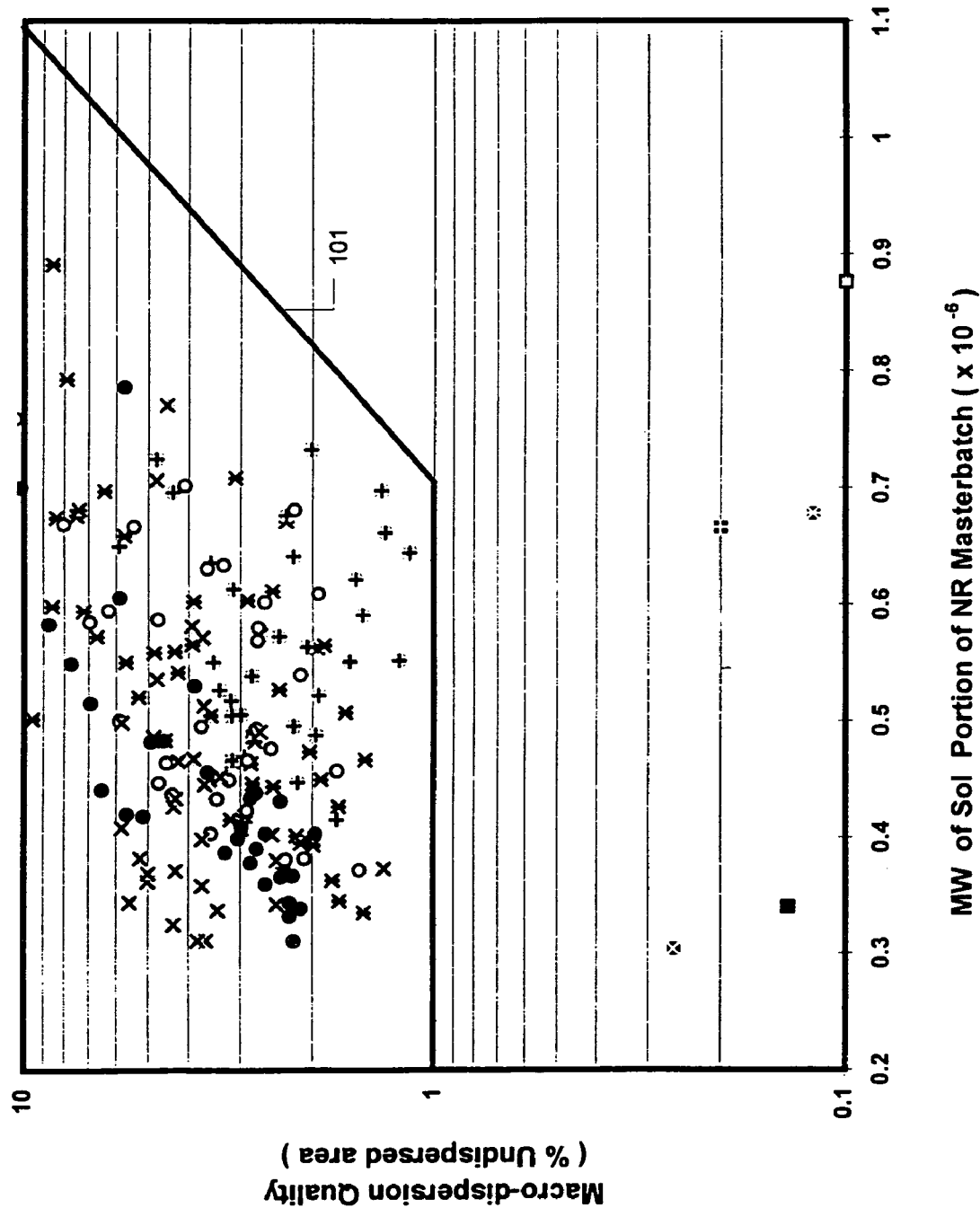
Figure 10 Dispersion Quality and MW$_{sol}$ of NR Masterbatches (Region I)

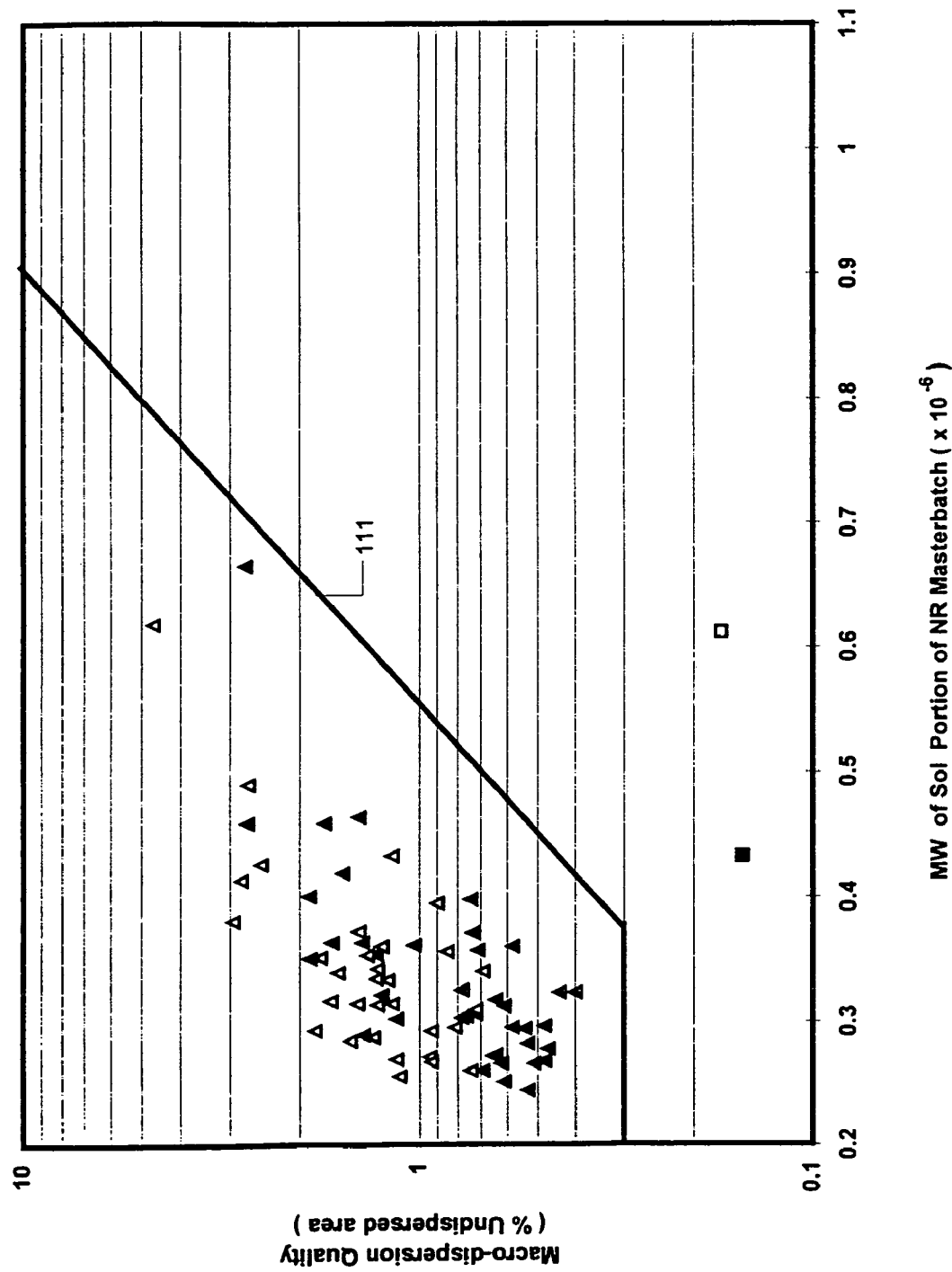
Figure 11  Dispersion Quality and $MW_{sol}$ of NR Masterbatches
(Region II)

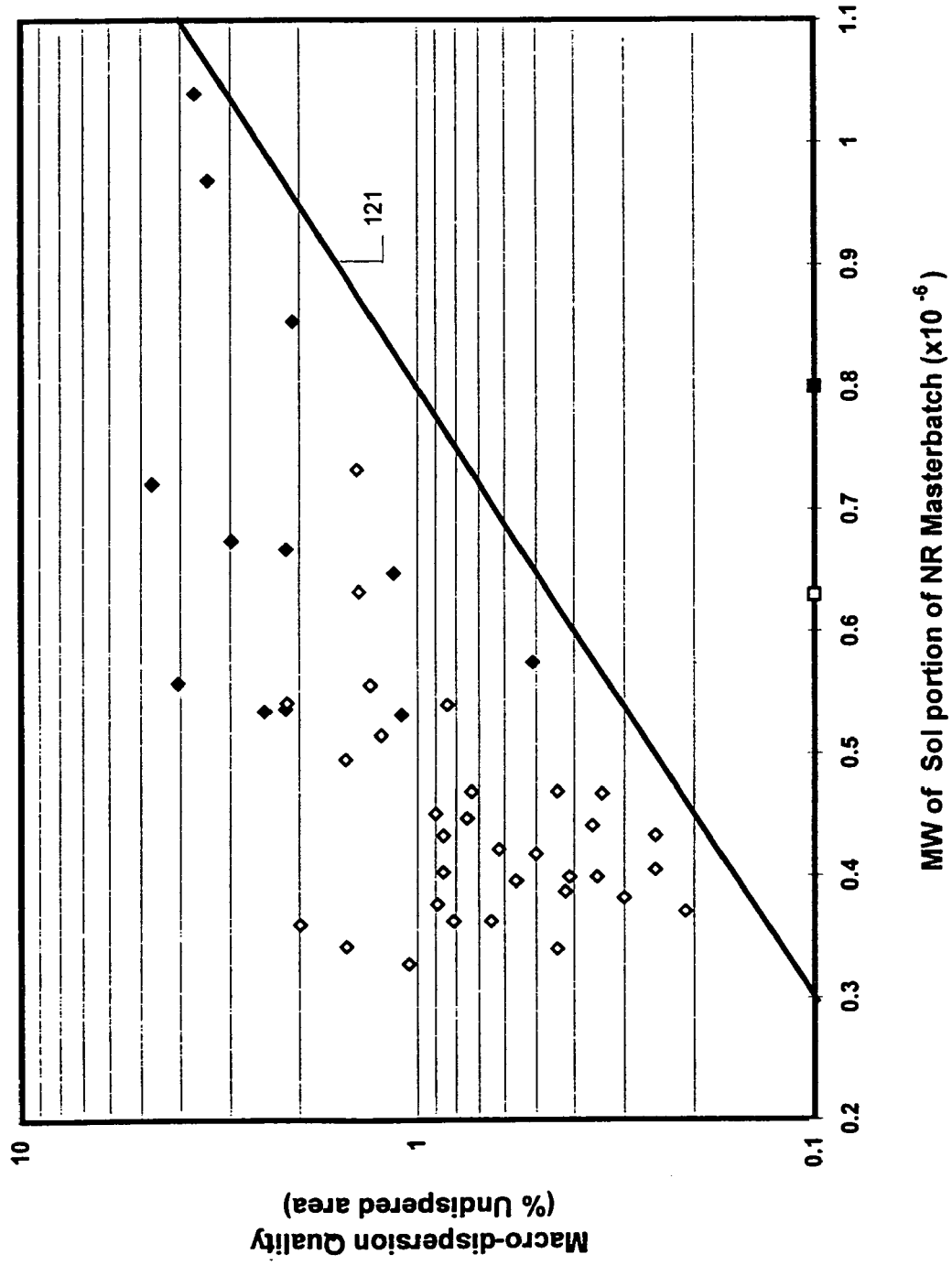
Figure 12  Dispersion Quality and MW$_{sol}$ of NR Masterbatch
(*Region III*)

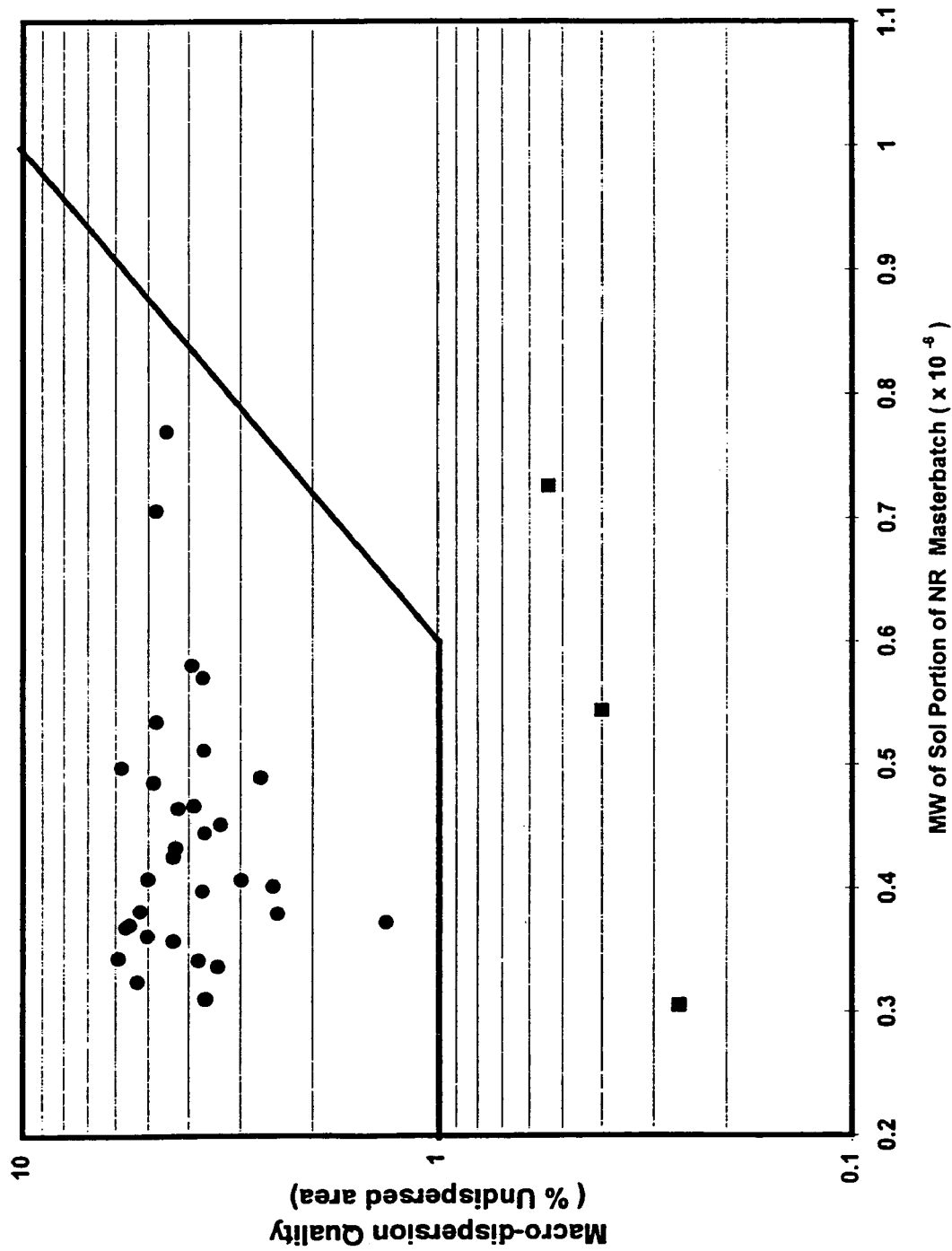
Figure 13 Dispersion Quality and MW$_{Sol}$ of NR Masterbatches (N330 Carbon Black, 55 phr)

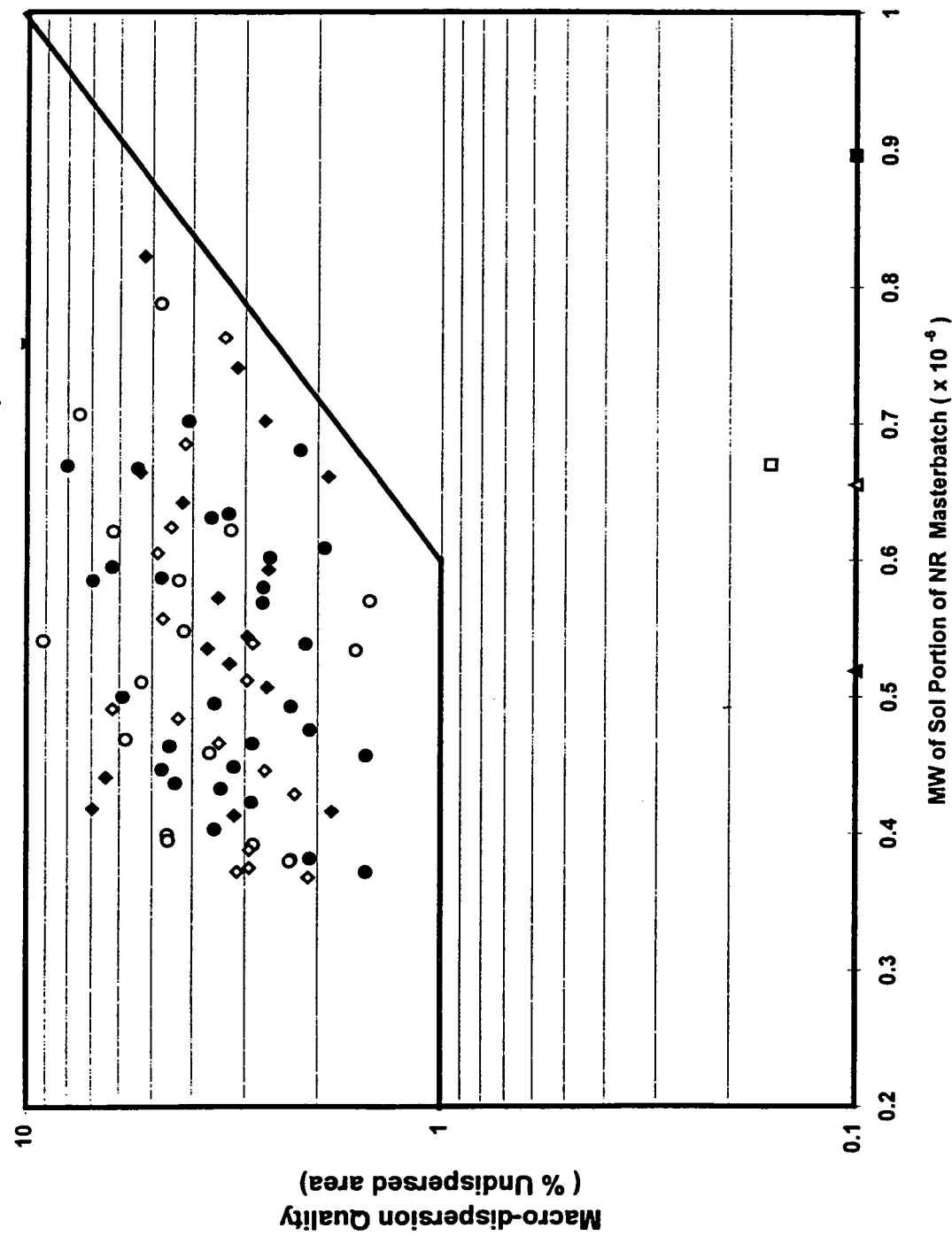
Figure 14  Dispersion Quality and MW Sol of NR Masterbatches (REGAL 250 Carbon Black)

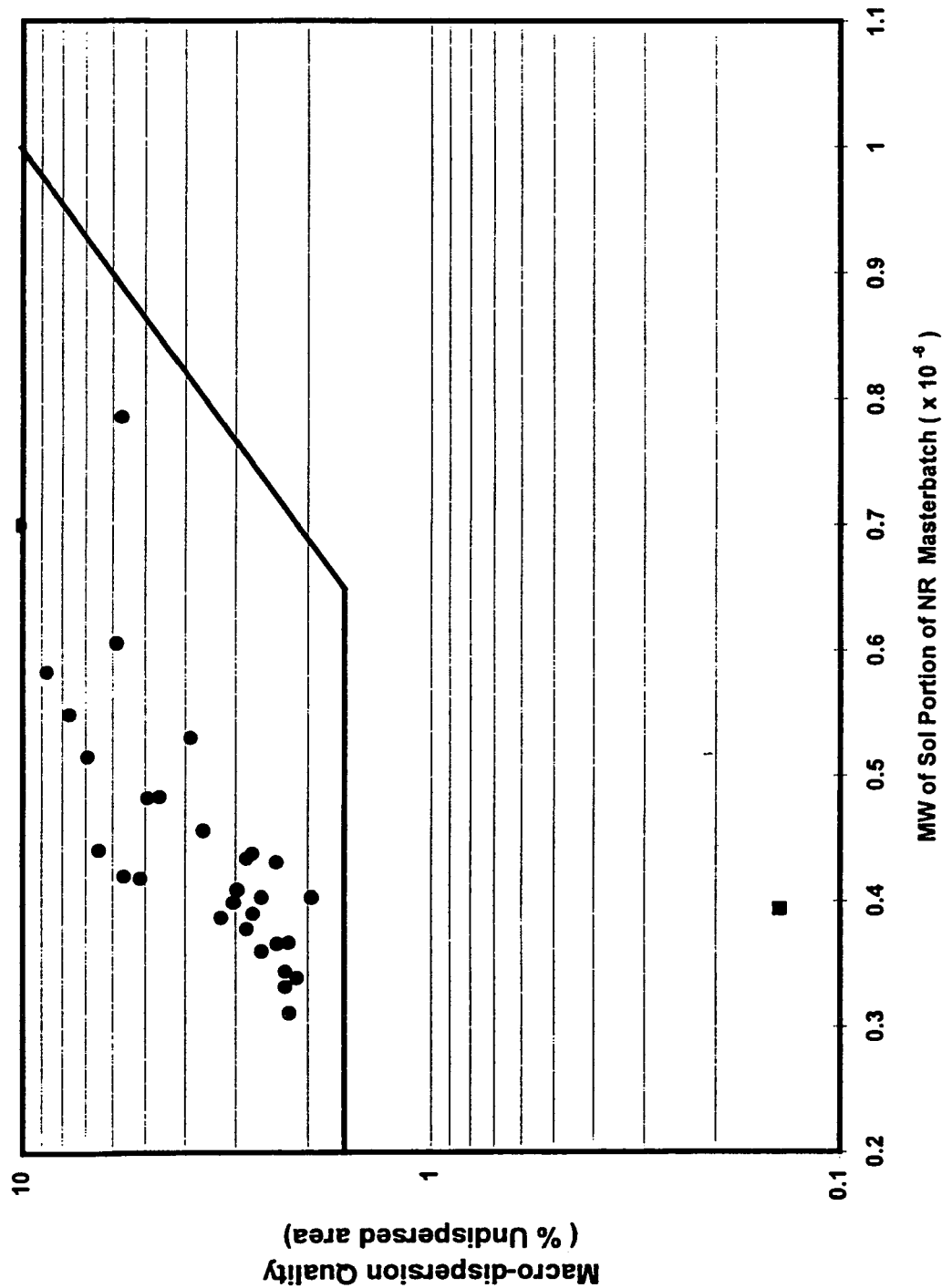
Figure 15 Dispersion Quality and MW$_{Sol}$ of NR Masterbatches (BLACK PEARL 800 Carbon Black, 55 phr)

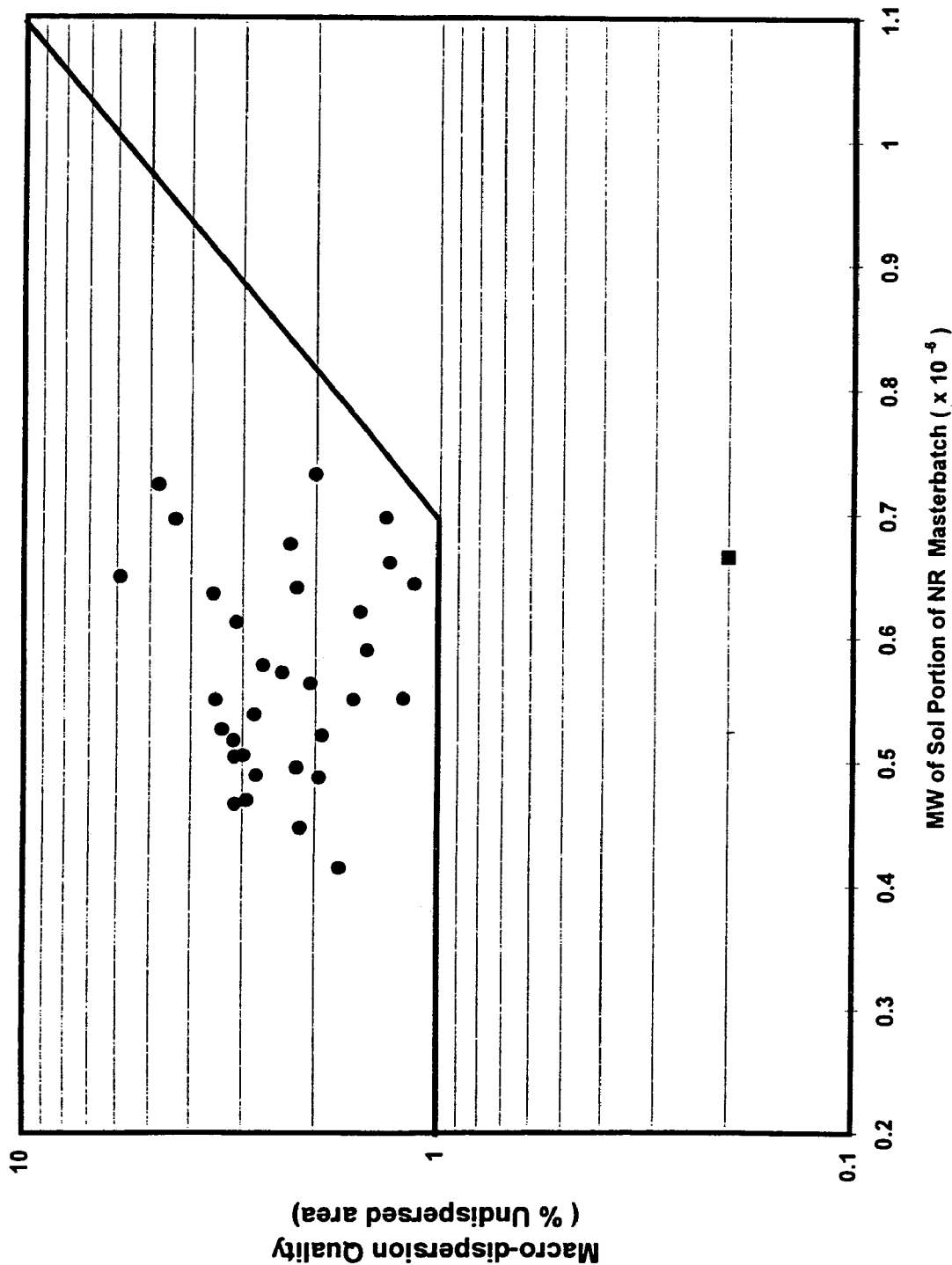
Figure 16  Dispersion Quality and MW Sol of NR Masterbatches (N326 Carbon Black, 55 phr)

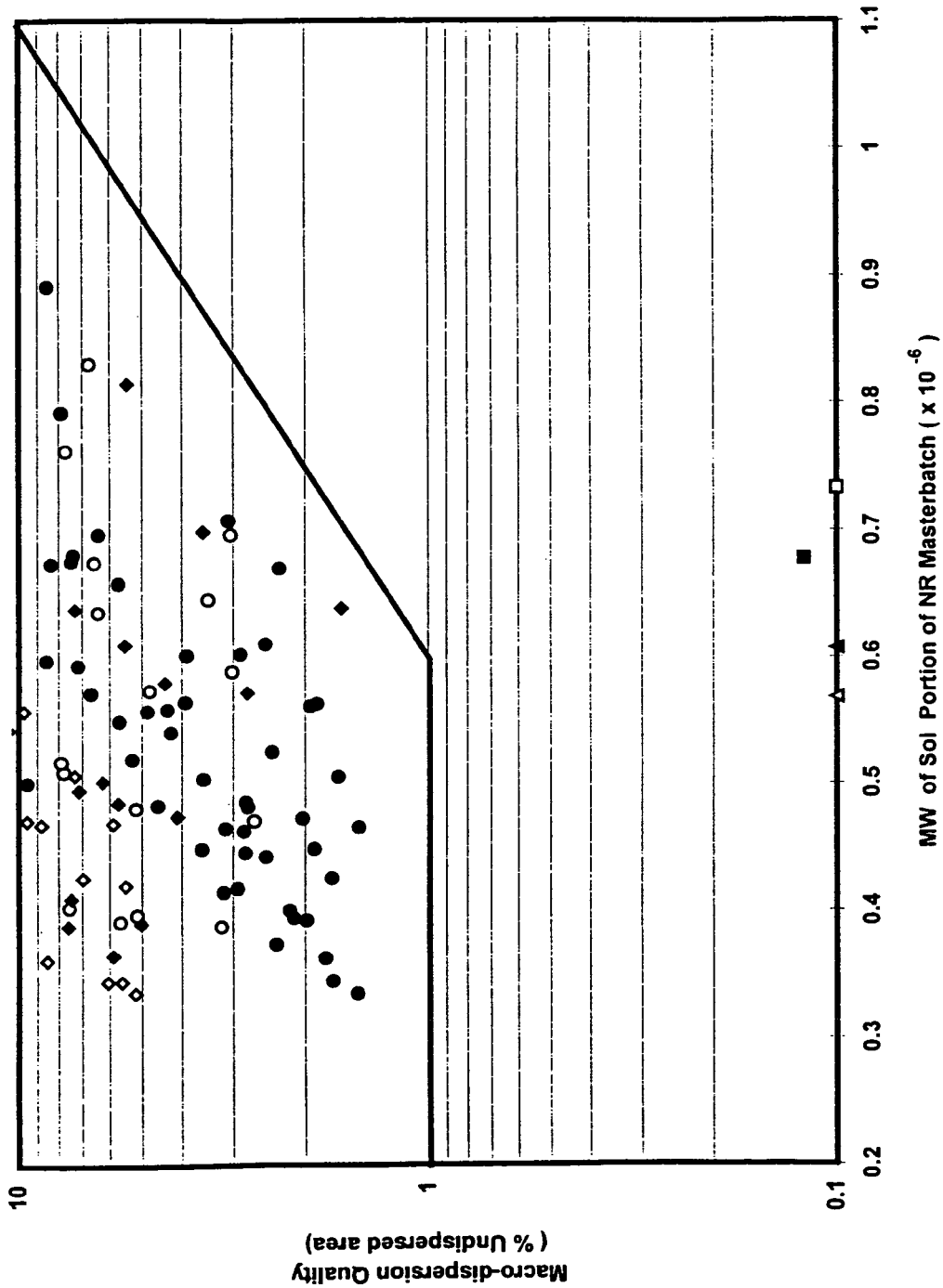
Figure 17 Dispersion Quality and MWSol of NR Masterbatches (REGAL 660 Carbon Black)

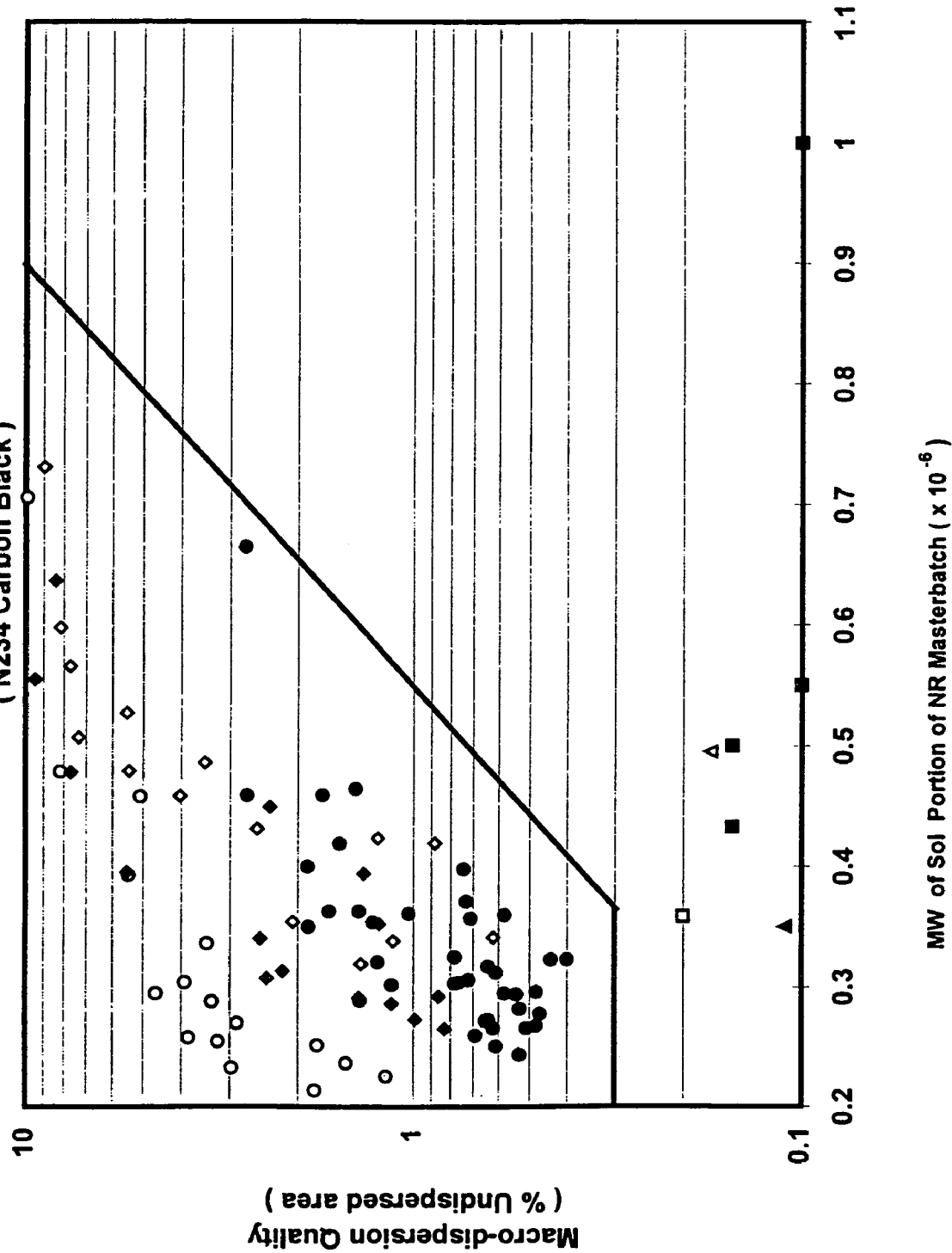
Figure 18 Dispersion Quality and MW sol of NR Masterbatches (N234 Carbon Black)

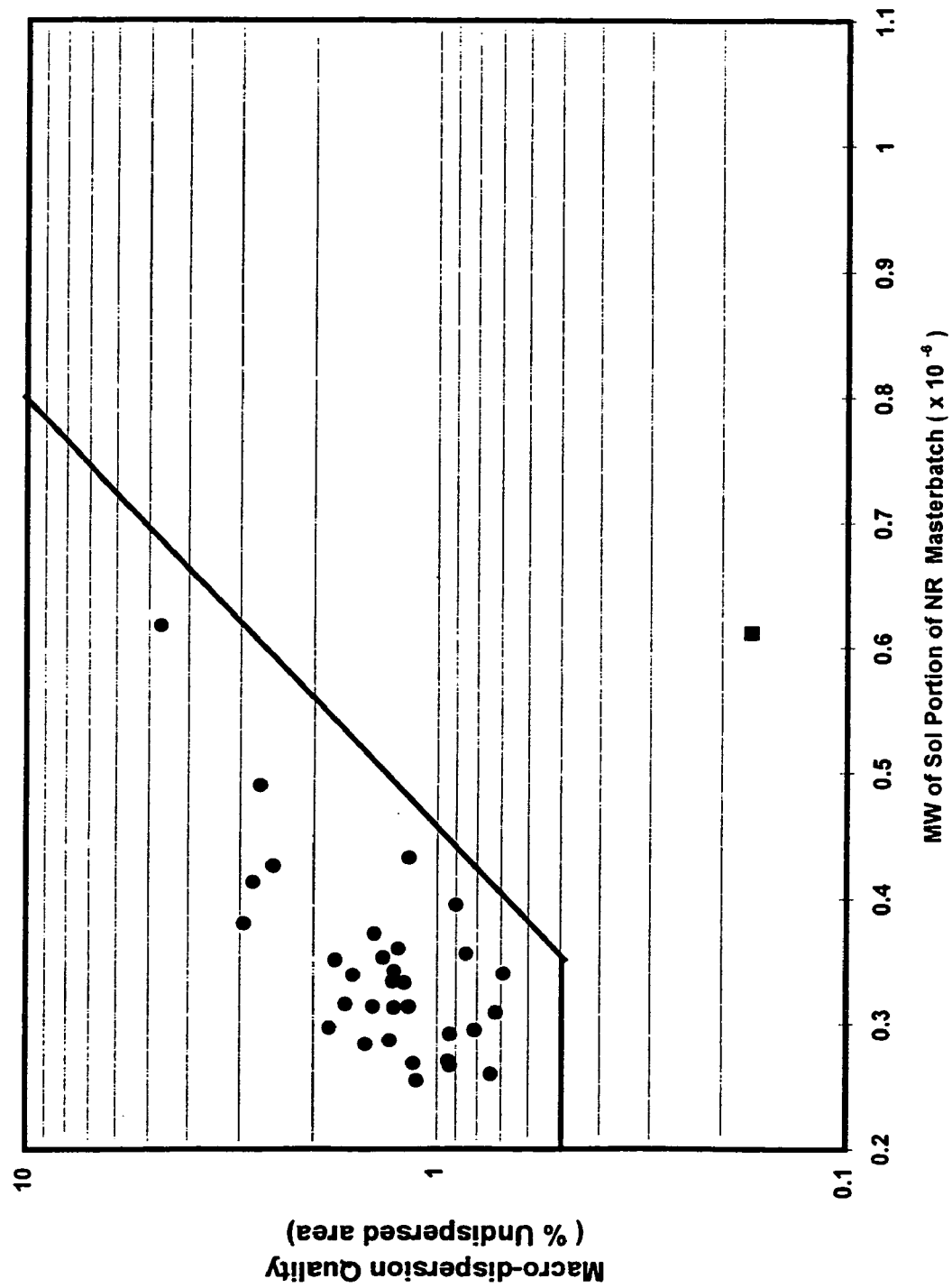
Figure 19 Dispersion Quality and MW Sol of NR Masterbatches (N110 Carbon Black, 55 phr)

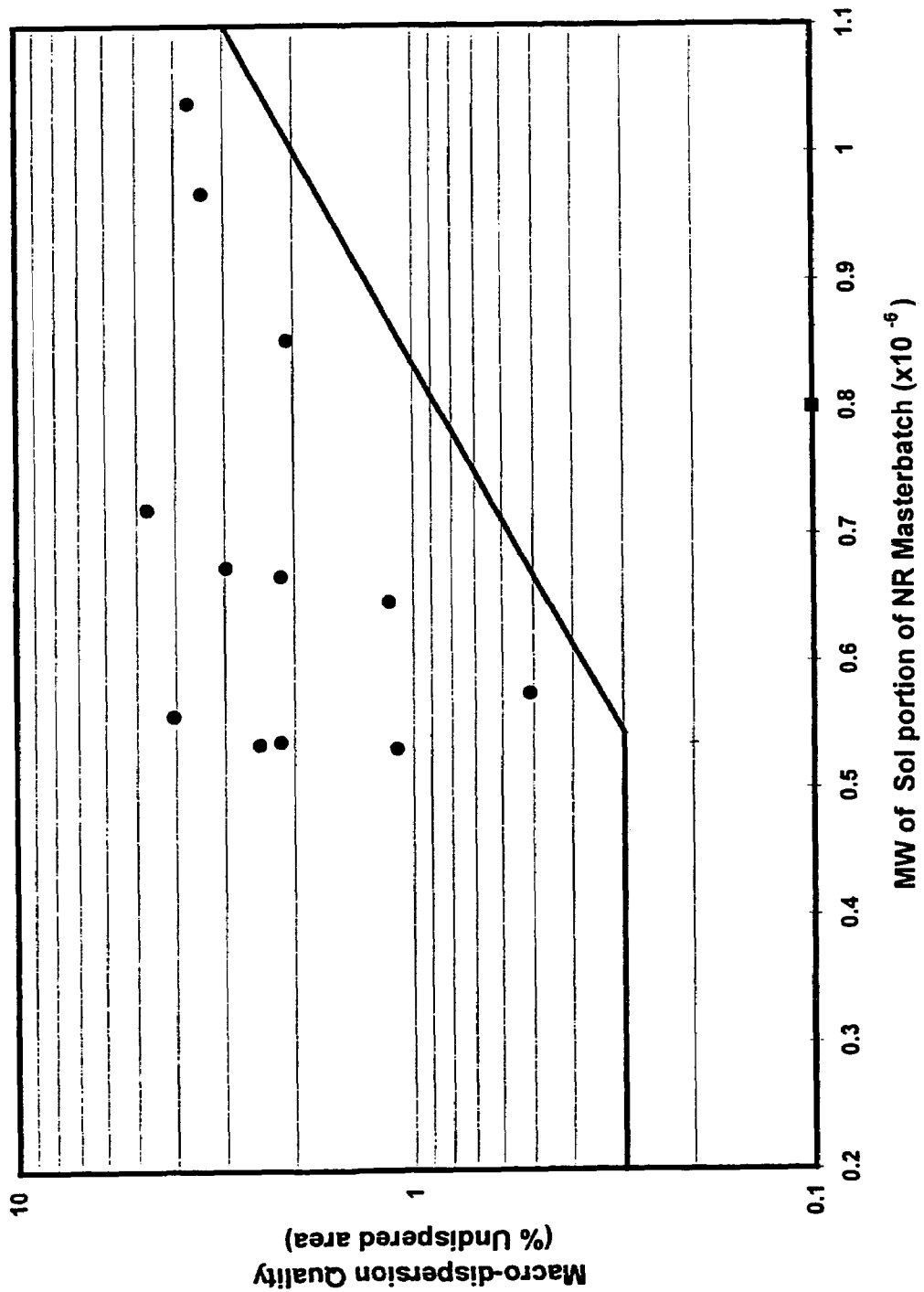
Figure 20 Dispersion Quality and MW$_{sol}$ of NR Masterbatch (N351 Carbon Black, 33 phr)

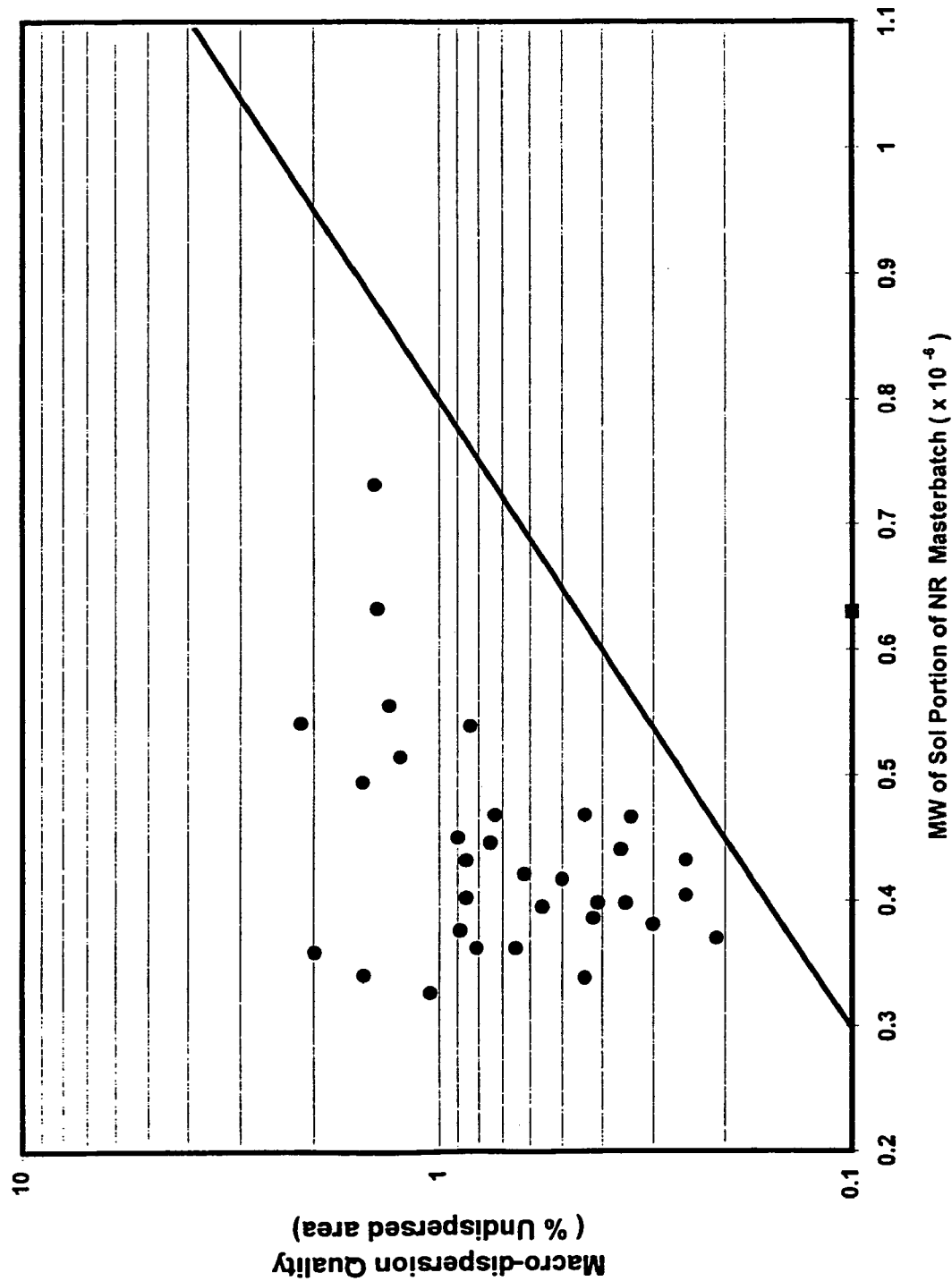
Figure 21 Dispersion Quality and MW Sol of NR Masterbatches (STERLING 6740 Carbon Black, 55 phr)

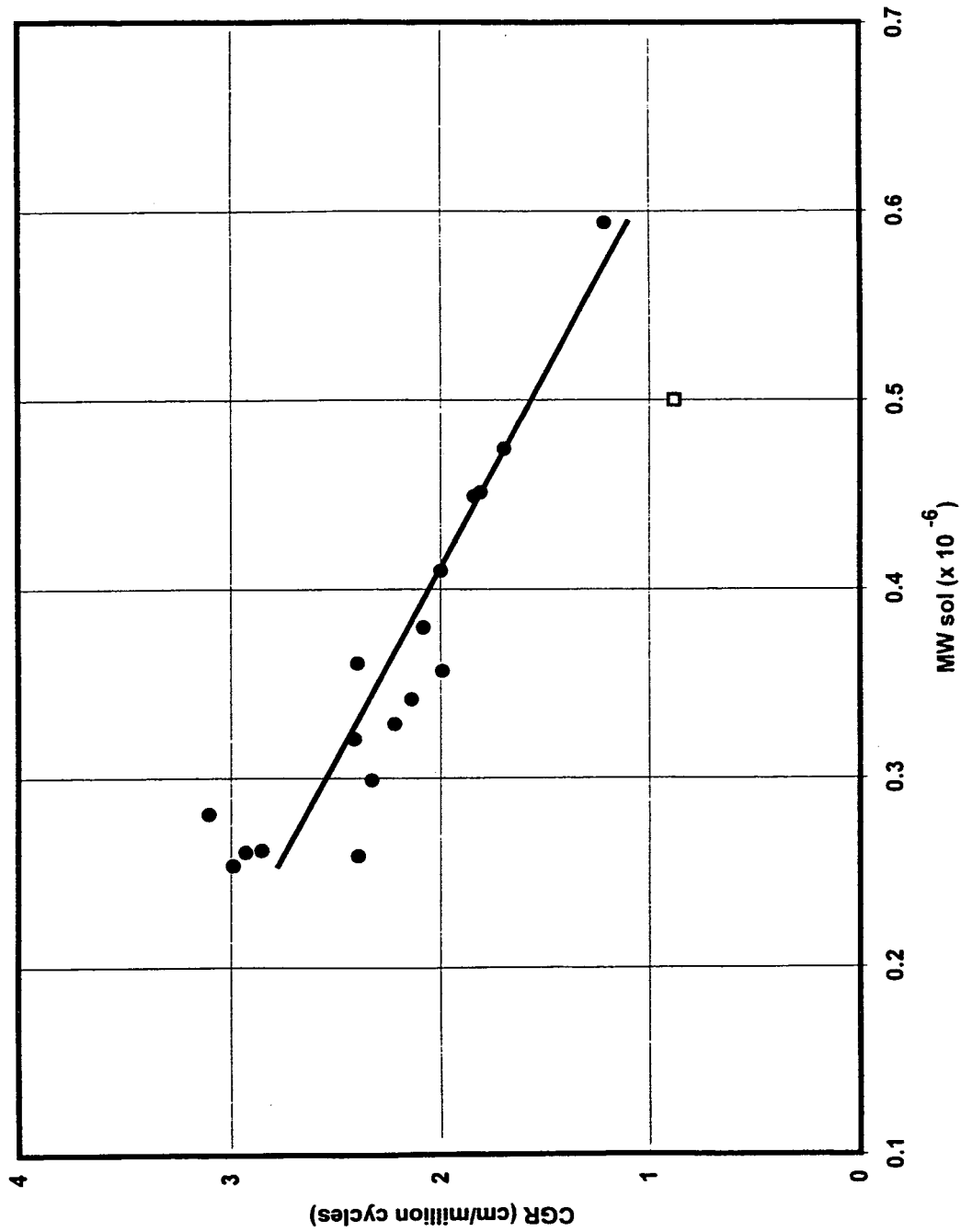

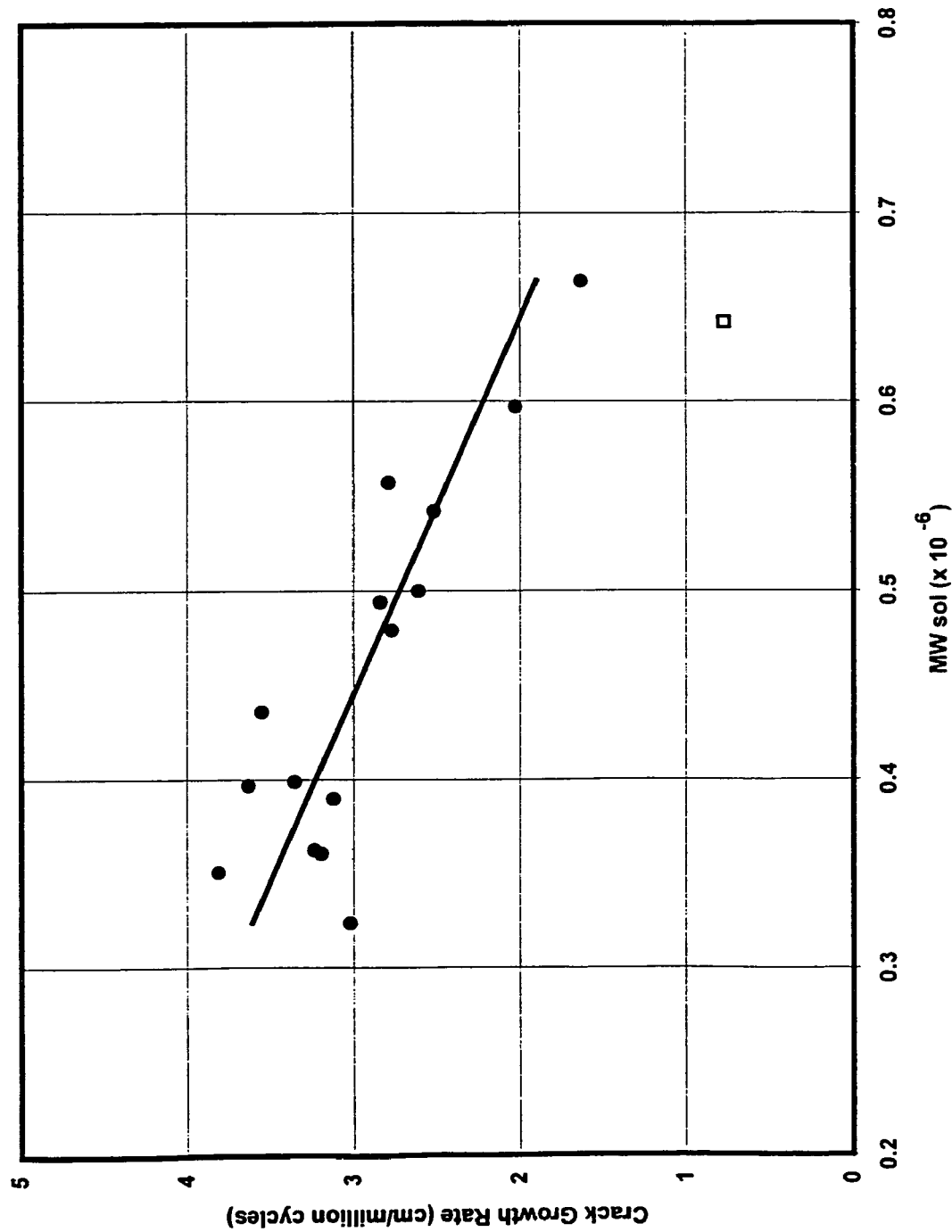
Figure 23  MW sol Effect on Crack Growth Rate
(NR Compounds Containing N326 Carbon Black @ 55 phr Loading)

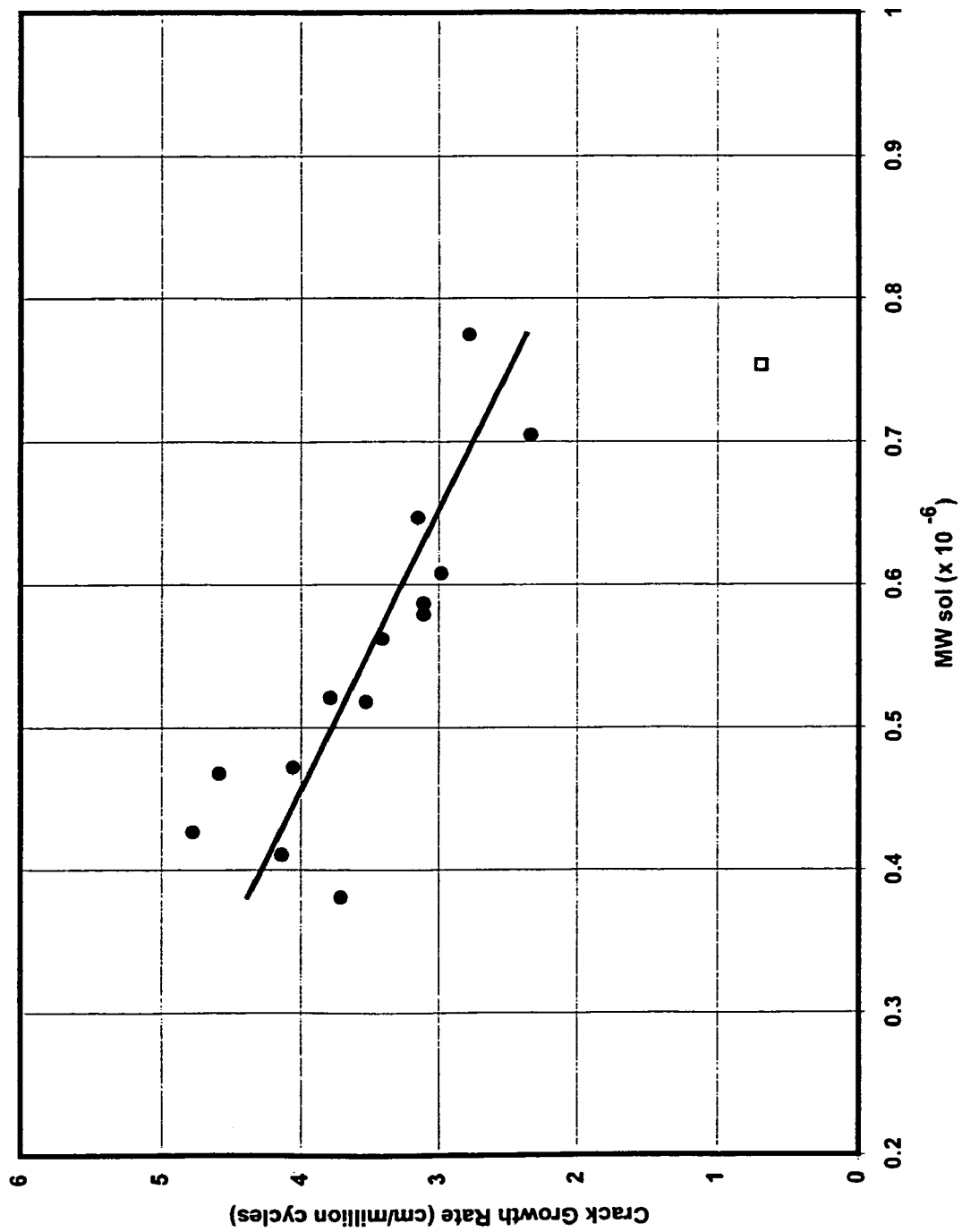
Figure 24 MW sol Effect on Crack Growth Rate
(NR Compounds Containing REGAL 660 Carbon Black @ 55 phr Loading)

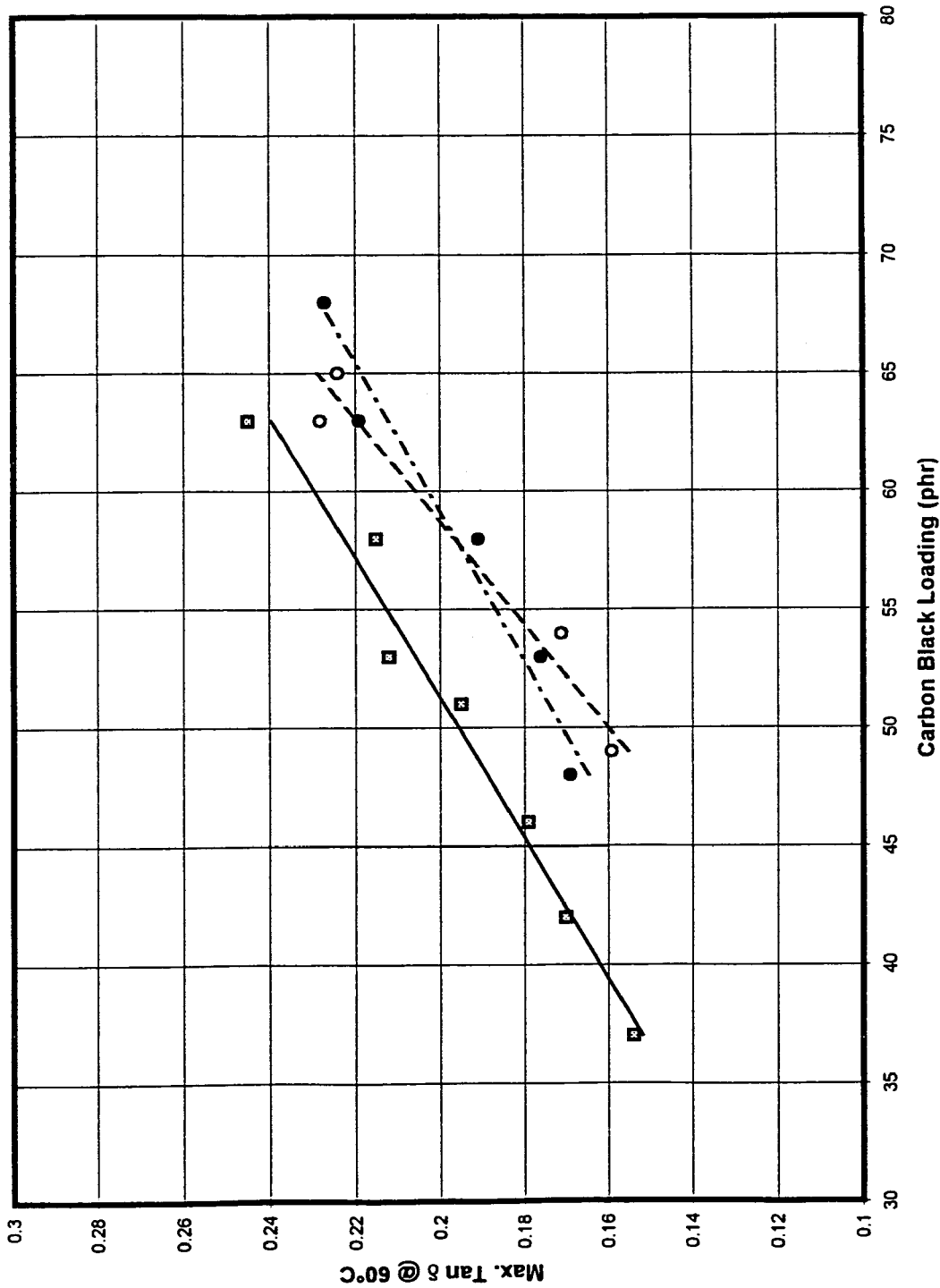
Figure 25  Max. Tan δ (Strain Sweep @ 60°C) of NR Compounds Containing N234 Black at Different Loadings

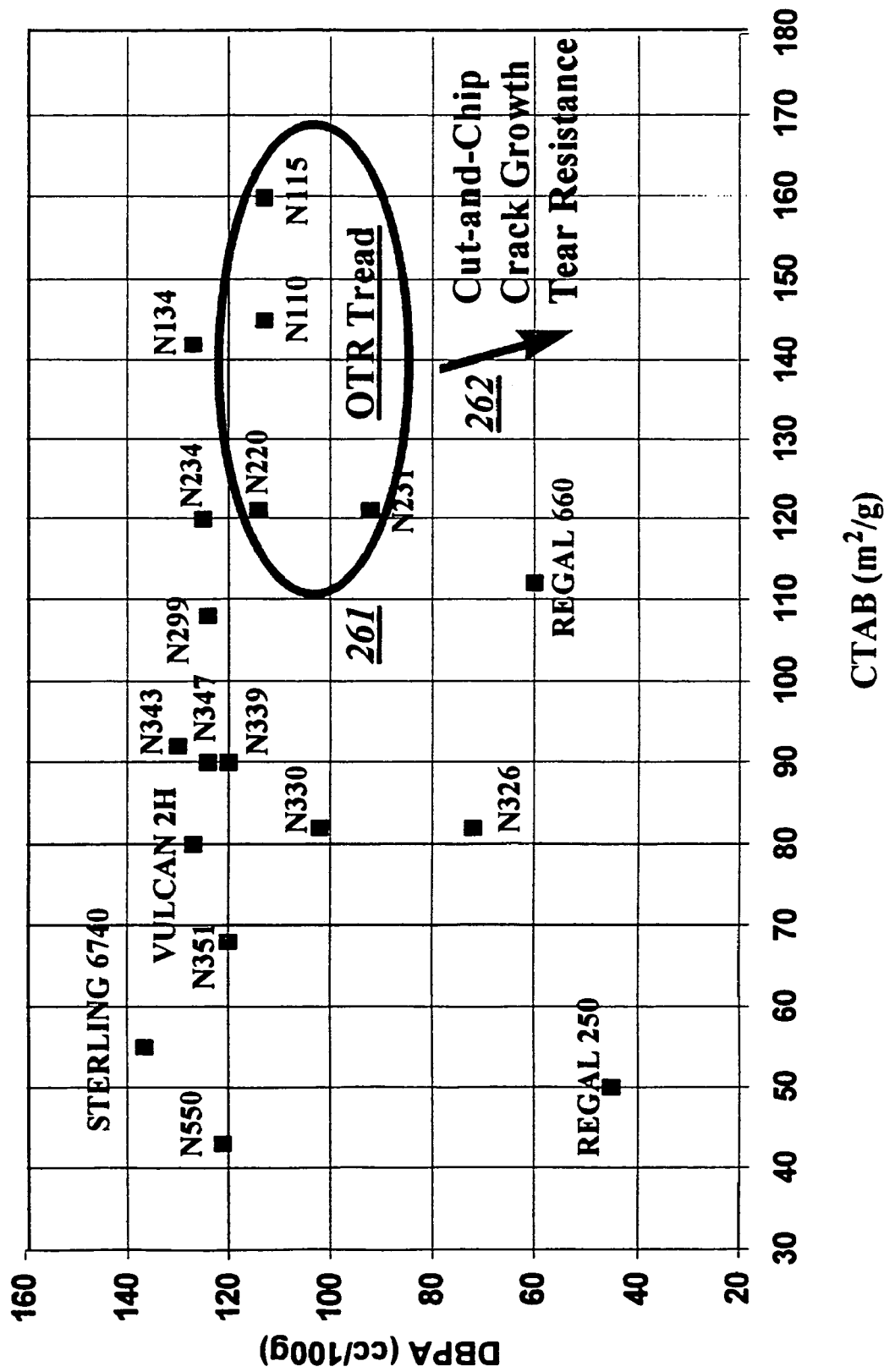
Figure 26. Carbon Blacks in NR Compounds for OTR Tread

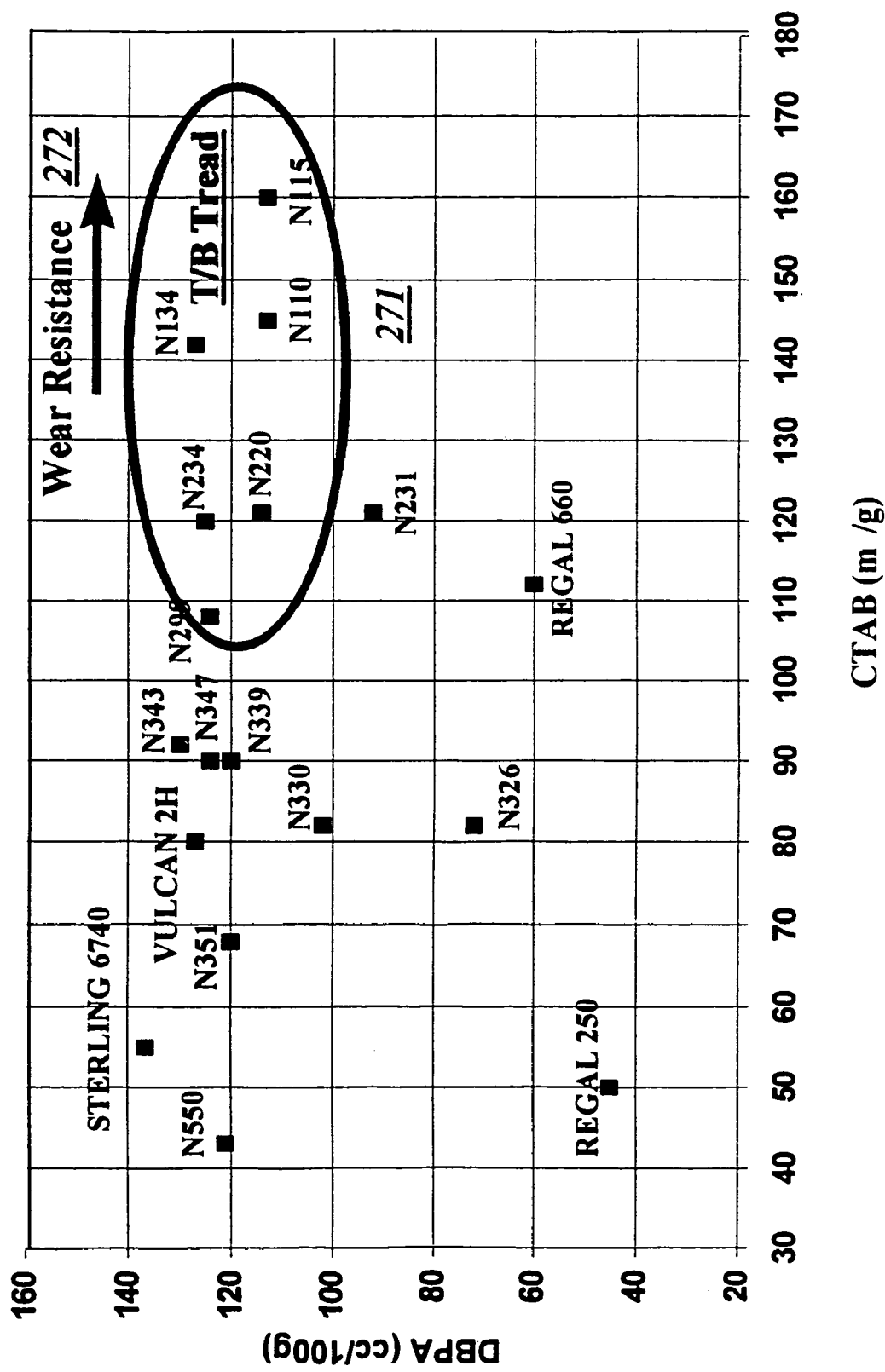
Figure 27. Carbon Blacks in NR Compounds for T/B Tread

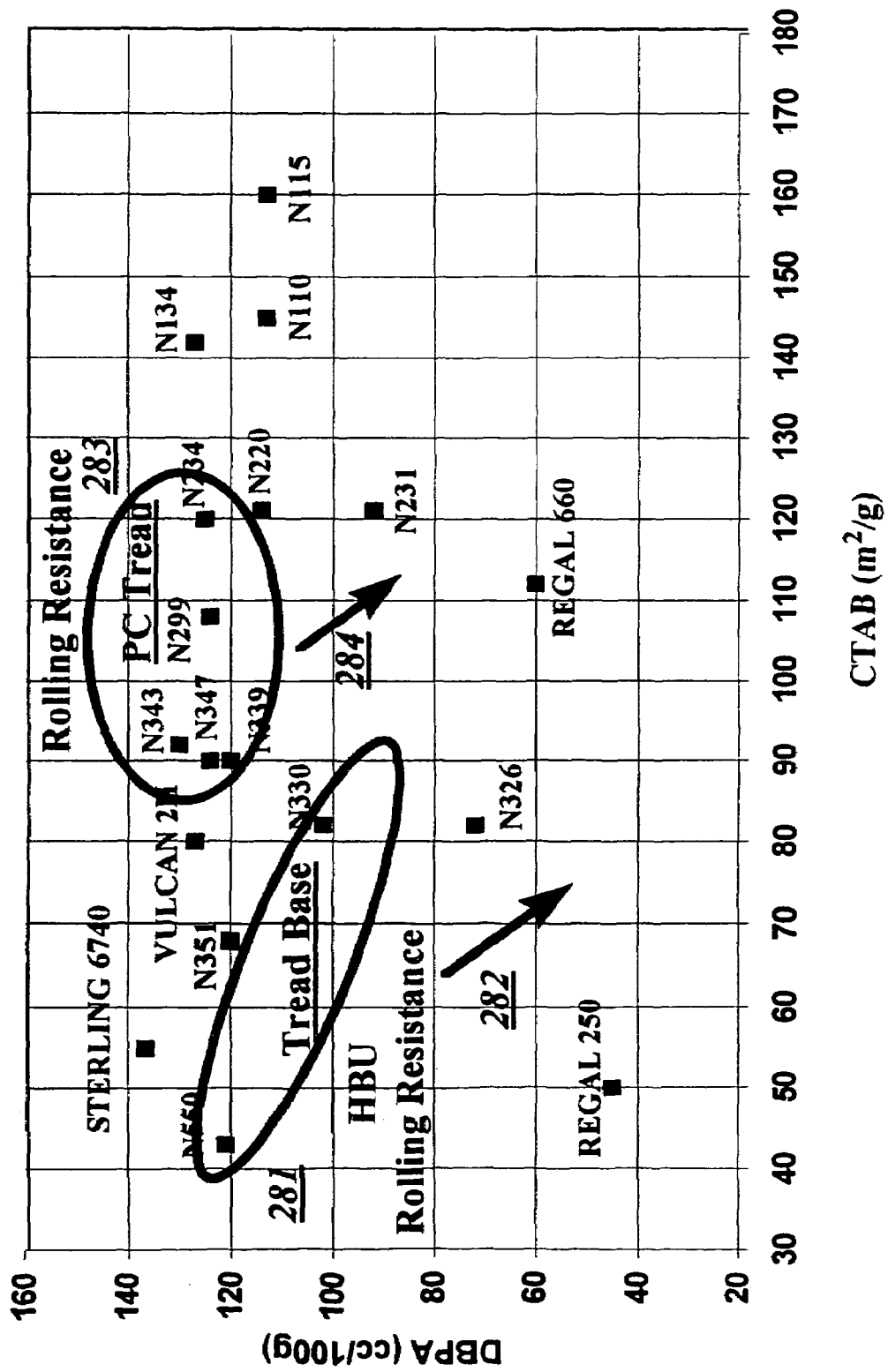

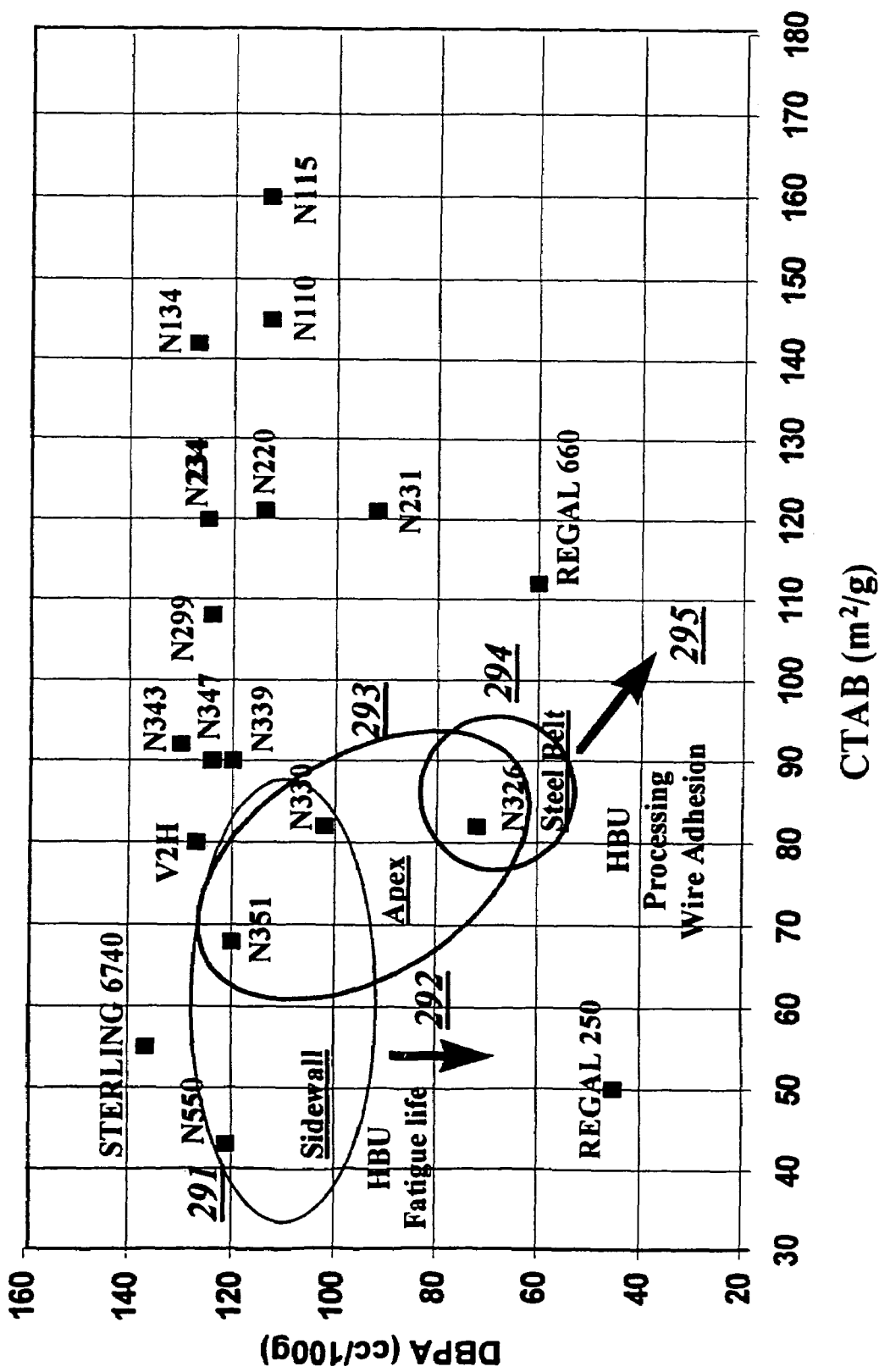

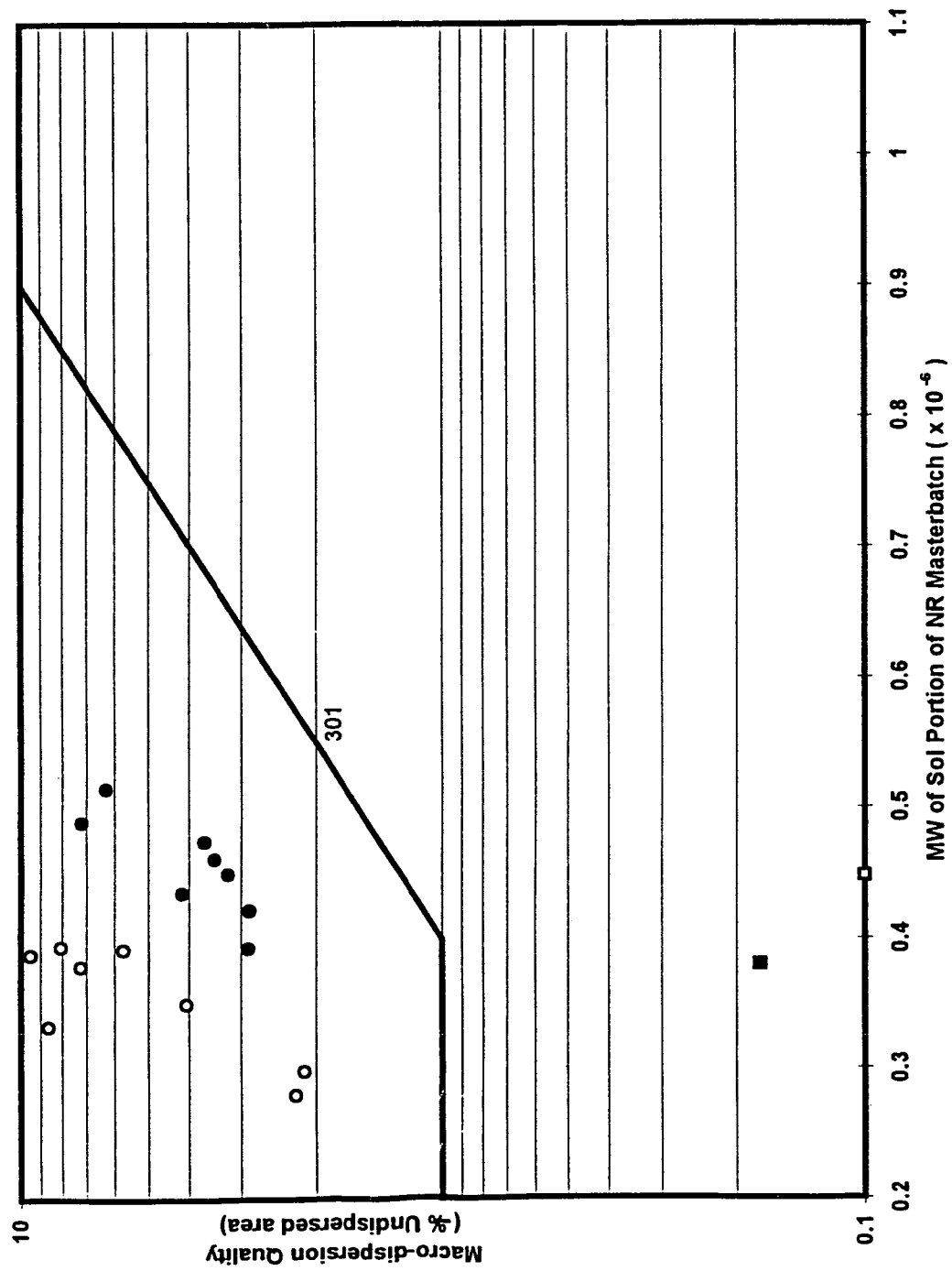
Figure 30  Macro-dispersion Quality and MW of Sol Portion of NR Masterbatch Containing Dual Phase (Carbon Black/Silica) Aggregates

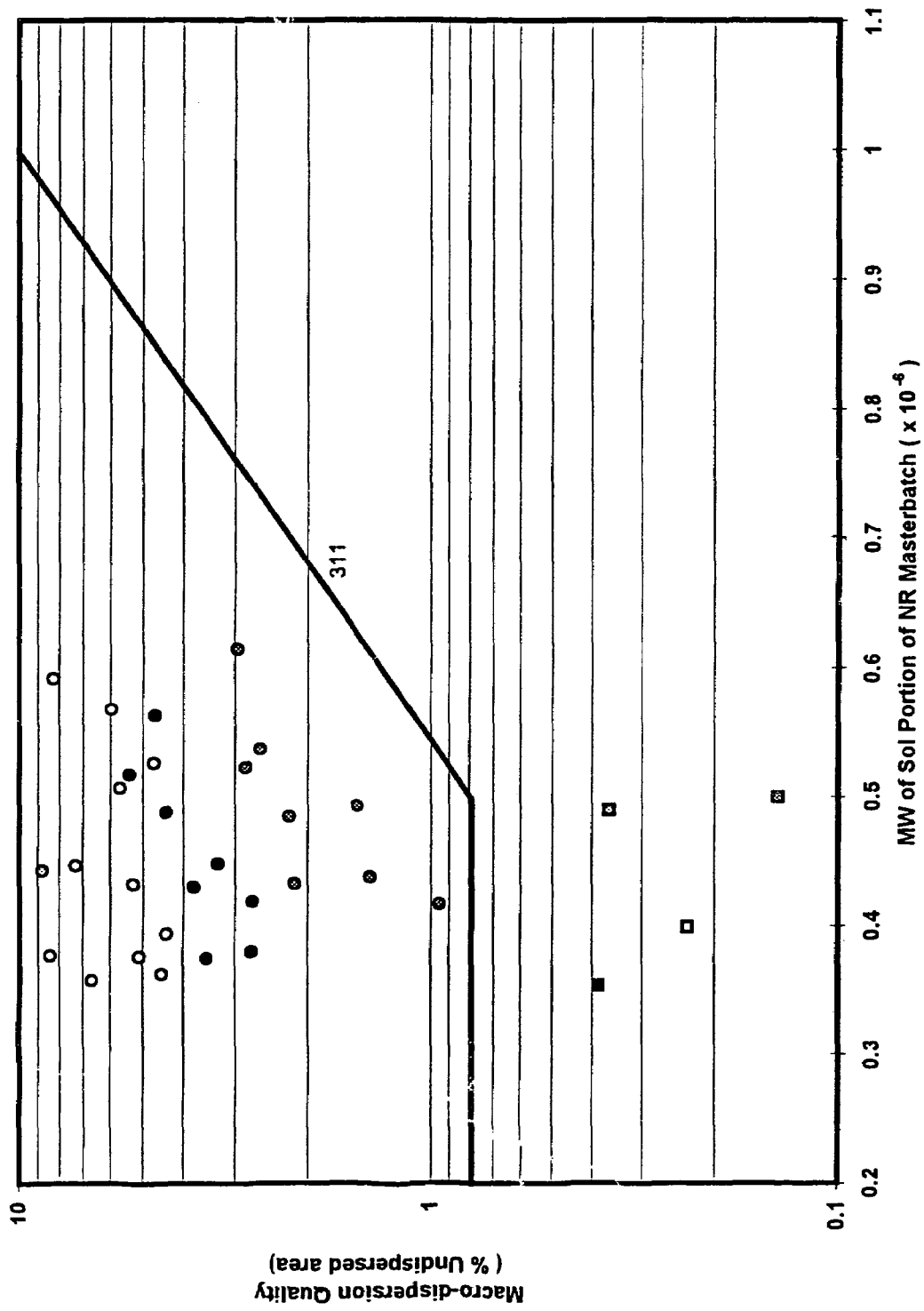
Figure 31 Macro-dispersion Quality and MW of Sol Portion of NR Masterbatch Containing Blend of Carbon Black and Silica

ELASTOMER COMPOSITES, METHOD AND APPARATUS

CROSS-REFERENCED APPLICATIONS AND PRIORITY CLAIM

This application claims the benefit of, and is a continuation application of, U.S. application Ser. No. 10/189,332 filed on Jul. 2, 2002 now abandoned which is incorporated herein by reference in its entirety for all purposes and which is a continuation of U.S. application Ser. No. 09/407,773, filed Sep. 28, 1999, now U.S. Pat. No. 6,413,478 issued Jul. 2, 2002, which is a continuation of U.S. patent application Ser. No. 08/823,411, filed Mar. 25, 1997, now U.S. Pat. No. 6,048,923 issued Apr. 11, 2000 which is a continuation-in-part of U.S. patent application Ser. No. 08/625,163 filed Apr. 1, 1996, now abandoned.

FIELD OF THE INVENTION

The present invention is directed to novel methods and apparatus for producing elastomer composites, and to novel elastomer composites produced using such methods and apparatus. More particularly, the invention is directed to continuous flow methods and apparatus for producing elastomer masterbatch of particulate filler finely dispersed in elastomer, for example, elastomer composites of carbon black particulate filler finely dispersed in natural rubber, such as curative-free masterbatch compositions, curative-bearing base compositions, and rubber materials and products formed of such masterbatch compositions.

BACKGROUND

Numerous products of commercial significance are formed of elastomeric compositions wherein particulate filler is dispersed in any of various synthetic elastomers, natural rubber or elastomer blends. Carbon black, for example, is widely used as a reinforcing agent in natural rubber and other elastomers. It is common to produce a masterbatch, that is, a pr-mixture of filler, elastomer and various optional additives, such as extender oil. Carbon black masterbatch is prepared with different grades of commercially available carbon black which vary both in surface area per unit weight and in "structure." Numerous products of commercial significance are formed of such elastomeric compositions of carbon black particulate filler dispersed in natural rubber. Such products include, for example, vehicle tires wherein different elastomeric compositions may be used for the tread portion, sidewalls, wire skim and carcass. Other products include, for example, engine mount bushings, conveyor belts, windshield wipers and the like. While a wide range of performance characteristics can be achieved employing currently available materials and manufacturing techniques, there has been a long standing need in the industry to develop elastomeric compositions having improved properties and to reduce the cost and complexity of current manufacturing techniques. In particular, it is known for example that macro-dispersion level, that is, the uniformity of dispersion of the carbon black or other filler within the elastomer, can significantly impact performance characteristics. For elastomeric compositions prepared by intensively mixing the carbon black or other filler with natural rubber or other elastomer (such as in a Banbury mixer or the like), any increase in macro-dispersion requires longer or more intensive mixing, with the consequent disadvantages of increased energy costs, manufacturing time, and similar concerns. For carbon black fillers of certain surface area and structure characteristics, dispersion beyond a certain degree has not been possible or commercially practicable using known mixing apparatus and techniques. In addition, such prolonged or more intensive mixing degrades the natural rubber by reducing its molecular weight, rendering the finished elastomeric compound undesirable for certain applications.

It is well known to employ carbon blacks having higher or lower structure and surface area to manipulate the performance characteristics of an elastomeric composition. Carbon blacks of higher surface area and lower structure are known to improve crack growth resistance and cut-and-chip resistance as well as, generally, abrasion resistance, and other performance qualities. Commercially available mixing techniques have been unable to achieve excellent uniformity of dispersion of carbon blacks throughout the elastomer, however, without unacceptable degradation of the natural rubber. In fact, for typical carbon black loading levels in natural rubber, such as 45 phr to 75 phr, and oil loading from 0 phr to 10 phr, low structure carbon blacks, such as carbon blacks of DBPA less than 110 cc/100 g, particularly those having surface area above about 45 $m^2/g$ to 65 $m^2/g$ (CTAB), it has not been possible to achieve compounds having less than about 1% undispersed carbon black (measured as macro-dispersion, as described below) regardless of the duration and level. Furthermore, as noted above, in the highly energy consumptive intensive dry mixing methods currently in widespread commercial use, the mastication of the elastomer necessary for dispersing such carbon blacks results in unacceptable levels of disruption of the polymeric chains of the natural rubber elastomer. The resultant reduction in the molecular weight of the natural rubber is undesirable for many industrial applications. For use in tire tread, for example, reduced molecular weight is known to cause an undesirable increase in the so-called rolling resistance of the tire.

Furthermore, while theoretical analysis has indicated desirable improvements in certain performance characteristics of elastomeric compositions employing carbon blacks of higher surface area and lower structure, it has not been possible using known physical milling or other mastication processes to obtain such elastomeric compositions in which both the molecular weight of the natural rubber is well preserved and satisfactory macro-dispersion levels of the carbon black are achieved. Generally, it has been found, for example, that the elastomer reinforcing properties of a carbon black increase as the particle size of the carbon black decreases. However, with extremely fine carbon blacks an anomalous condition is known to be encountered, in which the expected improvement in properties is not achieved. This is understood to be due at least in part to the inability of conventional elastomer compounding methods to adequately disperse the carbon black in the natural rubber without undue breakdown of the elastomer polymer. There has been, therefore, consequent inability to take full advantage of the natural affinity of the carbon black and the natural rubber for each other in the case of such carbon blacks.

Since good dispersion of carbon black in natural rubber compounds has been recognized for some time as one of the most important objectives for achieving good quality and consistent product performance, considerable effort has been devoted to the development of procedures for assessing dispersion quality in rubber. Methods developed include, e.g. the Cabot Dispersion Chart and various image analysis procedures. Dispersion quality can be defined as the state of mixing achieved. An ideal dispersion of carbon black is the state in which the carbon black agglomerates (or pellets) are broken down into aggregates (accomplished by dispersive mixing)

uniformly separated from each other (accomplished by distributive mixing), with the surfaces of all the carbon black aggregates completely wetted by the rubber matrix (usually referred to as incorporation).

Common problems in the rubber industry which are often related to poor macro-dispersion can be classified into four major categories: product performance, surface defects, surface appearance and dispersion efficiency. The functional performance and durability of a carbon black-containing rubber formulation, such as tensile strength, fatigue life and wear resistance, are affected substantially by macro-dispersion quality. Undispersed carbon black can also cause surface defects on finished products, including visible defects. Eliminating the presence of surface defects is of critical importance in molded thin parts for functional reasons and in extruded profiles for both aesthetic and functional reasons.

A commercial image analyzer such as the IBAS Compact model image analyzer available from Kontron Electronik GmbH (Munich, Germany) can be used to measure macro-dispersion of carbon black or other filler. Typically, in quantitative macro-dispersion tests used in the rubber industry, the critical cut-off size is 10 microns. Defects larger than about 10 microns in size typically consist of undispersed black or other filler, as well as any grit or other contaminants, which can affect both visual and functional performance. Thus, measuring macro-dispersion involves measuring defects on a surface (generated by microtoming, extrusion or cutting) greater than 10 microns in size by total area of such defects per unit area examined using an image analysis procedure. Macro-dispersion D(%) is calculated as follows:

$$\% \text{ Undispersed area} (\%) = \frac{1}{A_m} \sum_{i=1}^{m} N_i \frac{\pi D_i^2}{4}$$

where $A_m$=Total sample surface area examined
$N_i$=Number of defects with size $D_i$
$D_i$=Diameter of circle having the same area as that of the defect (equivalent circle diameter).
m=number of images Macro-dispersion of carbon black or other filler in uncured natural rubber or other suitable elastomer can be assessed using image analysis of cut surface samples. Typically, five to ten arbitrarily selected optical images are taken of the cut surface for image analysis. Knife marks and the like preferably are removed using a numerical filtering technique. Cut surface image analysis thus provides information regarding the carbon black dispersion quality inside a natural rubber compound. Specifically, percent undispersed area D(%) indicates carbon black macro-dispersion quality. As macro-dispersion quality is degraded, percent undispersed area increases. Dispersion quality can be improved, therefore, by reducing the percent undispersed area. As noted above, the mixing operations have a direct impact on mixing efficiency and on macro-dispersion. In general, better carbon black macro-dispersion is achieved in the elastomer, for example in a natural rubber masterbatch, by longer mixing and by more intensive mixing. Unfortunately, however, achieving better macro-dispersion by longer, more intensive mixing, degrades the elastomer into which the carbon black is being dispersed. This is especially problematic in the case of natural rubber, which is highly susceptible to mechanical/thermal degradation. Longer and more intensive mixing, using known mixing techniques and apparatus, such as a Banbury mixer, reduces the molecular weight of the natural rubber masterbatch-composition. Thus, improved macro-dispersion of carbon black in natural rubber is known to be achieved with a corresponding, generally undesirable reduction in the molecular weight of the rubber.

In addition to dry mixing techniques, it is known to continuously feed latex and a carbon black slurry to an agitated coagulation tank. Such "wet" techniques are used commonly with synthetic elastomer, such as SBR. The coagulation tank contains a coagulant such as salt or an aqueous or acid solution typically having a pH of about 2.5 to 4. The latex and carbon black slurry are mixed and coagulated in the coagulation tank into small beads (typically a few millimeters in diameter) referred to as wet crumb. The crumb and acid effluent are separated, typically by means of a vibrating shaker screen or the like. The crumb is then dumped into a second agitated tank where it is washed to achieve a neutral or near neutral pH. Thereafter the crumb is subjected to additional vibrating screen and drying steps and the like. Variations on this method have been suggested for the coagulation of natural and synthetic elastomers. In U.S. Pat. No. 4,029,633 to Hagopian et al, which like the present invention is assigned to Cabot Corporation, a continuous process for the preparation of elastomer masterbatch is described. An aqueous slurry of carbon black is prepared and mixed with a natural or synthetic elastomer latex. This mixture undergoes a so-called creaming operation, optionally using any of various known creaming agents. Following the creaming of the carbon black/latex mixture, it is subjected to a coagulation step. Specifically, the creamed carbon black/latex mixture is introduced as a single coherent stream into the core of a stream of coagulating liquor. The solid stream of creamed carbon black/latex mixture is said to undergo shearing and atomizing by the stream of coagulating liquor prior to coagulation, being then passed to a suitable reaction zone for completion of the coagulation. Following such coagulation step, the remainder of the process is substantially conventional, involving separation of the crumb from the waste product "serum" and washing and drying of the crumb. A somewhat similar process is described in U.S. Pat. No. 3,048,559 to Heller et al. An aqueous slurry of carbon black is continuously blended with a stream of natural or synthetic elastomer or latex. The two streams are mixed under conditions described as involving violent hydraulic turbulence and impact. As in the case of the Hagopian et al patent mentioned above, the combined stream of carbon black slurry and elastomer latex is subsequently coagulated by the addition of an acid or salt coagulant solution.

There has long been a need in various industries for elastomeric compounds of particulate filler dispersed in suitable elastomer, especially, for example, carbon black dispersed in natural rubber, having improved macro-dispersion. As discussed above, improved macro-dispersion can provide correspondingly improved aesthetic and functional characteristics. Especially desirable are new elastomeric compounds of carbon black in natural rubber wherein improved macro-dispersion is achieved together with higher molecular weight of the natural rubber. It is an object of the present invention to meet some or all of these long felt needs.

SUMMARY OF THE INVENTION

In accordance with a first aspect, a method for preparing elastomer masterbatch involves feeding simultaneously a particulate filler fluid and an elastomer latex fluid to a mixing zone of a coagulum reactor. A coagulum zone extends from the mixing zone, preferably progressively increasing in cross-sectional area in the downstream direction from an entry end to a discharge end. The elastomer latex may be either natural or synthetic and the particulate filler fluid comprises carbon black or other particulate filler effective to coagulate the latex. The particulate filler fluid is fed to the mixing zone preferably as a continuous, high velocity jet of injected fluid, while the latex fluid is fed at low velocity. The velocity, flow rate and particulate concentration of the particulate filler fluid are sufficient to cause mixture with high shear of the latex fluid and flow turbulence of the mixture within at least an upstream portion of the coagulum zone so as to substantially completely coagulate the elastomer latex with the particulate filler prior to the discharge end. Substantially complete coagulation can thus be achieved, in accordance with preferred embodiments, without the need of employing an acid or salt coagulation agent.

In accordance with another aspect, a continuous flow method of producing elastomer masterbatch comprises the continuous and simultaneous feeding of latex fluid and particulate filler fluid to the mixing zone of the coagulum reactor establishing a continuous, semi-confined flow of a mixture of the elastomer latex and particulate filler in the coagulum zone. Elastomer masterbatch crumb in the form of "worms" or globules are discharged from the discharge end of the coagulum reactor as a substantially constant flow concurrently with the on-going feeding of the latex and particulate filler fluid streams into the mixing zone of the coagulum reactor. Notably, the plug-type flow and atmospheric or near atmospheric pressure conditions at the discharge end of the coagulum reactor are highly advantageous in facilitating control and collection of the elastomer masterbatch product, such as for immediate or subsequent further processing steps.

In accordance with an apparatus aspect, means are provided for feeding elastomer latex fluid to the mixing zone of the aforesaid coagulum reactor, preferably under low pressure, substantially laminar type flow conditions, and means are provided for simultaneously feeding particulate filler fluid to the mixing zone under pressure sufficient to create a jet of sufficient velocity or kinetic energy to entrain the elastomer latex as described above, and achieve coagulation before the mixture flowing downstream from the mixing zone reaches the discharge end of the coagulum reactor. In accordance with certain preferred embodiments described in detail below, means for feeding the elastomer latex fluid and separate means for feeding the particulate filler fluid each may comprise a feed channel in a mix head integral with a substantially tubular member defining the coagulum zone. The mixing zone may be provided at the junction of such feed channels within the mix head. In accordance with certain preferred embodiments, the mixing zone is simply a coaxial extension of the coagulum zone. Progressive increase in the cross-sectional area of the coagulum reactor is continuous in certain preferred embodiments and is step-wise in other preferred embodiments. Additionally, the coagulum reactor may be provided with such optional features as a diverter at its discharge end, as further described below. Additional optional and preferred features of the apparatus disclosed here for continuous flow production of elastomer masterbatch are discussed in the detailed description below.

In accordance with yet another aspect, elastomer composites are provided as a product of the process or apparatus disclosed above. In accordance with preferred embodiments, novel elastomer composites are provided having macro-dispersion level of the particulate filler, molecular weight of the elastomer, particulate loading level, choice of particulate filler (including, for example, carbon black fillers of exceptionally high surface area and low structure) and/or other characteristics not previously achieved. In that regard, the methods and apparatus disclosed here can achieve excellent macro-dispersion, even of certain fillers, such as carbon blacks having a structure to surface area ratio DBP:CTAB less than 1.2 and even less than 1, in elastomers such as natural rubber, with little or no degradation of the molecular weight of the elastomer. In accordance with yet other aspects of the invention, intermediate products are provided as well as final products which are formed of the elastomer composites produced by the method or apparatus disclosed here.

In accordance with another aspect, novel elastomer composites are provided, comprising a particulate filler dispersed in natural rubber, the macro-dispersion level of the filler in the elastomer composite being less than about 0.2% undispersed area, preferably less than about 0.1% undispersed area. Consistent with the discussion above, macro-dispersion here means the macro-dispersion D(%) of the carbon black measured as percent undispersed area for defects larger than 10 microns. In natural rubber masterbatch and other elastomer composites disclosed here, the molecular weight of the natural rubber, that is, the $MW_{sol}$ (weight average) of the sol portion, preferably is at least about 300,000, more preferably at least about 400,000, being in certain preferred embodiments between 400,000 and 900,000. The elastomer composites optionally comprise extender oil, such as about 0 to 20 phr, more preferably about 0 to 10 phr extender oil, and/or other ingredients such as are well known for optional use in compounding natural rubber with carbon black filler. As discussed further below in connection with certain preferred and exemplary embodiments, the novel elastomer composites disclosed here can provide highly desirable physical properties and performance characteristics. Accordingly, the invention presents a significant technological advance.

In accordance with another aspect, novel elastomer composites are provided in which there is a novel, heretofore unobtained, combination of properties, including certain macro-dispersion level of the carbon black filler, molecular weight of the natural rubber, carbon black loading level carbon black characteristics (including surface area and structure, e.g., carbon black fillers of exceptionally high surface area and low structure) and/or other characteristics. In accordance with various aspects of the invention, masterbatch compositions and intermediate products are provided, as well as final products which are formed of them.

These and other aspects and advantages of various embodiments of the invention will be further understood in view of the following detailed discussion of certain preferred embodiments.

BRIEF DESCRIPTION OF THE DRAWINGS

The following discussion of certain preferred embodiments will make reference to the appended drawings wherein:

FIG. 8 is a graph showing the surface area and structure properties (CTAB and DBPA) of carbon blacks employed in certain highly preferred masterbatch compositions in accordance with the present invention;

FIGS. 9-25 are graphs showing the macro-dispersion, natural rubber molecular weight and/or other characteristics of novel elastomer composites in accordance with this invention comprising carbon blacks shown in FIG. 8, in some cases along with data relating to control samples for comparison, exemplifying the significant improvements in physical characteristics and performance properties achieved by the elastomer composites;

FIGS. 26-29 are graphs showing morphological properties of carbon blacks, i.e., structure (DBPA) and surface area (CTAB), and identifying regions or zones of carbon blacks (by such morphological properties) which are suitable for specific product applications; and FIGS. 30 and 31 are graphs showing the macro-dispersion and natural rubber molecular weight of novel elastomer composites in accordance with this invention, along with control samples for comparison.

Figure 1:
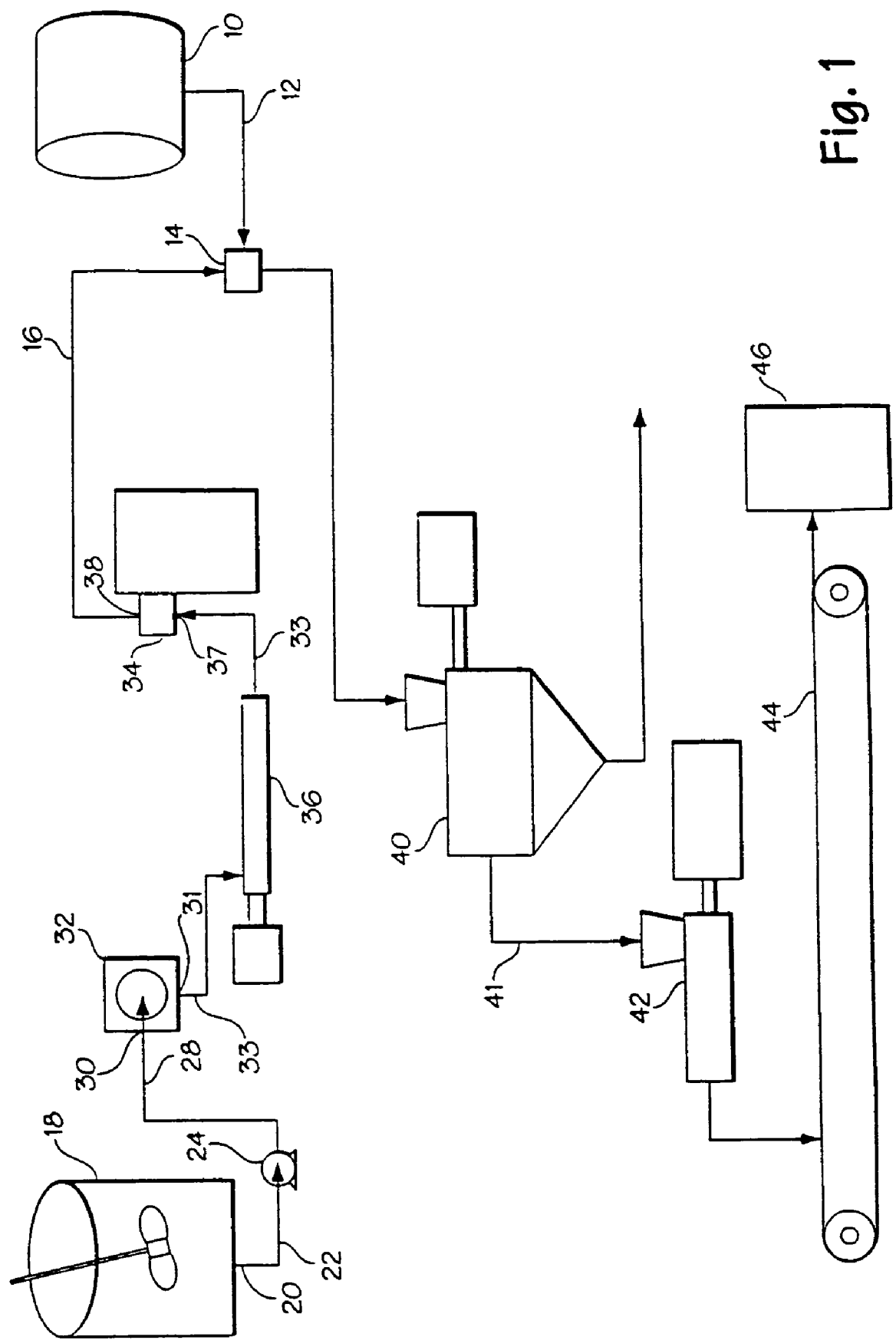
FIG. 1 is a schematic flow chart illustration of the apparatus and method for preparing elastomer masterbatch in accordance with certain preferred embodiments.

It should be understood that the appended drawings are not necessarily precisely to scale. Certain features may have been enlarged or reduced for convenience or clarity of illustration. Directional references used in the following discussion are based on the orientation of components illustrated in the drawings unless otherwise stated or otherwise clear from the context. In general, apparatus in accordance with different embodiments of the invention can be employed in various arrangements. It will be within the ability of those skilled in the art, given the benefit of the present disclosure, to determine appropriate dimensions and orientations for apparatus of the invention employing routine technical skills and taking into account well-known factors particular to the intended application, such as desired production volumes, material selection, duty cycle, and the like. Reference numbers used in one drawing may be used in other drawings for the same feature or element.

DETAILED DESCRIPTION OF CERTAIN PREFERRED EMBODIMENTS

By virtue of the method and apparatus disclosed here, elastomer masterbatch can be produced in a continuous flow process involving mixture of elastomer latex and particulate filler fluids at turbulence levels and flow control conditions sufficient to achieve coagulation even without use of traditional coagulating agents. In fact, it will be immediately recognized to be of great commercial benefit that elastomer masterbatch crumb is achieved, that is, coagulated latex is achieved, here without the need for either intensive dry mastication of elastomer with filler or exposing a liquid latex/particulate composition to a stream or tank of coagulant. Thus, in routine commercial implementation the cost and complexity of employing acid coagulation solutions can be avoided. Prior techniques involving premixing of latex and particulate, such as in the above-mentioned Heller et al patent and Hagopian et al patent do not even recognize the possibility of achieving coagulation without exposing the latex/particulate mixture to the usual coagulant solution with its attendant cost and waste disposal disadvantages.

Feed rates of latex fluid and particulate filler fluid to the mixing zone of the coagulum reactor can be precisely metered to achieve high yield rates, with little free latex and little undispersed filler in the product crumb at the discharge end of the coagulum reactor. Without wishing to be bound by theory, it presently is understood that a quasi-mono-phase system is established in the mixing zone except that coagulum solids are being formed there and/or downstream thereof in the coagulum zone. Extremely high feed velocity of the particulate filler fluid into the mixing zone of the coagulum reactor and velocity differential relative the latex fluid feed are believed to be significant in achieving sufficient turbulence, i.e., sufficiently energetic shear of the latex by the impact of the particulate filler fluid jet for thorough mixing and dispersion of the particulate into the latex fluid and coagulation. High mixing energies yield product masterbatch crumb with excellent dispersion, together with controlled product delivery. The coagulum is created and then formed into a desirable extrudate.

Certain preferred embodiments are discussed below, of methods and apparatus for producing the novel elastomer composites disclosed here. While various preferred embodiments of the invention can employ a variety of different fillers and elastomers, certain portions of the following detailed description of method and apparatus aspects of the invention will, in some instances, for convenience, describe their use primarily in producing masterbatch comprising natural rubber and carbon black. It will be within the ability of those skilled in the art, given the benefit of this disclosure, to employ the method and apparatus disclosed here in accordance with the principles of operation discussed below to produce masterbatch comprising a number of alternative or additional elastomers, fillers and other materials. In brief, such methods for preparing elastomer masterbatch involve feeding simultaneously a slurry of carbon black or other filler and a natural rubber latex fluid or other suitable elastomer fluid to a mixing zone of a coagulum reactor. A coagulum zone extends from the mixing zone, preferably progressively increasing in cross-sectional area in the downstream direction from an entry end to a discharge end. The slurry is fed to the mixing zone preferably as a continuous, high velocity jet of injected fluid, while the natural rubber latex fluid is fed at relatively low velocity. The high velocity, flow rate and particulate concentration of the filler slurry are sufficient to cause mixture and high shear of the latex fluid, flow turbulence of the mixture within at least an upstream portion of the coagulum zone, and substantially completely coagulate the elastomer latex prior to the discharge end. Substantially complete coagulation can thus be achieved, in accordance with preferred embodiments, without the need of employing an acid or salt coagulation agent. The preferred continuous flow method of producing the elastomer composites comprises the continuous and simultaneous feeding of the latex fluid and filler slurry to the mixing zone of the coagulum reactor, establishing a continuous, semi-confined flow of a mixture of the latex and filler slurry in the coagulum zone. Elastomer composite crumb in the form of "worms" or globules are discharged from the discharge end of the coagulum reactor as a substantially constant flow concurrently with the on-going feeding of the latex and carbon black slurry streams into the mixing zone of the coagulum reactor. Notably, the plug-type flow and atmospheric or near atmospheric pressure conditions at the discharge end of the coagulum reactor are highly advantageous in facilitating control and collection of the elastomer composite product, such as for immediate or subsequent further processing steps. Feed rates of the natural rubber latex fluid and carbon black slurry to the mixing zone of the coagulum reactor can be precisely metered to achieve high yield rates, with little free latex and little undispersed carbon black in the product crumb at the discharge end of the coagulum reactor. Without wishing to be bound by theory, it presently is understood that a quasi-mono-phase system is established in the mixing zone except that coagulum solids are being formed there and/or downstream thereof in the coagulum zone. Extremely high feed velocity of the carbon black slurry into the mixing zone of the coagulum reactor and velocity differential relative the natural rubber latex fluid feed are believed to be significant in achieving sufficient turbulence, i.e., sufficiently energetic shear of the latex by the impact of the particulate filler fluid jet for thorough mixing and dispersion of the particulate into the latex fluid and coagulation. High mixing energies yield the novel product with excellent macro-dispersion, together with controlled product delivery. The coagulum is created and then formed into a desirable extrudate.

The aforesaid preferred apparatus and techniques for producing the elastomer composites disclosed here are discussed in conjunction with the appended drawings, wherein a continuous flow method of producing elastomer masterbatch employs a continuous, semi-confined flow of elastomer latex, for example, natural rubber latex (field latex or concentrate) mixed with a filler slurry, for example, an aqueous slurry of carbon black, in a coagulum reactor forming an elongate coagulum zone which extends, preferably with progressively increasing cross-sectional area, from an entry end to a discharge end. The term "semi-confined" flow refers to a highly advantageous feature. As used here the term is intended to mean that the flow path followed by the mixed latex fluid and filler slurry within the coagulum reactor is closed or substantially closed upstream of the mixing zone and is open at the opposite, downstream end of the coagulum reactor, that is, at the discharge end of the coagulum reactor. Turbulence conditions in the upstream portion of the coagulum zone are maintained in on-going, at least quasi-steady state fashion concurrently with substantially plug flow-type conditions at the open discharge end of the coagulum reactor. The discharge end is "open" at least in the sense that it permits discharge of coagulum, generally at or near atmospheric pressure and, typically, by simple gravity drop (optionally within a shrouded or screened flow path) into suitable collection means, such as the feed hopper of a de-watering extruder. Thus, the semi-confined flow results in a turbulence gradient extending axially or longitudinally within at least a portion of the coagulum reactor. Without wishing to be bound by theory, it presently is understood that the coagulum zone is significant in permitting high turbulence mixing and coagulation in an upstream portion of the coagulum reactor, together with substantially plug-type discharge flow of a solid product at the discharge end. Injection of the carbon black or other filler slurry as a continuous jet into the mixing zone occurs in on-going fashion simultaneously with ease of collection of the elastomer masterbatch crumb discharged under substantially plug-type flow conditions and generally ambient pressure at the discharge end of the coagulum reactor. Similarly, axial velocities of the slurry through the slurry nozzle into the mixing zone and, typically, at the upstream end of the coagulum zone are substantially higher than at the discharge end. Axial velocity of the slurry will typically be several hundred feet per second as it enters the mixing zone, preferably from a small bore, axially oriented feed tube in accordance with preferred embodiments discussed below. The axial velocity of the resultant flow at the entry end of a coagulum reactor with expanding cross-sectional area in a typical application may be, for example, 5 to 20 feet per second, and more usually 7 to 15 feet per second. At the discharge end, in contrast again, axial velocity of the masterbatch crumb product being discharged there will in a typical application be approximately 1 to 10 feet per second, and more generally 2 to 5 feet per second. Thus, the aforesaid semi-confined turbulent flow achieves the highly significant advantage that natural rubber or other elastomer latex is coagulated by mixture with carbon black or other filler even in the absence of subsequent treatment in a stream or tank of acid, salt or other coagulant solution, with controlled, preferably quasi-molded product delivery from the coagulum reactor for subsequent processing.

It should be understood in this regard that reference to the coagulum reactor as being "open" at the discharge end is not intended to mean that the discharge end is necessarily exposed to view or easily accessed by hand. It may instead be permanently or releasably attached to a collection device or subsequent processing device, such as a diverter (discussed further below), dryer, etc. The discharge end of the coagulum reactor is open in the important sense that the turbulent flow within the coagulum zone of the coagulum reactor, which is under high pressure and sealed against any significant rearward (i.e., upstream) travel at the mixing zone, is permitted to establish the aforesaid pressure and/or velocity gradient as it travels toward and exits from the discharge end.

It should also be recognized in this regard that the turbulence of the flow lessens along the coagulum reactor toward the discharge end. Substantial plug flow of a solid product is achieved prior to the discharge end, dependent upon such factors as percent of capacity utilization, selection of materials and the like. Reference here to the flow being substantially plug flow at or before the discharge end of the coagulum reactor should be understood in light of the fact that the flow at the discharge end is composed primarily or entirely of masterbatch crumb, that is, globules or "worms" of coagulated elastomer masterbatch. The crumb is typically quasi-molded to the inside shape of the coagulum zone at the point along the coagulum zone at which flow became substantially plug flow. The ever-advancing mass of "worms" or globules advantageously have plug-type flow in the sense that they are traveling generally or primarily axially toward the discharge end and at any point in time in a given cross-section of the coagulum zone near the discharge end have a fairly uniform velocity, such that they are readily collected and controlled for further processing. Thus, the fluid phase mixing aspect disclosed here can advantageously be carried out at steady state or quasi-steady state conditions, resulting in high levels of product uniformity.

A preferred embodiment of the method and apparatus disclosed here is illustrated schematically in FIG. 1. Those skilled in the art will recognize that the various aspects of system configuration, component selection and the like will depend to some extent on the particular characteristics of the intended application. Thus, for example, such factors as maximum system through-put capacity and material selection flexibility will influence the size and layout of system components. In general, such considerations will be well within the ability of those skilled in the art given the benefit of the present disclosure. The system illustrated in FIG. 1 is seen to include means for feeding natural rubber latex or other elastomer latex fluid at low pressure and low velocity continuously to a mixing zone of a coagulum reactor. More particularly, a latex pressure tank 10 is shown, to hold the feed supply of latex under pressure. Alternatively, a latex storage tank can be used, equipped with a peristaltic pump or series of pumps or other suitable feed means adapted to hold elastomer latex fluid to be fed via feed line 12 to a mixing zone of a coagulum reactor 14. Latex fluid in tank 10 may be held under air or nitrogen pressure or the like, such that the latex fluid is fed to the mixing zone at a line pressure of preferably less than 10 psig, more preferably about 2-8 psig, and typically about 5 psig. The latex feed pressure and the flow lines, connections, etc., of the latex feed means should be arranged to cause shear in the flowing latex fluid as low as reasonably possible. Preferably all flow lines, for example, are smooth, with only large radius turns, if any, and smooth or faired line-to-line interconnections. The pressure is selected to yield the desired flow velocity into the mixing zone; an example of a useful flow velocity is no more than about 12 feet per second.

Suitable elastomer latex fluids include both natural and synthetic elastomer latices and latex blends. The latex must, of course, be suitable for coagulation by the selected particulate filler and must be suitable for the intended purpose or application of the final rubber product. It will be within the ability of those skilled in the art to select suitable elastomer latex or a suitable blend of elastomer latices for use in the methods and apparatus disclosed here, given the benefit of this disclosure. Exemplary elastomers include, but are not limited to, rubbers, polymers (e.g., homopolymers, copolymers and/or terpolymers) of 1,3-butadiene, styrene, isoprene, isobutylene, 2,3-dimethyl-1,3-butadiene, acrylonitrile, ethylene, and propylene and the like. The elastomer may have a glass transition temperature (Tg) as measured by differential scanning calorimetry (DSC) ranging from about −120° C. to about 0° C. Examples include, but are not limited to, styrene-butadiene rubber (SBR), natural rubber and its derivatives such as chlorinated rubber, polybutadiene, polyisoprene, poly(stryene-co-butadiene) and the oil extended derivatives of any of them. Blends of any of the foregoing may also be used. The latex may be in an aqueous carrier liquid. Alternatively, the liquid carrier may be a hydrocarbon solvent. In any event, the elastomer latex fluid must be suitable for controlled continuous feed at appropriate velocity, pressure and concentration into the mixing zone. Particular suitable synthetic rubbers include: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide. Also suitable for use herein are copolymers of ethylene and other high alpha olefins such as propylene, butene-1 and pentene-1. As noted further below, the rubber compositions of the present invention can contain, in addition to the elastomer and filler, curing agents, a coupling agent, and optionally, various processing aids, oil extenders and antidegradents.

In that regard, it should be understood that the elastomer composites disclosed here include vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics. Thus, in making the elastomer composites one or more curing agents such as, for example, sulfur, sulfur donors, activators, accelerators, peroxides, and other systems used to effect vulcanization of the elastomer composition may be used.

Where the elastomer latex comprises natural rubber latex, the natural rubber latex can comprise field latex or latex concentrate (produced, for example, by evaporation, centrifugation or creaming). The natural rubber latex must, of course, be suitable for coagulation by the carbon black. The latex is provided typically in an aqueous carrier liquid. Alternatively, the liquid carrier may be a hydrocarbon solvent. In any event, the natural rubber latex fluid must be suitable for controlled continuous feed at appropriate velocity, pressure and concentration into the mixing zone. The well known instability of natural rubber latex is advantageously accommodated, in that it is subjected to relatively low pressure and low shear throughout the system until it is entrained into the aforesaid semi-confined turbulent flow upon encountering the extraordinarily high velocity and kinetic energy of the carbon black slurry in the mixing zone. In certain preferred embodiments, for example, the natural rubber is fed to the mixing zone at a pressure of about 5 psig, at a feed velocity in the range of about 3-12 ft. per second, more preferably about 4-6 ft. per second. Selection of a suitable latex or blend of latices will be well within the ability of those skilled in the art given the benefit of the present disclosure and the knowledge of selection criteria generally well recognized in the industry.

The particulate filler fluid, for example, carbon black slurry, is fed to the mixing zone at the entry end of coagulum reactor 14 via feed line 16. The slurry may comprise any suitable filler in a suitable carrier fluid. Selection of the carrier fluid will depend largely upon the choice of particulate filler and upon system parameters. Both aqueous and non-aqueous liquids may be used, with water being preferred in many embodiments in view of its cost, availability and suitability of use in the production of carbon black and certain other filler slurries.

When a carbon black filler is used, selection of the carbon black will depend largely upon the intended use of the elastomer masterbatch product. Optionally, the carbon black filler can include also any material which can be slurried and fed to the mixing zone in accordance with the principles disclosed here. Suitable additional particulate fillers include, for example, conductive fillers, reinforcing fillers, fillers comprising short fibers (typically having an L/D aspect ratio less than 40), flakes, etc. Thus, exemplary particulate fillers which can be employed in producing elastomer masterbatch in accordance with the methods and apparatus disclosed here, are carbon black, fumed silica, precipitated silica, coated carbon black, chemically functionalized carbon blacks, such as those having attached organic groups, and silicon-treated carbon black, either alone or in combination with each other. Suitable chemically functionalized carbon blacks include those disclosed in International Application No. PCT/US95/16194 (WO9618688), the disclosure of which is hereby incorporated by reference. In silicon-treated carbon black, a silicon containing species such as an oxide or carbide of silicon, is distributed through at least a portion of the carbon black aggregate as an intrinsic part of the carbon black. Conventional carbon blacks exist in the form of aggregates, with each aggregate consisting of a single phase, which is carbon. This phase may exist in the form of a graphitic crystallite and/or amorphous carbon, and is usually a mixture of the two forms. As discussed elsewhere herein, carbon black aggregates may be modified by depositing silicon-containing species, such as silica, on at least a portion of the surface of the carbon black aggregates. The result may be described as silicon-coated carbon blacks. The materials described herein as silicon-treated carbon blacks are not carbon black aggregates which have been coated or otherwise modified, but actually represent a different kind of aggregate. In the silicon-treated carbon blacks, the aggregates contain two phases. One phase is carbon, which will still be present as graphitic crystallite and/or amorphous carbon, while the second phase is silica (and possibly other silicon-containing species). Thus, the silicon-containing species phase of the silicon-treated carbon black is an intrinsic part of the aggregate; it is distributed throughout at least a portion of the aggregate. It will be appreciated that the multiphase aggregates are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate. In this process, an existing aggregate is treated so as to deposit or coat silica (as well as possibly other silicon-containing species) on at least a portion of the surface of the aggregate. For example, an aqueous sodium silicate solution may be used to deposit amorphous silica on the surface of carbon black aggregates in an aqueous slurry at high pH, such as 6 or higher, as discussed in Japanese Unexamined Laid-Open (Kokai) Publication No. 63-63755. More specifically, carbon black may be dispersed in water to obtain an aqueous slurry consisting, for example, of about 5% by weight carbon black and 95% by weight water. The slurry is heated to above about 70° C., such as to 85-95° C., and the pH adjusted to above 6, such as to a range of 10-11, with an alkali solution A separate preparation is made of sodium silicate solution, containing the amount of silica which is desired to be deposited on the carbon black, and an acid solution to bring the sodium silicate solution to a neutral pH. The sodium silicate and acid solutions are added dropwise to the slurry, which is maintained at its starting pH value with acid or alkali solution as appropriate. The temperature of the solution is also maintained. A suggested rate for addition of the sodium silicate solution is to calibrate the dropwise addition to add about 3 weight percent silicic acid, with respect to the total amount of carbon black, per hour. The slurry should be stirred during the addition, and after its completion for from several minutes (such as 30) to a few hours (i.e., 2-3). In contrast, silicon-treated carbon blacks may be obtained by manufacturing carbon black in the presence of volatizable silicon-containing compounds. Such carbon blacks are preferably produced in a modular or "staged" furnace carbon black reactor having a combustion zone followed by a zone of converging diameter, a feed stock injection zone with restricted diameter, and a reaction zone. A quench zone is located downstream of the reaction zone. Typically, a quenching fluid, generally water, is sprayed into the stream of newly formed carbon black particles flowing from the reaction zone. In producing silicon-treated carbon black, the aforesaid volatizable silicon-containing compound is introduced into the carbon black reactor at a point upstream of the quench zone. Useful compounds are volatizable compounds at carbon black reactor temperatures. Examples include, but are not limited to, silicates such as tetraethoxy orthosilicate (TEDS) and tetramethoxy orthosilicate, silanes such as, tetrachloro silane, and trichloro methylsilane; and colatile silicone polymers such as octamethylcyclotetrasiloxane (OMTS). The flow rate of the volatilizable compound will determine the weight percent of silicon in the treated carbon black. The weight percent of silicon in the treated carbon black typically ranges from about 0.1 percent to 25 percent, preferably about 0.5 percent to about 10 percent, and more preferably about 2 percent to about 6 percent. The volatizable compound may be pre-mixed with the carbon black-forming feed stock and introduced with the feed stock into the reaction zone. Alternatively, the volatizable compound may be introduced to the reaction zone separately, either upstream or downstream from the feed stock injection point.

As noted above, additives may be used, and in this regard coupling agents useful for coupling silica or carbon black should be expected to be useful with the silicon-treated carbon blacks. Carbon blacks and numerous additional suitable particulate fillers are commercially available and are known to those skilled in the art.

Selection of the particulate filler or mixture of particulate fillers will depend largely upon the intended use of the elastomer masterbatch product. As used here, particulate filler can include any material which can be slurried and fed to the mixing zone in accordance with the principles disclosed here. Suitable particulate fillers include, for example, conductive fillers, reinforcing fillers, fillers comprising short fibers (typically having an L/D aspect ratio less than 40), flakes, etc. In addition to the carbon black and silica-type fillers mentioned above, fillers can be formed of clay, glass, polymer, such as aramid fiber, etc. It will be within the ability of those skilled in the art to select suitable particulate fillers for use in the method and apparatus disclosed here given the benefit of the present disclosure, and it is expected that any filler suitable for use in elastomer compositions may be incorporated into the elastomer composites using the teachings of the present disclosure. Of course, blends of the various particulate fillers discussed herein may also be used Preferred embodiments of the invention consistent with FIG. 1 are especially well adapted to preparation of particulate filler fluid comprising aqueous slurries of carbon black. In accordance with known principles, it will be understood that carbon blacks having lower surface area per unit weight must be used in higher concentration in the particulate slurry to achieve the same coagulation efficacy as lower concentrations of carbon black having higher surface area per unit weight. Agitated mixing tank 18 receives water and carbon black, e.g., optionally pelletized carbon black, to prepare an initial mixture fluid. Such mixture fluid passes through discharge port 20 into fluid line 22 equipped with pumping means 24, such as a diaphragm pump or the like. Line 28 passes the mixture fluid to colloid mill 32, or alternatively a pipline grinder or the like, through intake port 30. The carbon black is dispersed in the aqueous carrier liquid to form a dispersion fluid which is passed through outlet port 31 and fluid line 33 to a homogenizer 34. Pumping means 36, preferably comprising a progressing cavity pump or the like is provided in line 33. Homogenizer 34 more finely disperses the carbon black in the carrier liquid to form the carbon black slurry which is fed to the mixing zone of the coagulum reactor 14. It has an inlet port 37 in fluid communication with line 33 from the colloid mill 32. The homogenizer 34 may preferably comprise, for example, a Microfluidizer® system commercially available from Microfluidics International Corporation (Newton, Mass., USA). Also suitable are homogenizers such as models MS18, MS45 and MC120 Series homogenizers available from the APV Homogenizer Division of APV Gaulin, Inc. (Wilmington, Mass., USA). Other suitable homogenizers are commercially available and will be apparent to those skilled in the art given the benefit of the present disclosure. Typically, carbon black in water prepared in accordance with the above described system will have at least about 90% agglomerates less than about 30 microns, more preferably at least about 90% agglomerates less than about 20 microns in size. Preferably, the carbon black is broken down to an average size of 5-15 microns, e.g., about 9 microns. Exit port 38 passes the carbon black slurry from the homogenizer to the mixing zone through feed line 16. The slurry may reach 10,000 to 15,000 psi in the homoginizer step and exit the homoginizer at about 600 psi or more. Preferably, a high carbon black content is used to reduce the task of removing excess water or other carrier. Typically, about 10 to 30 weight percent carbon black is preferred. Those skilled in the art will recognize, given the benefit of this disclosure, that the carbon black content (in weight percent) of the slurry and the slurry flow rate to the mixing zone should be coordinated with the natural rubber latex flow rate to the mixing zone to achieve a desired carbon black content (in phr) in the masterbatch. The carbon black content will be selected in accordance with known principles to achieve material characteristics and performance properties suited to the intended application of the product. Typically, for example, carbon blacks of CTAB value 10 or more are used in sufficient amount to achieve carbon black, content in the masterbatch of at least about 30 phr.

The slurry preferably is used in masterbatch production immediately upon being prepared. Fluid conduits carrying the slurry and any optional holding tanks and the like, should establish or maintain conditions which substantially preserve the dispersion of the carbon black in the slurry. That is, substantial reaglomeration or settling out of the particulate filler in the slurry should be prevented or reduced to the extent reasonably practical. Preferably all flow lines, for example, are smooth, with smooth line-to-line interconnections. Optionally, an accumulator is used between the homogenizer and the mixing zone to reduce fluctuations in pressure or velocity of the slurry at the slurry nozzle tip in the mixing zone.

Natural rubber latex fluid or other elastomer latex fluid passed to the mixing zone via feed line 12 and carbon black slurry fed to the mixing zone via feed line 16 under proper process parameters, as discussed above, can produce a novel elastomer composite, specifically, elastomer masterbatch crumb. Means may also be provided for incorporating various additives into the elastomer masterbatch. An additive fluid comprising one or more additives may be fed to the mixing zone as a separate feed stream. One or more additives also may be pre-mixed, if suitable, with the carbon black slurry or, more typically, with the elastomer latex fluid. Additives also can be mixed into the masterbatch subsequently, e.g., by dry mixing techniques. Numerous additives are well known to those skilled in the art and include, for example, antioxidants, antiozonants, plasticizers, processing aids (e.g., liquid polymers, oils and the like), resins, flame-retardants, extender oils, lubricants, and a mixture of any of them. The general use and selection of such additives is well known to those skilled in the art. Their use in the system disclosed here will be readily understood with the benefit of the present disclosure. In accordance with certain alternative embodiments, curative also can be incorporated in like manner, to produce a curable elastomer composite which may be referred to as a curable base compound.

The mixing zone/coagulum zone assembly is discussed in more detail below. The elastomer masterbatch crumb is passed from the discharge end of coagulum reactor 14 to suitable drying apparatus. In the preferred embodiment of FIG. 1 the masterbatch crumb undergoes multi-stage drying. It is passed first to a de-watering extruder 40 and then via conveyor or simple gravity drop or other suitable means 41 to a drying extruder 42. In routine preferred embodiments consistent with that illustrated in FIG. 1 producing natural rubber masterbatch with carbon black filler, the de-watering/drying operation will typically reduce water content to about 0 to 1 weight percent, more preferably 0.0 to 0.5 weight percent. Suitable dryers are well known and commercially available, including for example, extruder dryers, fluid bed dryers, hot air or other oven dryers, and the like, such as French Mills available from the French Oil Machinery Co., (Piqua, Ohio, USA).

Dried masterbatch crumb from drying extruder 42 is carried by a cooling conveyor 44 to a baler 46. The baler is an optional, advantageous feature of the apparatus of FIG. 1, wherein the dried masterbatch crumb is compressed within a chamber into form-stable compressed blocks or the like. Typically, 25 to 75 pound quantities of the elastomer masterbatch are compressed into blocks or bales for transport, further processing, etc. Alternatively, the product is provided as pellets, for example, by chopping the crumb.

Figure 2:
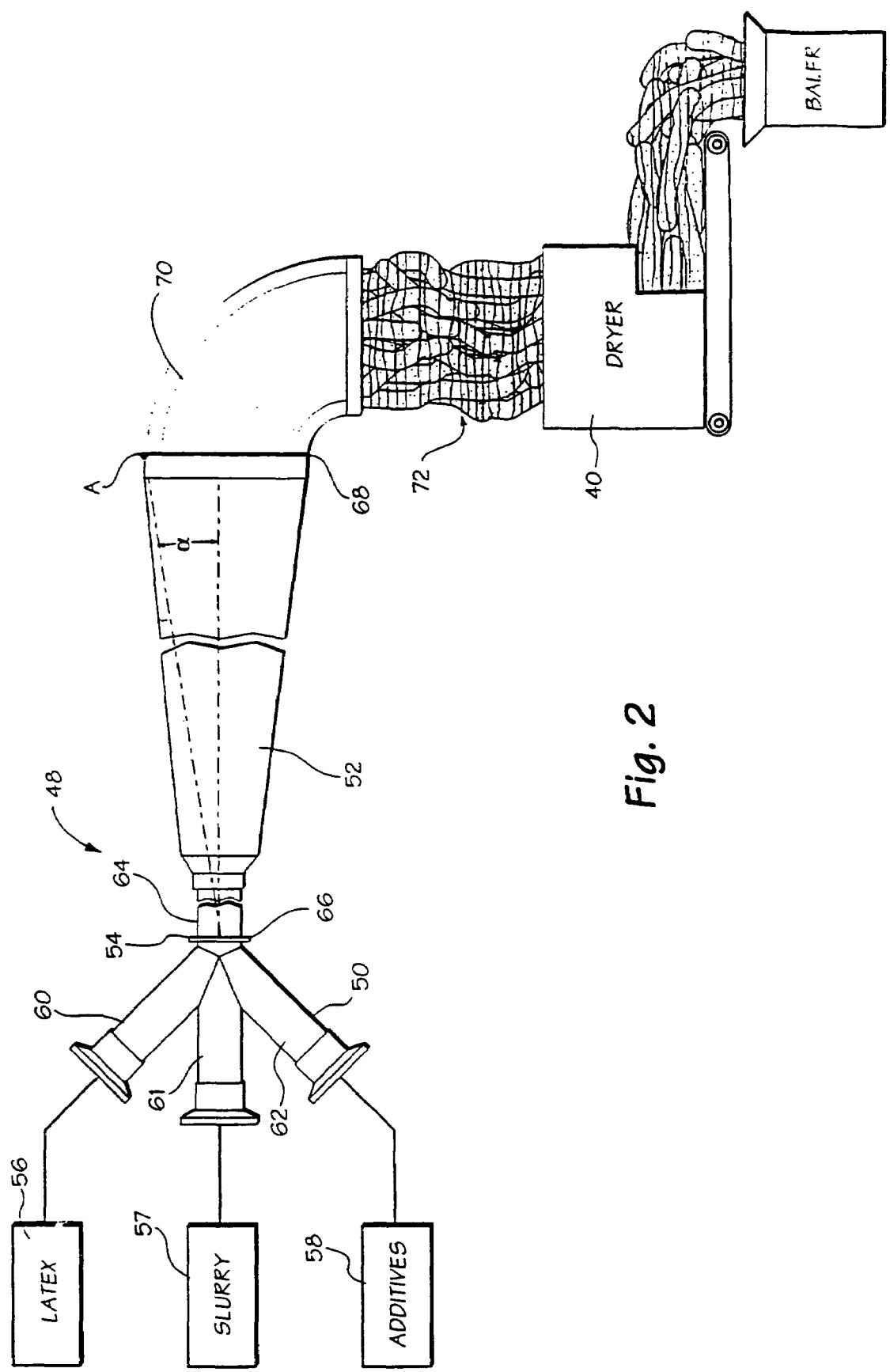
FIG. 2 is an elevation view, partly schematic, of a preferred embodiment consistent with the schematic flow chart illustration of FIG. 1.

The dimensions and particular design features of the coagulum reactor 14, including the mixing zone/coagulum zone assembly, suitable for an embodiment in accordance with FIG. 1, will depend in part on such design factors as the desired throughput capacity, the selection of materials to be processed, etc. One preferred embodiment is illustrated in FIG. 2 wherein a coagulum reactor 48 has a mix head 50 attached to a coagulum zone 52 with a fluid-tight seal at joint 54. FIG. 2 schematically illustrates a first subsystem 56 for feeding elastomer latex to the mixing zone, subsystem 57 for feeding carbon black slurry or other particulate filler fluid to the mixing zone, and subsystem 58 for feeding an optional additive fluid, pressurized air, etc. to the mixing zone. The mix head 50 is seen to have three feed channels 60, 61, 62. Feed channel 60 is provided for the natural rubber latex fluid and feed channel 62 is provided for direct feed of gas and/or additive fluid. In connection with preferred embodiments employing direct injection of additives, significant advantage is achieved in connection with hydrocarbon additives or, more generally, non-water miscible additives. While it is well known to employ emulsion intermediates to create additive emulsions suitable for pre-blending with an elastomer latex, preferred embodiments in accordance with the present disclosure employing direct injection of additives can eliminate not only the need for emulsion intermediates, but also the equipment such as tanks, dispersing equipment, etc. previously used in forming the emulsions. Reductions in manufacturing cost and complexity can, therefore, be achieved. As discussed further below, the feed channel 61 through which slurry is fed to the mixing zone is preferably coaxial with the mixing zone and the coagulum zone of the coagulum reactor. While only a single feed channel is shown to receive the elastomer latex fluid, any suitable number of feed channels may be arranged around the central feed channel through which the slurry is fed to the mixing zone. Thus, for example, in the embodiment of FIG. 2 a fourth feed channel could be provided through which ambient air or high pressure air or other gas is fed to the mixing zone. Pressurized air may be injected likewise with the slurry through the central axial feed channel 61. Auxiliary feed channels can be temporarily or permanently sealed when not in use.

The coagulum zone 52 of the coagulum reactor 48 is seen to have a first portion 64 having an axial length which may be selected depending upon design objectives for the particular application intended. Optionally, the coagulum zone may have a constant cross-sectional area over all or substantially all of its axial length. Thus, for example, the coagulum reactor may define a simple, straight tubular flow channel from the mixing zone to the discharge end. Preferably, however, for reasons discussed above, and as seen in the preferred embodiment illustrated in the drawings, the cross-sectional area of the coagulum zone 52 increases progressively from the entry end 66 to discharge end 68. More specifically, the cross-sectional area increases in the longitudinal direction from the entry end to the discharge end. In the embodiment of FIG. 2, the coagulum zone increases in cross-sectional area progressively in the sense that it increases continuously following constant cross-sectional portion 64. References to the diameter and cross-sectional area of the coagulum reactor (or, more properly, the coagulum zone defined within the coagulum reactor) and other components, unless stated otherwise, are intended to mean the cross-sectional area of the open flow passageway and the inside diameter of such flow passageway.

Elastomer composite, specifically, coagulated elastomer latex in the form of masterbatch crumb 72, is seen being discharged from the coagulum reactor 48 through a diverter 70. Diverter 70 is an adjustable conduit attached to the coagulum reactor at discharge end 68. It is adjustable so as to selectively pass the elastomer masterbatch crumb 72 to any of various different receiving sites. This feature advantageously facilitates removal of masterbatch crumb from the product stream, for example, for testing or at the beginning of a production run when initial process instability may result temporarily in inferior product. In addition, the diverter provides design flexibility to direct product from the coagulum reactor to different post-processing paths. In accordance with the preferred embodiment of FIG. 1, the masterbatch crumb 72 being discharged from coagulum reactor 48 through diverter 70 is seen to be received by a drier 40.

The cross-sectional dimension of coagulum reactor 48 is seen to increase at an overall angle α between entry end 66 and discharge end 68. Angle α is greater than 0° and in preferred embodiments is less than 45°, more preferably less than 15°, most preferably from 0.5° to 5°. The angle α is seen to be a half angle, in that it is measured from the central longitudinal axis of the coagulum zone to a point A at the outer circumference of the coagulum zone at the end of the coagulum reactor. In this regard, it should be understood that the cross-sectional area of the upstream portion of the coagulum reactor, that is, the portion near the entry end 66, preferably increases sufficiently slowly to achieve quasi-molding of the coagulum in accordance with the principles discussed above. Too large an angle of expansion of the coagulum zone may result in the elastomer masterbatch not being produced in desirable crumb form of globules or worms and simply spraying through the coagulum reactor. Increasing the bore of the coagulum reactor too slowly can result, in certain embodiments, in backup or clogging of the feeds and reaction product into the mix head. In a downstream portion of the coagulum zone, wherein the latex has been substantially coagulated and flow has become essentially plug flow, the coagulum zone may extend either with or without increase in cross-sectional area. Thus, reference here to the coagulum zone in preferred embodiments having a progressively increasing cross-sectional area should be understood to refer primarily to that portion of the coagulum zone wherein flow is not substantially plug flow.

The cross-sectional area of the coagulum zone (that is, at least the upstream portion thereof as discussed immediately above) may increase in step-wise fashion, rather than in the continuous fashion illustrated in the embodiment of FIG. 2. In the embodiment illustrated in FIG. 3, a continuous flow system for production of elastomer masterbatch in accordance with the method and apparatus disclosed here, is seen to include a mix head/coagulum zone assembly wherein the cross-sectional area of the coagulum zone increases in step-wise fashion. Preferably, the individual sections of the coagulum zone in such a step-wise embodiment have a faired connection to adjacent sections. That is, they combine to form a smooth and generally continuous coagulum zone surface, as opposed, for example, to a sharp or instantaneous increase in diameter from one section to the next. The coagulum zone of FIG. 3 increases in three steps, such that there are four different sections or sub-zones 74-77. Consistent with the design principles discussed immediately above, the cross-sectional area of coagulum zone 53 increases from the entry end 66 to point A at the discharge end 68 at an overall angle which achieves the necessary flow control in the upstream portion of the coagulum reactor. The first section 74 can be taken as including (a) the constant diameter portion of the mix head 50 immediately downstream of the mixing zone, and (b) the same or similar diameter portion connected thereto at joint 54 at the entry end 66. This first section has a constant cross-sectional diameter $D_1$ and an axial dimension or length $L_1$. In this first section 74 the length $L_1$ should be greater than three times the diameter $D_1$, more preferably greater than five times $D_1$, and most preferably from about 12 to 18 times $D_1$. Typically, this section will have a length of about fifteen times $D_1$. Each subsequent section preferably has a constant cross-sectional dimension and cross-sectional area approximately double that of the preceding (i.e., upstream) section. Thus, for example, section 75 has a constant cross-sectional dimension and a cross-sectional area which is twice that of section 74. Similarly, the cross-sectional area of section 76 is double that of section 75, and the cross-sectional area of section 77 is double that of section 76. In each of sections 75-77, the length is preferably greater than three times its diameter, more preferably about three to seven times its diameter and generally about five times its diameter. Thus, for example, in section 76 longitudinal dimension $L_3$ is preferably about five times its diameter $D_3$.

Figure 3:
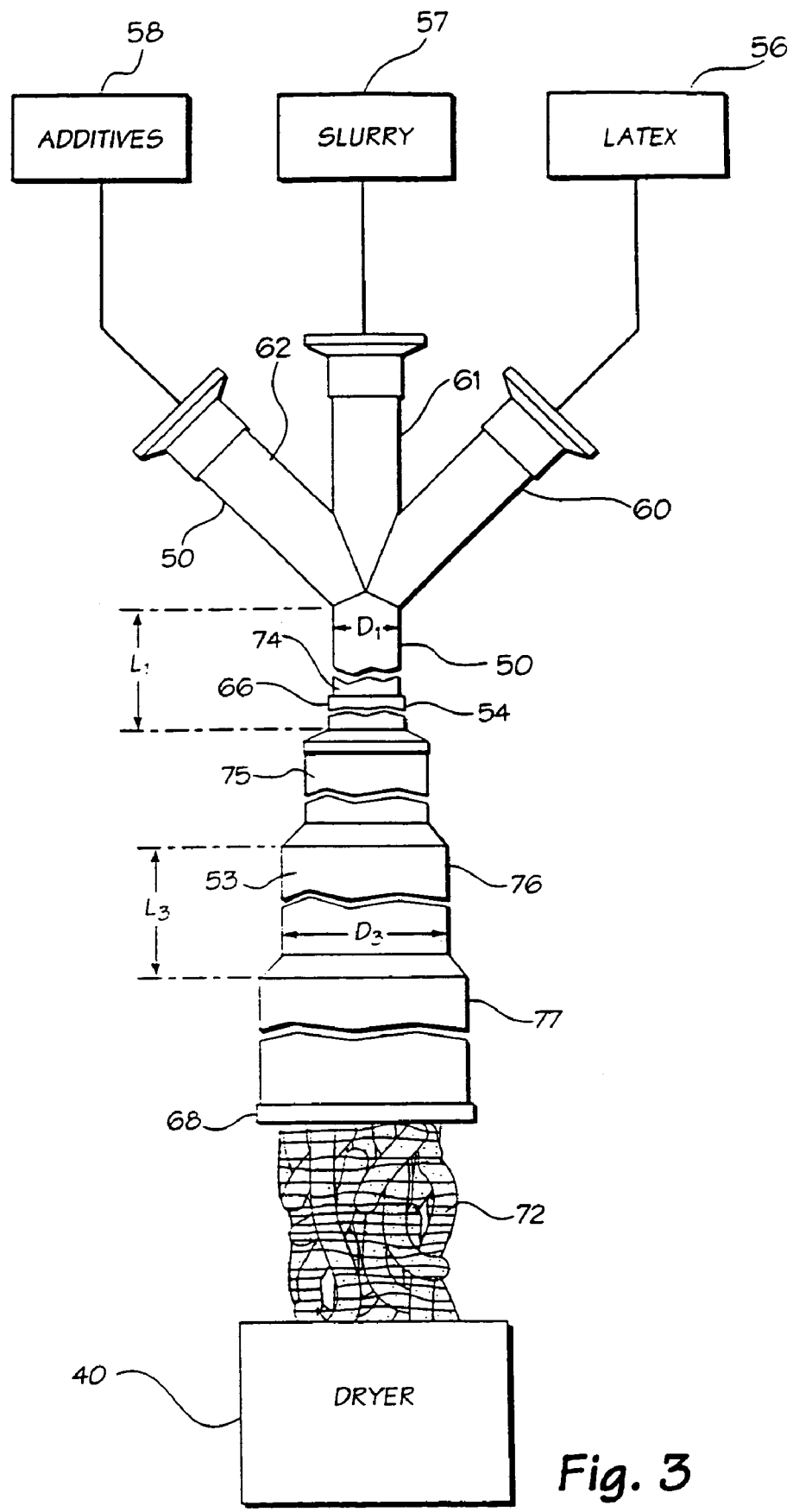
FIG. 3 is an elevation view, partially schematic, of an alternative preferred embodiment consistent with the schematic flow chart illustration of FIG. 1.
Figure 4:
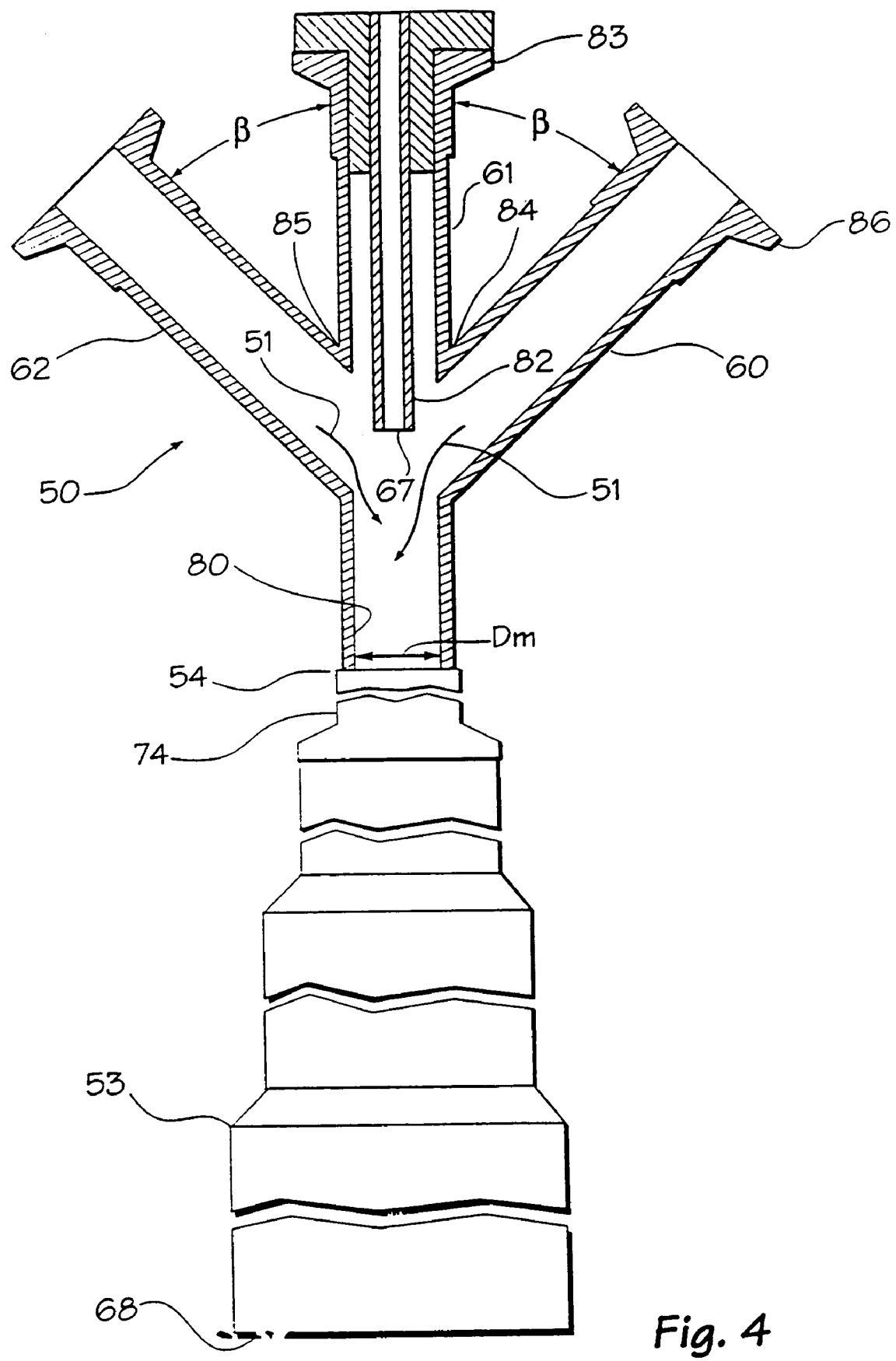
FIG. 4 is an elevation view, partially in section, of the mix head/coagulum reactor assembly of the embodiment of FIG. 3.

A mix head and coagulum zone assembly corresponding to the embodiment of FIG. 3 is shown in FIG. 4 partially in section view. Mix head 50 is integral with coagulum zone extender 53 via joint 54. It defines a mixing zone wherein multiple feed channels 60, 61, 62 form a junction, with an elongate, substantially cylindrical channel 80 substantially coaxial with the coagulum zone portion within extender 53. It will be recognized that it is not essential to the operability of the method and apparatus disclosed here, to precisely define the boundaries of the mixing zone and/or coagulum zone. Numerous variations are possible in the design of the flow channels junction area, as will be apparent to those skilled in the art given the benefit of the present disclosure. In that regard, as a generally preferred guideline, in embodiments of the type illustrated in FIG. 4, for example, the slurry tip 67 generally is upstream of the beginning of cylindrical portion 80, being approximately centered longitudinally in the junction of the feed channels. In such embodiments, preferably, the minimum cross-sectional area defined by the imaginary cone from the slurry tip 67 to the circumferential perimeter at the beginning of the cylindrical portion 80 is advantageously greater than, or at least equal to, the cross-sectional area of the latex feed channel 60. Preferably, both channel 80 and at least the upstream portion of the coagulum zone wherein flow turbulence exists prior to substantially complete coagulation of the elastomer latex, have a circular cross-section.

The means for feeding carbon black slurry or other particulate filler fluid is seen to comprise a feed tube 82 extending substantially coaxially with the mixing chamber to an opening or slurry nozzle tip 67 which is open toward the coagulum zone. This is a highly advantageous feature of the preferred embodiments discussed here. The carbon black slurry, as noted above, is fed to the mixing zone at very high velocity relative the feed velocity of the latex, and the axial arrangement of narrow bore feed tube 82 results in excellent development of flow turbulence. The diameter $D_m$ of the channel 80 (which, as noted above, is preferably substantially equal to the diameter $D_1$ of immediately following portion of section 74 of the coagulum zone) preferably is at least twice the inside diameter of slurry feed tube 82, more preferably about four to eight times the diameter of feed tube 82, typically about seven to eight times that diameter. Feed tube 82 is seen to form a fluid-tight seal with the entry port 83 at the upstream end of feed channel 61 of mix head 50. The diameter of the axial feed tube 82 is determined largely by the required volumetric flow rate and axial velocity of the slurry as it passes through the slurry nozzle tip 67 into the mixing chamber. The correct or required volume and velocity can be readily determined by those skilled in the art given the benefit of this disclosure, and will be a function, in part, of the concentration and choice of materials. Embodiments such as that illustrated and disclosed here, wherein the feed tube for the carbon black slurry is removable, provide desirable flexibility in manufacturing different masterbatch compositions at different times. The feed tube used in one production run can be removed and replaced by a larger or smaller bore tube appropriate to a subsequent production. In view of the pressure and velocity at which the slurry exits the feed tube, it may be referred to as a spray or jet into the mixing zone. This should be understood to mean in at least certain embodiments, high speed injection of the slurry into an area already substantially filled with fluid. Thus, it is a spray in the sense of its immediate distribution as it passes through the slurry nozzle tip, and not necessarily in the sense of free-flying material droplets in a simple spreading trajectory.

The additional feed channels 60 and 62 are seen to form a junction 84, 85, respectively, with feed channel 60 and downstream channel 80 at an angle $\beta$. The angle $\beta$ may in many embodiments have a value from greater than 0° to less than 180°. Typically, $\beta$ may be, for example, from 30°-90°. It is desirable to avoid a negative pressure, that is, cavitation of the latex fluid as it is entrained by the high velocity slurry exiting at slurry nozzle tip 67, since this may disadvantageously cause inconsistent mixing leading to inconsistent masterbatch product. Air or other gas can be injected or otherwise fed to the mixing zone to assist in breaking any such vacuum. In addition, an expanded feed line for the natural rubber latex leading to the entry port 86 of feed channel 60 is desirable to act as a latex fluid reservoir. In the preferred embodiment of FIG. 4, latex feed channel 60 intersects the mixing zone adjacent slurry nozzle tip 67. Alternatively, however, the latex feed channel can intersect the mixing channel upstream or downstream of the slurry nozzle tip 67.

The carbon black slurry or other particulate filler fluid typically is supplied to feed tube 82 at a pressure above about 300 psig, such as about 500 to 5000 psig, e.g. about 1000 psig. Preferably the liquid slurry is fed into the mixing zone through the slurry nozzle tip 67 at a velocity above 100 ft. per second, preferably about 100 to about 800 ft. per second, more preferably about 200 to 500 ft. per second, for example, about 350 feet per second. Arrows 51 in FIG. 4 represent the general direction of flow of the elastomer latex and auxiliary feed materials through feed channels 60 and 62 into the channel 80 below slurry nozzle tip 67. Thus, the slurry and latex fluids are fed to the mixing zones at greatly different feed stream velocities, in accordance with the numbers set forth above. While not wishing to be bound by theory, it presently is understood that the differential feed achieves latex shear conditions in the mixing zone leading to good macro-dispersion and coagulation.

Figure 5:
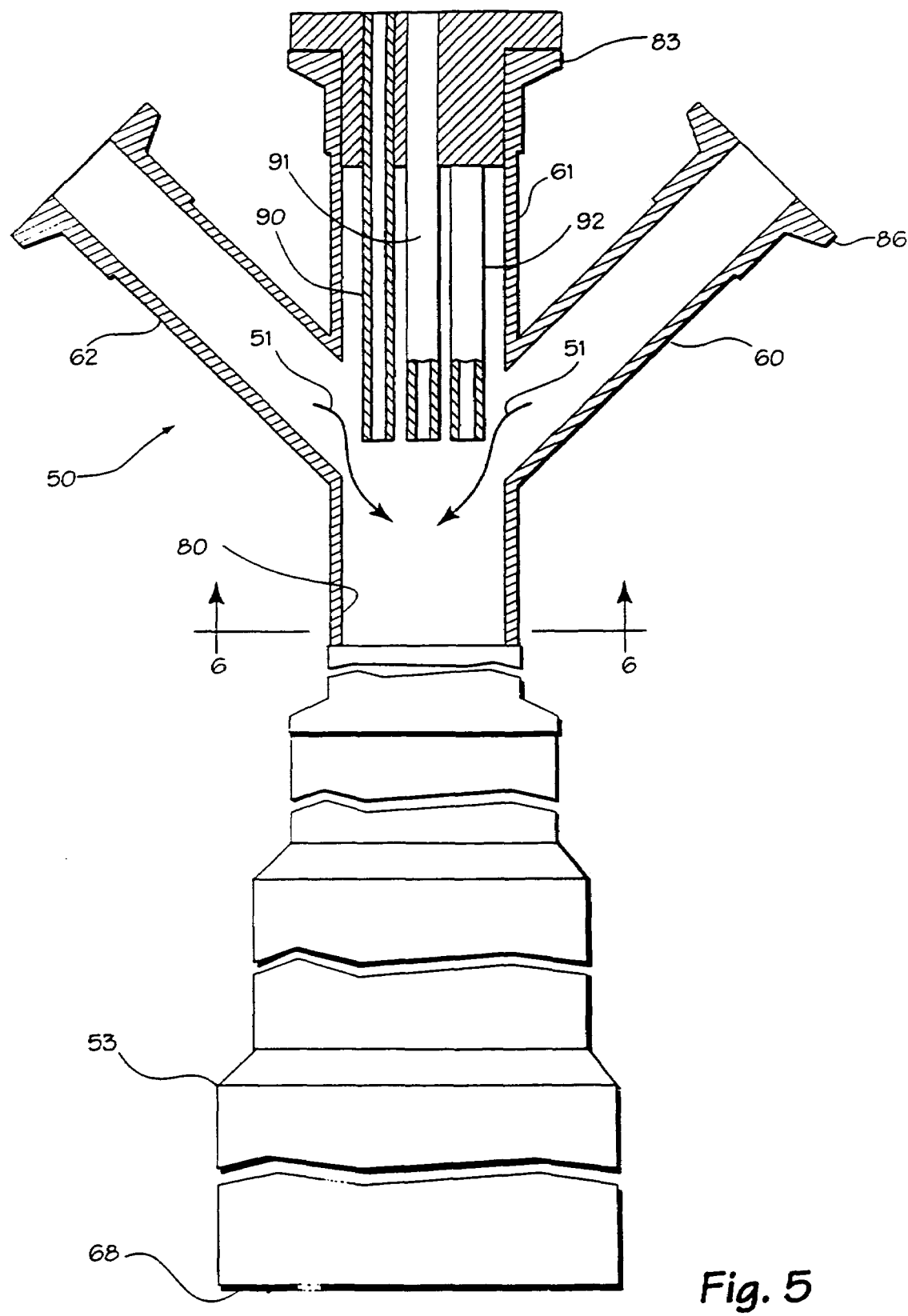
FIG. 5 is an elevation view, partially in section, corresponding to the view of FIG. 4, illustrating an alternative preferred embodiment.
Figure 6:
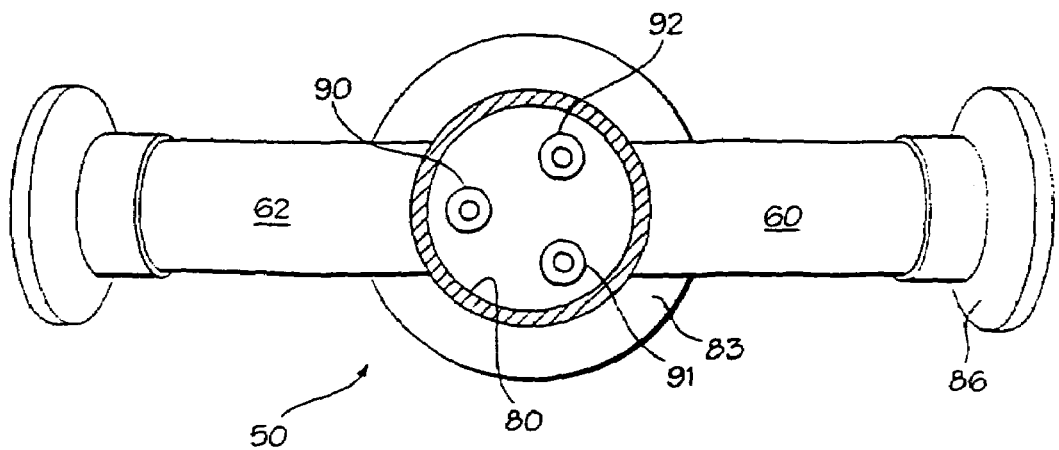
FIG. 6 is a section view taken through line 6-6 of FIG. 5.

An alternative preferred embodiment is illustrated in FIGS. 5 and 6 wherein the single axial feed tube 82 in the embodiment of FIG. 4 is replaced by multiple axially extending feed tubes 90-92. Even greater numbers of feed tubes may be employed, for example, up to about 6 or 8 axially-extending feed tubes. Advantageously, production flexibility is achieved by using different feed tubes of different diameter for production of different formulations. Also, multiple feed tubes can be used simultaneously to achieve good flow turbulence within the mixing zone and coagulum zone of the coagulum reactor.

Figure 7:
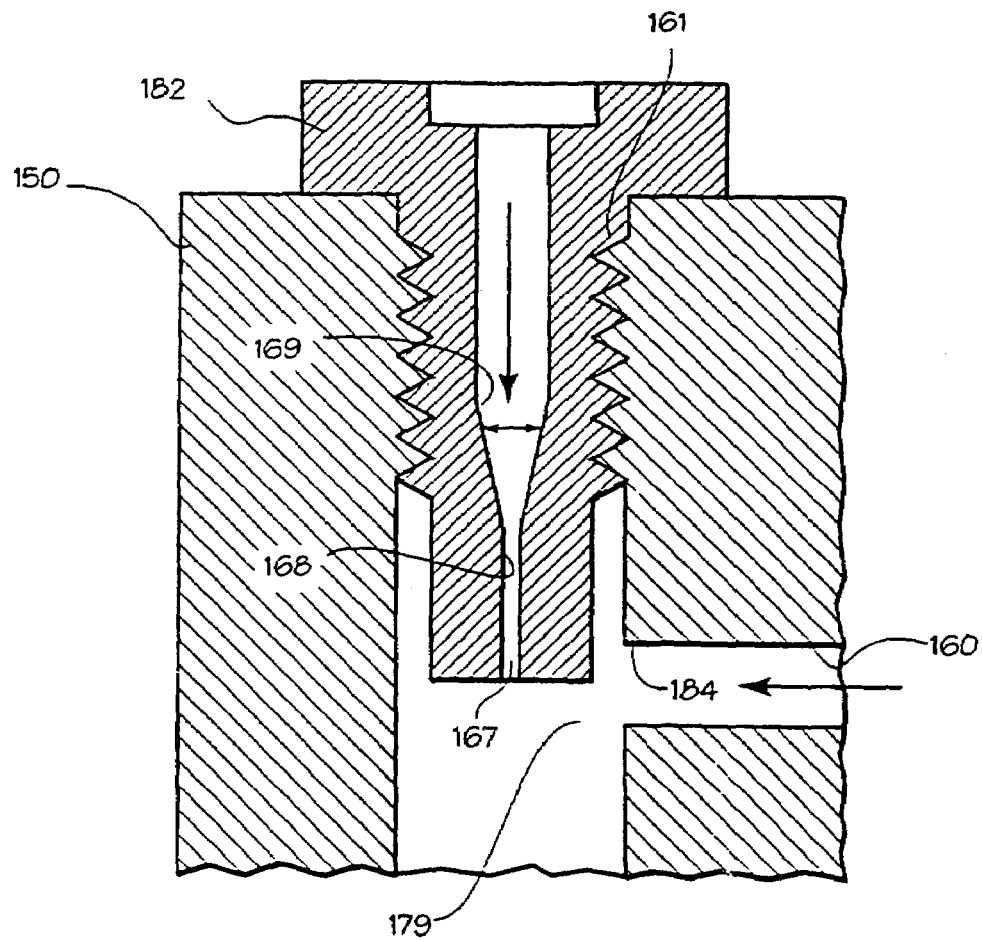
FIG. 7 is a section view of a mix head suitable for use in an alternative preferred embodiment.

An alternative embodiment of the mix head is illustrated in FIG. 7. Mix head 150 is seen to define a mixing zone 179. An axial feed channel 161 receives a feed tube 182 adapted to feed carbon black slurry or other particulate filler fluid at high velocity into the mixing chamber 179. It can be seen that the central bore in feed tube 182 terminates at slurry nozzle tip 167. A constant diameter nozzle land 168 is immediately upstream of slurry nozzle tip 167, leading to a larger bore area 169. Preferably the axial dimension of land 168 is about 2 to 6, e.g. about 5, times its diameter. A second feed channel 160 forms a junction 184 with the mixing zone 179 at a 90° angle for feeding elastomer latex fluid to the mixing zone. The cross-sectional diameter of the latex fluid feed channel 160 is substantially larger than the cross-sectional diameter of the slurry nozzle tip 167 and land 168. Without wishing to be bound by theory, the axial elongation of nozzle land 168, coupled with the expanded diameter bore section upstream of the nozzle land, is believed to provide advantageous stability in the flow of slurry through feed tube 182 into the mixing zone 179. The bore of feed tube 182 is found to function well with a 20° chamfer, that is, conical area 169 which expands in the upstream direction at about a 20° angle. Downstream of mixing zone 179 is an elongate coagulum zone. Consistent with the principles discussed above, such coagulum zone need be only marginally elongate. That is, its axial dimension need be only marginally longer than its diameter. Preferably, however, a progressively enlarged coagulum zone is used.

As discussed above, coagulation of the elastomer masterbatch is substantially complete at or before the end of the coagulum reactor. That is, coagulation occurs within the coagulum zone of the coagulum reactor without the necessity of adding a stream of coagulant solution or the like. This does not exclude the possibility that some initial coagulation occurs in the mixing zone. The mixing zone may be considered an extended portion of the coagulum zone for this purpose. Also, reference to substantially complete coagulation prior to the elastomer masterbatch exiting the coagulum reactor is not meant to exclude the possibility of subsequent processing and follow-on treatment steps, for any of various purposes appropriate to the intended use of the final product. In that regard, substantially complete coagulation in preferred embodiments of the novel method disclosed here employing natural rubber latex means that at least about 95 weight percent of the rubber hydrocarbon of the latex is coagulated, more preferably at least about 97 weight percent, and most preferably at least about 99 weight percent is coagulated.

The method and apparatus disclosed and described here produce elastomer composites having excellent physical properties and performance characteristics. Novel elastomer composites of the present invention include masterbatch compositions produced by the above-disclosed method and apparatus, as well as intermediate compounds and finished products made from such masterbatch compositions. Notably, elastomer masterbatch can be produced using natural rubber latex (latex concentrate or field latex), along with various grades of carbon black filler, having excellent physical properties and performance characteristics. Carbon blacks presently in broad commercial use for such application as tire tread have been used successfully, as well as carbon blacks heretofore considered unsuitable for commercial use in known production apparatus and methods. Those unsuitable because their high surface area and low structure rendered them impractical to achieve acceptable levels of macro-dispersion at routine commercial loading levels for the carbon black and/or to preserve the molecular weight of the elastomer are highly preferred for the novel elastomeric masterbatch compositions disclosed here. Such elastomer composites are found to have excellent dispersion of the carbon black in the natural rubber, together with good preservation of the molecular weight of the natural rubber. Moreover, these advantageous results were achieved without the need for a coagulation step involving a treatment tank or stream of acid solution or other coagulant. Thus, not only can the cost and complexity of such coagulant treatments be avoided, so too the need to handle effluent streams from such operations.

Prior known dry mastication techniques could not achieve equal dispersion of such fillers without significant molecular weight degradation and, therefore, could not produce the novel natural rubber masterbatch compositions made in accordance with certain preferred embodiments of the present invention. In that regard, novel elastomer composites are disclosed having excellent macro-dispersion of the carbon black in the natural rubber, even of carbon blacks having a structure to surface area ratio DBPA:CTAB less than 1.2 and even less than 1.0, with high molecular weight of the natural rubber. Known mixing techniques in the past did not achieve such excellent macro-dispersion of carbon black without significant molecular weight degradation of the natural rubber and, therefore, did not produce the novel masterbatch compositions and other elastomer composites of the present invention. Preferred novel elastomer masterbatch compositions in accordance with this disclosure, having carbon black macro-distribution levels not heretofore achieved, can be used in place of prior known masterbatch having poorer macro-dispersion. Thus, masterbatch disclosed here can be incorporated into cured compounds in accordance with known techniques. Such novel cured compounds are found in preferred embodiments to have physical characteristics and performance properties generally comparable to, and in some instances significantly better than, those of otherwise comparable cured compounds comprising masterbatch of poorer macro-dispersion. Masterbatch can be produced in accordance with the present invention, however, with reduced mixing time, reduced energy input, and/or other cost savings.

Particularly with respect to certain preferred embodiments, natural rubber latex and carbon black filler masterbatch can be produced having excellent physical characteristics and performance properties. Excellent macro-dispersion of the carbon black is achieved, even using carbon blacks of exceptionally high surface area and low structure, without the degree of degradation of the natural rubber which would be caused by dry mastication for sufficient time and at sufficient intensity levels to achieve the same degree of carbon black dispersion. Especially advantageous in this regard are novel natural rubber masterbatch compositions wherein a high degree of dispersion is achieved, using carbon blacks having structure to surface area ratio, DBPA:CTAB of less than 1.2 and even less than 1.9. As used here, the carbon black structure can be measured as the dibutyl phthalate adsorption (DBPA) value, expressed as cubic centimeters of DBPA per 100 grams carbon black, according to the procedure set forth in ASTM D2414. The carbon black surface area can be measured as CTAB expressed as square meters per gram of carbon black, according to the procedure set forth in ASTM D3765-85. Novel natural rubber masterbatch is achieved, therefore, having heretofore unachievable combinations of physical characteristics such as molecular weight distribution and filler dispersion levels, and/or incorporating heretofore unsuitable fillers such as carbon black of extraordinarily high surface area and low structure. The dispersion quality of natural rubber masterbatch produced in accordance with the methods and apparatus disclosed here can be demonstrated with reference to the well known characteristics of $MW_{sol}$ (weight average) and macro-dispersion. Specifically, the macro-dispersion level in masterbatch produced in accordance with preferred embodiments is significantly better than that in masterbatch of approximately equal $MW_{sol}$ produced using dry mastication. Most notably, the dispersion quality of these preferred embodiments does not depend significantly on the morphology of the carbon black filler. It will be recognized that other factors affecting the level of dispersion achievable using the method and apparatus disclosed here, include the concentration of the carbon black in the slurry, total energy input into the slurry and energy input during mixing of the fluid streams, etc.

The macro-dispersion quality of carbon black in natural rubber masterbatch disclosed here is significantly better than that in previously known masterbatch of approximately equal $MW_{sol}$ (weight average). In some preferred embodiments of novel elastomer composites, excellent carbon black distribution is achieved with $MW_{sol}$ approximately that of natural rubber in the field latex state, (e.g., approximately 1,000,000) a condition not previously achieved. The dispersion quality advantage is especially significant in the above mentioned preferred embodiments using carbon black with low structure and high surface area, e.g., DBPA less than 110 cc/100 g, CTAB greater than 45 to 65 m²/g, and DBPA:CTAB less than 1.2 and preferably less than 1.0.

EXAMPLES

Test Procedures
  The following test procedures were used in the examples and comparisons presented below.
1. Bound Rubber. A sample weighing 0.5 g.±0.025 g. is weighed and placed in 100 ml. toluene in a sealed flask and stored at ambient temperature for approximately 24 hours. The toluene is then replaced with 100 ml. fresh toluene and the flask is stored for 4 days. The sample is then removed from the solvent and air-dried under a hood at ambient temperature for 24 hours. The sample is then further dried in a vacuum oven at ambient temperature for 24 hours. The sample is then weighed and the bound rubber is calculated from the weight loss data.
2. $MW_{sol}$: As used in this disclosure and in the claims, $MW_{sol}$ refer to weight average molecular weight of the sol portion of the natural rubber. Standard GPC techniques for molecular weight measurement were followed in accordance with the following:
  2.1 Two 10 μm 10⁶ Å columns, a 10 μm 500 Å column and a loom mixed bed column from Polymer Laboratories, UK.
  2.2 UV detection at 215 nm.
  2.3 Solvent: Tetra hydro furan (THF)
  2.4 Concentration, nominally 2 mg/ml in THF.
  2.5 Samples are left to dissolve in THF for 3 days, stabilized with BHT.
  2.6 Solutions are centrifuged to separate any gel and the supernatant is injected onto the column.
  2.7 Sample Preparations Sample preparation is designed to prepare sol concentrations in the range of 0.5 to 0.05 percent by weight to provide a good detector response for accurate measurement of the molecular weight distribution. Depending on the filler loading, sample weight is adjusted according to the following formula:

sample wt.=(100+filler loading(phr))*20/100 mg+/−2 mg

Samples are placed in UV protected vials and dissolved in 4 mL of stabilized tetrahydrofuran (THF) containing 0.02% butylated-hydroxyltoluene (BHT) for three days. The supernatant from the dissolution step, containing mostly the sol portion, is transferred to Teflon centrifuge tubes and centrifuged in an Avanti 30 (Beckman) centrifuge for 60 minutes at 26,000 revolutions per minute (corresponding to a maximum field strength of 57,500 g). At this field strength, a majority of the gel phase sediments allowing a gel-free supernatant. This gel-free solution is diluted at 1:5, again using stabilized THF. At this point, the samples are transferred to GPC vials and placed inside a Waters 717 Auto-Sampler (Water Corporation, Milford, Mass., USA) in preparation for the GPC testing.

Molecular Weight Determination The weight average molecular weight of the sol portion $MW_{sol}$ is then determined. Using Millenium software (available from Waters Corporation, Milford, Mass., USA) a baseline is defined using a valley-to-valley mode within the time increments of 15 and 35 minutes. This time increment is appropriate for the column set described above in paragraph 2.1 with the mobile phase flow rate set at 0.75 mL/min. Once a reasonable baseline is established the distribution can be determined. The elution time is converted to molecular weight. Polystyrene solutions made from commercially available standards (EasiCal: Polymer Laboratories, U.K.) are prepared containing a series of molecular weights with very narrow distributions. The conversion of polystyrene molecular weight to polyisoprene molecular weight equivalents is based on the universal calibration method of Benoit and coworkers. The hydrodynamic radius is proportional to the product of the molecular weight times the intrinsic viscosity. After converting the polystyrene molecular weights to polyisoprene equivalents, the calibration curve relates absolute molecular weight to elution time. The standards are run under conditions identical to the samples, and the standards are integrated to assign the appropriate molecular weight for a given elution time, based on a best fit to the standards data. Once the time based distribution is properly converted to molecular weight, the appropriate molecular weight averages are calculated by the Waters' Millenium software.

3. Mooney Viscosity: Standard procedures were followed for ML (1+4)@100° C.

4. Test Sample Cure Conditions: Test pieces were cured to 150° C. for the time periods indicated below:
   4.1 Tensile Sheet: 20 min.
   4.2 Resilience: 23 min.
   4.3 Hardness: 23 min.
   4.4 Heat Build-Up: 25 min.

5. Dispersion: The Cabot Dispersion Chart method is used with subjective evaluation of 50x optical micrographs. (ASTM D2663 Method).

6. Stress-Strain: Tested to BS903:A2 and ISO 37.

7. Hardness: Tested to ISO 48 (1994), temperature 23° C.

8. Resilience: Tested to BS903:A8 (1990), Method A, temperature 23° C. (8 mm molded disc test piece).

9. Heat Buildup: Tested to ASTM D623, Method A.
   9.1 Start temperature: 23° C.
   9.2 Static load: 24 lbs.
   9.3 Stroke: 0.225 inches.
   9.4 Frequency: 30 Hz.
   9.5 Run for 30 minutes.

10. Tan δ: Measured on Rheometrics® model RDS II. Reported values are maximums from strain sweeps. Strain sweeps at 0°, 30°, and 60° C., 1 Hz, and 0.1% to 60% strain.

11. Crack Growth Resistance: Measured in accordance with ASTM D3629-94

Example A

Elastomer masterbatch was produced in accordance with the present invention. Specifically, an elastomer masterbatch was produced comprising standard natural rubber field latex from Malaysia with 52.5 phr filler consisting of carbon black of commercial grade N234 available from Cabot Corporation. The properties of the natural rubber field latex are provided in Table 1 below.

TABLE 1

Natural Rubber Latex Properties

| Additives | % Dry Rubber | % Total Solids | % Ash | Nitrogen ppm | Volatile Fatty Acid | ML(1 + 4) @ 100 C. |
|---|---|---|---|---|---|---|
| 0.15% HNS[a] 0.3% NH3, ZnO, TMTD[b] | 28.4 | 34.2 | 0.38 | 0.366 | 0.052 | 68 |

[a]HNS: hydroxylamine neutral sulfate, Mooney viscosity stabilizer.
[b]ZnO/TMTD: used for biological preservation, typically 0.025% of 1:1 mixture.

The full compound formulation is set forth in Table 2 below, and is representative of a commercial truck tire tread known to have excellent resistance to reversion during cure.

TABLE 2

Masterbatch Formulation

| Ingredient | Parts by Wt. |
|---|---|
| Rubber | 100 |
| Carbon Black | 52.5 |
| ZnO | 4.0 |
| Stearic acid | 2.0 |
| 6PPD (antioxidant) | 2.0 |
| Sunproof Improved (wax) | 2.0 |
| Ennerflex 74 (aromatic oil) | 3.0 |
| Total | 165.5 |

The elastomer masterbatch production apparatus was substantially identical to the apparatus described above with reference to FIGS. 1 and 7 of the drawings. The slurry nozzle tip (see reference No. 167 in FIG. 7) was 0.039 inch diameter with a land (see reference No. 168 in FIG. 7) having an axial length of 0.2 inch. The coagulum zone was 0.188 inch diameter and had 0.985 inch axial length of constant diameter between the mixing zone and its discharge end. Preparation of the masterbatch is described in further detail immediately below.

1. Carbon Black Slurry Preparation. Bags of carbon black were mixed with deionized water in a carbon black slurry tank equipped with an agitator. The agitator broke the pellets into fragments and a crude slurry was formed with 12.5 wt. % carbon black. During operation, this slurry was continually pumped by an air diaphragm pump to a colloid mill for initial dispersion. The slurry was then fed by a progressing cavity pump to a homogenizer, specifically, a model M3 homogenizer from APV Gaulin, Inc. The homogenizer produced a finely ground slurry. The slurry flow rate from the homogenizer to the mixing zone was set by the homogenizer speed, the homogenizer acting as a high-pressure positive displacement pump. Slurry flow rate was monitored with a Micromotion®g mass flow meter. The carbon black slurry was fed to the homogenizer at a pressure ranging from 50 to 100 psig and the homogenization pressure was set at 4000 psig, such that the slurry was introduced as a jet into the mixing zone at a flow rate of 4.1 to 4.4 lb/min and at a velocity of about 130 ft/sec.

2. Latex Delivery. The latex was charged to a 100 gallon pressurized feed tank. Antioxidant emulsion was added to the latex prior to charging. Antioxidants were added consisting of 0.3 phr tris nonyl phenyl phosphite (TNPP) and 0.4 phr Santoflex® 134 (alkyl-aryl p-phenylene diamine mixture). Each of the antioxidants was prepared as a 15 wt. % emulsion using 3 parts potassium oleate per 100 parts antioxidant along with potassium hydroxide to adjust the emulsion to a pH of approximately 10. Also, 3 phr extender oil was added. Air pressure (51 psig) was used to move the latex from the feed tank to the mixing zone of the coagulum reactor. The latex flow rate was 3.2 to 3.4 lbs/min and about 3.8 feet per second, and was automatically metered and controlled with a Micromotion® mass flow meter and a rubber tube pinch valve. The desired carbon black loading of a 52.5 phr was obtained by maintaining proper ratio of the latex feed rate to the carbon black slurry feed rate.

3. Carbon Black and Latex Mixing. The carbon black slurry and latex were mixed by entraining the latex into the carbon black slurry. During entrainment, the carbon black was intimately mixed into the latex and the mixture coagulated. Soft, wet spongy "worms" of coagulum exited the coagulum reactor.

4. Dewatering. The wet crumb discharged from the coagulum reactor was about 79%-water. The wet crumb was dewatered to about 5 to 10% moisture with a dewatering extruder (The French Oil Mill Machinery Company; 3½ in. diameter). In the extruder, the wet crumb was compressed and water squeezed from the crumb and through a slotted barrel of the extruder.

5. Drying & Cooling. The dewatered crumb dropped into a second extruder where it was again compressed and heated. Water was flashed off upon expulsion of the crumb through the dieplate of the extruder. Product exit temperature was approximately 300° F. and moisture content was about 0.5 to 1 wt. %. The hot, dry crumb was rapidly cooled (approximately 20 seconds) to about 100° F. by a forced air vibrating conveyor. The resulting dry crumb had about 66. wt. % rubber solids and about 33. wt. % carbon black.

Example B

A control masterbatch was prepared by dry mastication. The control employed the same formulation as Example A (see Table 2 above), except that the natural rubber was SMR 10 rather than latex. It was prepared by premastication of the rubber in a OOC Banbury mixer (approximately 3 kg) at 50 rpm using 10 phr carbon black. The premastication was performed for approximately 3 min. to a total of 800 MJ/m³.

Comparisons of Example A and Example B

The masterbatch of Example A and the control masterbatch of Example B were compounded in a two-stage mixing operation in a OOC Banbury mixer (approximately 3 kg). Table 3 below sets forth the mixing schedule for the first stage. It can be seen that the Example A masterbatch followed a modified mixing schedule.

TABLE 3

Stage 1 Mixing Schedules

| Time (min) | Example A | Example B Dry Mix Control |
|---|---|---|
| 0.0 | All ingredients | Pre-Masticated Rubber |
| 0.5 | | Carbon Black and Oil |
| 1.0 | Sweep | |
| 1.5 | | Remaining Ingredients |
| 2.0 | | |
| 2.5 | | Sweep |
| 3.0 | | |
| X | dump at approx. 700 MJ/m³ | dump at approx. 1,000 MJ/m³ |

In the second stage, curatives listed in Table 4 below were added with a further mixing cycle of 500 MJ/m³.

TABLE 4

Final Stage Curative Addition

| Ingredient | Parts by Wt. |
|---|---|
| Stage 1 compound | 165.5 |
| Goodyear Winstay 100 (antioxidant) | 1.0 |
| TBBS (sulfur accelerator) | 1.8 |
| Sulfur | 1.0 |
| Total | 169.3 |

Thus, Banbury mixing energy for the compounding of Example A masterbatch was about 53% of the Banbury mixing energy required for the premastication and compounding of the control material of Example B. Despite the reduced energy input, the Example A material was found to have very good macro-dispersion, and the molecular weight (weight average) of its sol portion $MW_{sol}$ was substantially higher than that of the control. These data are summarized in Table 5 below.

TABLE 5

Compounding and Curing Data

| | Mix Energy (MJ/m³) | | | | ML (1 + 4, 100 C.) | | MW |
|---|---|---|---|---|---|---|---|
| Sample | Pre-Masticate | Stage 1 | Final | Total | Stage 1 | Final | wt. av. |
| Example A | 0 | 694 | 500 | 1,194 | 102 | 72 | 444,900 |
| Example B | 800 | 965 | 500 | 2,265 | 92 | 67 | 327,000 |

Additional testing results for the cured (unaged) Example A and control material are set forth in Table 6 below.

TABLE 6

Additional Test Data

| Sample | Hardness | 100% Modulus (MPa) | 300% Modulus (MPa) | Tensile (MPa) |
|---|---|---|---|---|
| Example A | 71 | 2.82 | 16.1 | 28.7 |
| Example B | 72 | 3.12 | 16.2 | 28.5 |

| Sample | Elongation at Break (%) | Resiliance (%) | Heat Build-Up (°C.) | Max Tan Delta 60° C. | Max Tan Delta 30° C. | Max Tan Delta 0° C. |
|---|---|---|---|---|---|---|
| Example A | 526 | 56.5 | 70.5 | 0.203 | 0.240 | 0.290 |
| Example B | 511 | 57.6 | 76.5 | 0.206 | 0.236 | 0.286 |

Example C

Elastomer masterbatch was produced in accordance with the present invention. Specifically, an elastomer masterbatch was produced comprising standard natural rubber field latex from Malaysia with 55 phr filler consisting of carbon black of commercial grade Regal® 660 available from Cabot Corporation. The compound formulation (excluding minor ordinary latex additives) is set forth in Table 7 below.

TABLE 7

Masterbatch Formulation

| Ingredient | Parts by Wt. |
|---|---|
| Rubber | 100 |
| Carbon Black | 55. |
| Santoflex 134 (antioxidant) | 0.4 |
| TNPP (antioxidant) | 0.3 |
| Total | 155.7 |

The elastomer masterbatch production apparatus was substantially identical to the apparatus described above with reference to FIGS. 1, 3 and 7 of the drawings. The slurry nozzle tip (see reference No. 167 in FIG. 7) was 0.025 inch diameter with a land (see reference No. 168 in FIG. 7) having an axial length of 0.2 inch. The coagulum zone (see No. 53 in FIG. 3) included a first portion of 0.188 inch diameter and approximately 0.985 inch axial length (being partly within the mix-head and party within the extender sealed thereto); a second portion of 0.266 inch diameter and 1.6 inch axial length; a third portion of 0.376 inch diameter and 2.256 axial length; and a fourth portion of 0.532 inch diameter and 3.190 inch axial length. In addition, there are axially short, faired interconnections between the aforesaid portions. Preparation of the masterbatch is described in further detail immediately below.

1. Carbon Black Slurry Preparation. Bags of carbon black were mixed with deionized water in a carbon black slurry tank equipped with an agitator. The agitator broke the pellets into fragments and a crude slurry was formed with 14.9 wt. % carbon black. The crude slurry was recirculated using a pipeline grinder. During operation, this slurry was continually pumped by an air diaphragm pump to a colloid mill for initial dispersion. The slurry was then fed by a progressing cavity pump to a homogenizer, specifically, Microfluidizer Model M210 from Microfluidics International Corporation for pressurizing and shear, to produce a finely ground slurry. The slurry flow rate from the microfluidizer to the mixing zone was set by the microfluidizer speed, the microfluidizer acting as a high-pressure positive displacement pump. Slurry flow rate was monitored with a Micromotion® mass flow meter. The carbon black slurry was fed to the microfluidizer at a pressure of about 130 psig and the output pressure was set at 3000 psig to an accumulator set at 450 psig output pressure, such that the slurry was introduced as a jet into the mixing zone at a flow rate of about 3.9 lb/min and at a velocity of about 300 ft/sec.

2. Latex Delivery. The latex was charged to a tank, specifically, a 55 gallon feed drum. Antioxidant emulsion was added to the latex prior to charging. Antioxidants were added consisting of 0.3 phr tris nonyl phenyl phosphite (TNPP) and 0.4 phr Santoplex® 134 (alkyl-aryl p-phenylene diamine mixture). Each of the antioxidants was prepared as a 40 wt. % emulsion using 4 parts potassium oleate per 100 parts antioxidant along with potassium hydroxide to adjust the emulsion to a pH of approximately 10. A peristaltic pump was used to move the latex from the feed tank to the mixing zone of the coagulum reactor. The latex flow rate was 3.2 to 3.3 lbs/min and about 3.9 feet per second, and was metered with a Endress+Hauser (Greenwood, Ind., USA) mass flow meter. The desired carbon black loading of a 55 phr was obtained by maintaining proper ratio of the latex feed rate to the carbon black slurry feed rate.

3. Carbon Black and Latex Mixing. The carbon black slurry and latex were mixed by entraining the latex into the carbon black slurry. During entrainment, the carbon black was intimately mixed into the latex and the mixture coagulated. Soft, wet spongy "worms" of coagulum exited the coagulum reactor.

4. Dewatering The wet crumb discharged from the coagulum reactor was about 78% water. The wet crumb was dewatered to about 12 to 13% moisture with a dewatering extruder (The French Oil Mill Machinery Company; 3½ in. diameter). In the extruder, the wet crumb was compressed and water squeezed from the crumb and through a slotted barrel of the extruder.

5. Drying & Cooling. The dewatered crumb dropped into a second extruder where it was again compressed and heated. Water was flashed off upon expulsion of the crumb through the dieplate of the extruder. Product exit temperature was approximately 280° F. to 370° F. and moisture content was about 0.3 to 0.4 wt. %. The hot, dry crumb was rapidly cooled (approximately 20 seconds) to about 100° F. by a forced air vibrating conveyor.

Examples D and E

Two dry mix control masterbatches were prepared by dry mastication. The controls employed the same formulation as Example C (see Table 7 above), except that in Example D the rubber was RSS1 NR rather than latex. In Example E the rubber was SMR 10 NR. Each was prepared by premastication of the rubber in a BR Banbury mixer. The rubber of Example D was masticated at 118 rpm for 10 minutes. The rubber of Example E was masticated at 77 rpm for 4 minutes.

Comparison of Examples C, D and E

The masterbatch of Example C and the two control masterbatches of Example D and E were compounded in a BR Banbury mixer. Table 8 below sets forth the compounding schedules.

TABLE 8

Compounding Schedules

| Masterbatch | Pre-Mastication | Stage I Mixing | Stage II (Final) Mixing |
|---|---|---|---|
| Example C | No | No | BR Banbury 77 rpm, 4.5 min. |
| Example D | BR Banbury mixer 118 rpm, 10 min. | BR Banbury mixer 77 rpm, 3 min. | BR Banbury 77 rpm, 4.5 min. |
| Example E | BR Banbury mixer 77 rpm, 4 min. | BR Banbury mixer 77 rpm, 8 min. | BR Banbury 77 rpm, 4.5 min. |

The compounding formulation is given in Table 9 below.

TABLE 9

Stage II Curative Addition

| Ingredient | Parts by Wt. |
|---|---|
| Example 4 Masterbatch or Example 5 or 6 Stage 1 Dry Mix | 155 |
| Azo 66 (zinc oxide) | 4.0 |
| Hystrene 5016 (stearic acid) | 2.0 |
| Santoflex 13 (antioxidant) | 2.0 |
| Sunproof Improved (wax) | 2.0 |
| Wingstay 100 (antioxidant) | 1.0 |
| Santocure NS (sulfur accelerator) | 1.8 |
| Sulfur | 1.0 |
| Total: | 168.8 |

All three compounds exhibited well-behaved cure with minimal reversion. Despite the reduced energy input, the Example C material was found to have significantly better macro-dispersion than the dry mix controls, and the molecular weight (weight average) of its sol portion $MW_{sol}$ was substantially higher than that of the controls. These data are summarized in Table 10 below.

TABLE 10

Masterbatch and Compound Properties

| | Example C | Example D | Example E |
|---|---|---|---|
| Masterbatch Properties | | | |
| Mooney Viscosity ML(1 + 4) @ 100 C. | 125 | 124 | 126 |
| Bound Rubber (%) | 50 | 32 | 44 |
| MW sol (×10⁻⁶) | 0.678 | .466 | .463 |
| Percent Undispersed Area (D %) | .12 | 1.48 | 2.82 |
| Compound Properties | | | |
| Hardness | 62 | 65 | 62 |
| 100% Modulus (psi) | 239 | 315 | 270 |
| 300% Modulus (psi) | 1087 | 1262 | 1216 |
| Tensile strength (psi) | 4462 | 4099 | 4344 |
| Elongation, % | 675 | 591 | 600 |
| Max. Tan Delta @ 60 C. (Strain Sweep) | 0.189 | .237 | .184 |
| Crack Growth Rate (cm/per million cycles) | 0.8 | 5.0 | 5.8 |

Additional Examples and Comparisons

Highly preferred elastomer composites in accordance with the present invention were produced in accordance with the method and apparatus disclosed above. In particular, novel masterbatch compositions were formed of natural rubber latex and carbon black filler, having significantly better macro-dispersion levels and/or natural rubber molecular weight than heretofore found in known compositions formed of the same or similar starting materials. FIG. 8 shows the surface area and structure of various carbon black fillers used in these preferred masterbatch compositions, specifically, the CTAB surface area expressed as square meters per gram of carbon black per ASTM D3765-85 and dibutyl phthalate absorption (DBPA) value expressed as cubic centimeters of DBP per hundred grams carbon black per ASTM D2414 are shown. FIG. 8 is seen to be divided into three different regions of carbon blacks. Region I contains carbon blacks having lower structure and higher surface area, being those most difficult to disperse in natural rubber and other elastomers using traditional dry mixing techniques. Hence, carbon blacks of Region I are not used commercially as widely as other carbon blacks. Masterbatch and cured elastomeric compositions made with Region I carbon blacks using traditional dry mixing techniques have poorer macro-dispersion and typically lower $MW_{sol}$. The carbon blacks of Region II have higher structure than those of Region I. Typically, they achieve reasonably good dispersion in natural rubber for vehicle tire products and the like if subjected to such extended dry mixing that the $MW_{sol}$ of the natural rubber is significantly degraded. The carbon blacks of Region III of FIG. 8 have lower surface area relative their structure. Accordingly they have been used with acceptable dispersion in natural rubber via dry mixing, but again, with undesirable degradation of $MW_{sol}$. The dispersion of carbon blacks of all three regions of FIG. 8, specifically, macro-dispersion, is significantly improved in the elastomer composites disclosed here, and can be achieved with significantly higher $MW_{sol}$ of the natural rubber in accordance with preferred embodiments.

Control Samples 1-443

Control samples of masterbatch were prepared by dry mixing in accordance with the following procedures, for purposes of comparison to elastomer composites of the present invention.

1. Mastication of Natural Rubber

In order to produce dry masterbatches with a wide range of molecular weight, commercial natural rubber (RSS1, SMR CV, and SMR 10) bales were pre-masticated in a BR banbury mixer using the following conditions (fill factor: 0.75):

TABLE 11

Natural Rubber Mastication Conditions

| Sample Code | Mastication | Rotor Speed (rpm) | Cooling Water | Mastication time (min.) |
|---|---|---|---|---|
| M1 | No | | | |
| M2 | Yes | 77 | On | 4 |
| M3 | Yes | 118 | On | 6 |
| M4 | Yes | 118 | On | 10 |

2. Mixing Carbon Black with Pre-Masticated Natural Rubber

In order to prepare natural rubber dry masterbatches with different levels of macro-dispersion quality, the following mixing procedures were used in a BR Banbury mixer. The fill factor was 0.70. The masterbatch ingredients and mixing procedures are described as follows in Table 12.

TABLE 12

Natural Rubber Dry Masterbatch Formulation

| Ingredient | phr (Parts per hundred parts of rubber by weight) |
|---|---|
| Natural Rubber | 100 |
| Carbon Black | See Tables Below |
| Oil | See Tables Below |
| Santofex (antioxidant) | 0.4 |
| TNPP (antioxidant) | 0.3 |

Mixing Procedures:
0 minute: Add pre-masticated natural rubber (77 rpm, 45 C.)
1 minute: Add black, oil and antioxidants Different levels of macro-dispersion were produced by dry mixing samples of M1 through M4 pre-masticated natural rubber for different mixing times, as shown in Table 13, below. For example, sample code M2D1 in Table 13 indicates a control sample of premasticated natural rubber M2 (see Table 11, above) mixed for 10 minutes in accordance with the formulation of Table 12.

TABLE 13

Mixing Times

| Dry NR Masterbatch Sample Code | Pre-Masticated NR | Mixing Time |
|---|---|---|
| M1D4 | M1 | 4 |
| M1D3 | M1 | 6 |
| M1D2 | M1 | 8 |
| M1D1 | M1 | 10 |
| M2D4 | M2 | 4 |
| M2D3 | M2 | 6 |
| M2D2 | M2 | 8 |
| M2D1 | M2 | 10 |
| M3D4 | M3 | 4 |
| M3D3 | M3 | 6 |
| M3D2 | M3 | 8 |
| M3D1 | M3 | 10 |
| M4D4 | M4 | 4 |
| M4D3 | M4 | 6 |
| M4D2 | M4 | 8 |
| M4D1 | M4 | 10 |

3. Final Mixing of Natural Rubber Masterbatch Control Samples

To evaluate compound performance, additional ingredients were added to the dry masticated natural rubber masterbatch control samples of Table 13 in accordance with the formulation shown in Table 14.

TABLE 14

Additional Ingredients for Final Mixing

| Ingredient | Amount (phr) |
|---|---|
| Azo 66 (zinc oxide) | 4.0 |
| Hystere 5016 (stearic acid) | 2.0 |
| Santoflex 13 (antioxidant) | 2.0 |
| Sunproof Improved (wax) | 2.0 |
| Wingstay 100 (antioxidant) | 1.0 |
| Santocure NS (sulfur accelerator) | 1.8 |
| Sulfur | 1.0 |

The compounds were cured in accordance with standard cure techniques at 150° C. until at least substantially completely cured, typically between 10 and 30 minutes. In that regard, the same or substantially the same final mixing procedures, including the formulation given above in Table 14, were used for all control samples, as well as all samples of elastomer composites of the invention prepared in the manner described below (see "Preferred Embodiments Examples") which were cured and tested for compound properties and performance characteristics.

The following tables 15-23 set forth the sol molecular weight $MW_{sol}$ and macro-dispersion D(%) of control samples 1 through 443. The samples are grouped in the tables according to choice of carbon black. Within a given table, the samples are grouped by choice of natural rubber and by carbon black loading and oil loading. The table headings show this information in accordance with standard nomenclature. Thus, for example, the heading for Table 15 "N330/55 phr/0" indicates 55 phr N330 carbon black with no oil. The table sub-headings show the choice of natural rubber. Specifically, control samples 1 through 450 are seen to be made from standard grade natural rubber RSS1, SMRCV and SMR10. Technical description of these natural rubbers is widely available, such as in Rubber World Magazine's Blue Book published by Lippincott and Peto, Inc. (Akron, Ohio, USA). The molecular weight $MW_{sol}$ of the natural rubber prior to any premastication (M1) and after the various amounts of premastication (M2-M4) also are shown below in Tables 15-23.

TABLE 15

| | N330/55 phr/0 | | | | | |
|---|---|---|---|---|---|---|
| | RSS1 | | | SMRCV | | |
| Code | Sample No. | $Mw_{sol}$ (K) | D (%) | Sample No. | $Mw_{sol}$ (K) | D (%) |
| M1 | | 1300 | | | 971 | |
| M2 | | 932 | | | 725 | |
| M3 | | 664 | | | 596 | |
| M4 | | 485 | | | 482 | |
| M1D1 | 1 | 465 | 4.24 | 17 | 426 | 4.35 |
| M1D2 | 2 | 571 | 3.70 | 18 | 467 | 3.89 |
| M1D3 | 3 | 706 | 4.79 | 19 | 486 | 4.86 |
| M1D4 | 4 | 770 | 4.52 | 20 | 535 | 4.78 |
| M2D1 | 5 | 445 | 3.66 | 21 | 380 | 2.44 |
| M2D2 | 6 | 490 | 2.68 | 22 | 398 | 3.71 |
| M2D3 | 7 | 512 | 3.68 | 23 | 433 | 4.30 |
| M2D4 | 8 | 581 | 3.93 | 24 | 498 | 5.81 |
| M3D1 | 9 | 373 | 1.33 | 25 | 342 | 3.79 |
| M3D2 | 10 | 402 | 2.50 | 26 | 358 | 4.35 |

TABLE 15-continued

| | N330/55 phr/0 | | | |
|---|---|---|---|---|
| | RSS1 | | SMRCV | |
| Code | Sample No. | $Mw_{sol}$ (K) | D (%) | Sample No. | $Mw_{sol}$ (K) | D (%) |

| Code | Sample No. | $Mw_{sol}$ (K) | D (%) | Sample No. | $Mw_{sol}$ (K) | D (%) |
|---|---|---|---|---|---|---|
| M3D3 | 11 | 407 | 2.98 | 27 | 371 | 5.55 |
| M3D4 | 12 | 452 | 3.35 | 28 | 408 | 5.01 |
| M4D1 | 13 | 311 | 3.63 | 29 | 311 | 3.66 |
| M4D2 | 14 | 337 | 3.40 | 30 | 325 | 5.31 |
| M4D3 | 15 | 362 | 5.03 | 31 | 344 | 5.91 |
| M4D4 | 16 | 382 | 5.23 | 32 | 369 | 5.67 |

TABLE 16

Black Pearl 800/55 phr/0

| | RSS1 | | | SMRCV | | |
|---|---|---|---|---|---|---|
| Code | Sample No. | $Mw_{sol}$ (K) | D (%) | Sample No. | $Mw_{sol}$ (K) | D (%) |
| M1 | | 1041 | | | 869 | |
| M2 | | 786 | | | 662 | |
| M3 | | 663 | | | 491 | |
| M4 | | 527 | | | 420 | |
| M1D1 | 113 | 507 | 12.20 | 129 | 418 | 5.15 |
| M1D2 | 114 | 551 | 15.10 | 130 | 482 | 4.94 |
| M1D3 | 115 | 700 | 10.20 | 131 | 515 | 6.93 |
| M1D4 | 116 | 786 | 5.72 | 132 | 583 | 8.74 |
| M2D1 | 117 | 420 | 5.65 | 133 | 403 | 2.60 |
| M2D2 | 118 | 441 | 6.50 | 134 | 438 | 2.74 |
| M2D3 | 119 | 549 | 7.70 | 135 | 434 | 2.83 |
| M2D4 | 120 | 606 | 5.88 | 136 | 530 | 3.88 |
| M3D1 | 121 | 387 | 3.26 | 137 | 366 | 2.38 |
| M3D2 | 122 | 409 | 2.98 | 138 | 378 | 2.83 |
| M3D3 | 123 | 456 | 3.61 | 139 | 399 | 3.04 |
| M3D4 | 124 | 483 | 4.61 | 140 | 431 | 2.39 |
| M4D1 | 125 | 339 | 2.13 | 141 | 311 | 2.22 |
| M4D2 | 126 | 367 | 2.23 | 142 | 332 | 2.27 |
| M4D3 | 127 | 360 | 2.60 | 143 | 344 | 2.27 |
| M4D4 | 128 | 403 | 1.96 | 144 | 390 | 2.73 |

TABLE 17

N351/33 phr/20 phr RSS1

| Code | Sample No. | $Mw_{sol}$ (K) | D (%) |
|---|---|---|---|
| M1 | | 1300 | |
| M2 | | 803 | |
| M3 | | 601 | |
| M1D1 | 401 | 854 | 2.08 |
| M1D2 | 402 | 969 | 3.41 |
| M1D3 | 403 | 1040 | 3.68 |
| M1D4 | 404 | 1130 | 4.91 |
| M2D1 | 405 | 648 | 1.15 |
| M2D2 | 406 | 668 | 2.16 |
| M2D3 | 407 | 675 | 2.98 |
| M2D4 | 408 | 721 | 4.70 |
| M3D1 | 409 | 532 | 1.10 |
| M3D2 | 410 | 537 | 2.17 |
| M3D3 | 411 | 535 | 2.45 |
| M3D4 | 412 | 558 | 4.06 |

TABLE 18A

Regal 250/55 phr/0

| | RSS1 | | | SMRCV | | |
|---|---|---|---|---|---|---|
| Code | Sample No. | $Mw_{sol}$ (K) | D (%) | Sample No. | $Mw_{sol}$ (K) | D (%) |
| M1 | | 1332 | | | 1023 | |
| M2 | | 896 | | | 748 | |
| M3 | | 603 | | | 581 | |
| M4 | | 408 | | | 504 | |
| M1D1 | 33 | 585 | 6.95 | 49 | 609 | 1.93 |
| M1D2 | 34 | 669 | 8.03 | 50 | 634 | 3.29 |
| M1D3 | 35 | 759 | 10.5 | 51 | 681 | 2.21 |
| M1D4 | 36 | 896 | 14.1 | 52 | 702 | 4.09 |
| M2D1 | 37 | 580 | 2.71 | 53 | 539 | 2.14 |
| M2D2 | 38 | 602 | 2.61 | 54 | 569 | 2.72 |
| M2D3 | 39 | 631 | 3.61 | 55 | 587 | 4.75 |
| M2D4 | 40 | 667 | 5.43 | 56 | 595 | 6.25 |
| M3D1 | 41 | 457 | 1.53 | 57 | 466 | 2.88 |
| M3D2 | 42 | 476 | 2.09 | 58 | 449 | 3.19 |
| M3D3 | 43 | 493 | 2.32 | 59 | 464 | 4.53 |
| M3D4 | 44 | 495 | 3.54 | 60 | 500 | 5.89 |
| M4D1 | 45 | 372 | 1.53 | 61 | 423 | 2.89 |
| M4D2 | 46 | 382 | 2.09 | 62 | 433 | 3.42 |
| M4D3 | 47 | 381 | 2.32 | 63 | 437 | 4.39 |
| M4D4 | 48 | 403 | 3.54 | 64 | 447 | 4.73 |

TABLE 18B

| | Regal 250/65/0 RSS1 | | | Regal 250/75/0 RSS1 | | | Regal 250/65/10 RSS1 | | |
|---|---|---|---|---|---|---|---|---|---|
| Code | Sample No. | $Mw_{sol}$ (K) | D (%) | Sample No. | $Mw_{sol}$ (K) | D (%) | Sample No. | $Mw_{sol}$ (K) | D (%) |
| M1 | | 1138 | | | 1138 | | | 1138 | |
| M2 | | 901 | | | 901 | | | 901 | |
| M3 | | 660 | | | 660 | | | 660 | |
| M4 | | 483 | | | 483 | | | 483 | |
| M1D1 | 65 | 570 | 1.50 | 81 | 539 | 2.87 | 97 | 661 | 1.89 |
| M1D2 | 66 | 622 | 3.25 | 82 | 624 | 4.50 | 98 | 702 | 2.69 |
| M1D3 | 67 | 707 | 7.50 | 83 | 685 | 4.17 | 99 | 741 | 3.14 |
| M1D4 | 68 | 788 | 4.77 | 84 | 763 | 14.35 | 100 | 822 | 5.24 |
| M2D1 | 69 | 534 | 1.62 | 85 | 484 | 4.32 | 101 | 593 | 0.91 |
| M2D2 | 70 | 548 | 4.19 | 86 | 512 | 2.96 | 102 | 572 | 3.48 |
| M2D3 | 71 | 585 | 4.31 | 87 | 557 | 4.71 | 103 | 642 | 4.23 |
| M2D4 | 72 | 621 | 6.21 | 88 | 605 | 4.85 | 104 | 664 | 5.35 |
| M3D1 | 73 | 459 | 3.64 | 89 | 429 | 2.27 | 105 | 507 | 2.65 |

TABLE 18B-continued

| | Regal 250/65/0 RSS1 | | | Regal 250/75/0 RSS1 | | | Regal 250/65/10 RSS1 | | |
|---|---|---|---|---|---|---|---|---|---|
| Code | Sample No. | $Mw_{sol}$ (K) | D (%) | Sample No. | $Mw_{sol}$ (K) | D (%) | Sample No. | $Mw_{sol}$ (K) | D (%) |
| M3D2 | 74 | 469 | 5.79 | 90 | 446 | 2.68 | 106 | 544 | 2.96 |
| M3D3 | 75 | 511 | 5.30 | 91 | 466 | 3.46 | 107 | 535 | 3.69 |
| M3D4 | 76 | 541 | 9.13 | 92 | 491 | 6.22 | 108 | 524 | 3.27 |
| M4D1 | 77 | 380 | 2.34 | 93 | 368 | 2.11 | 109 | 416 | 1.85 |
| M4D2 | 78 | 392 | 2.86 | 94 | 372 | 3.13 | 110 | 413 | 3.18 |
| M4D3 | 79 | 399 | 4.59 | 95 | 375 | 2.92 | 111 | 418 | 6.96 |
| M4D4 | 80 | 395 | 4.57 | 96 | 388 | 2.92 | 112 | 441 | 6.46 |

TABLE 19

| | N326/55 phr/0 | | | | | |
|---|---|---|---|---|---|---|
| | RSS1 | | | SMRCV | | |
| Code | Sample No. | $Mw_{sol}$ (K) | D (%) | Sample No. | $Mw_{sol}$ (K) | D (%) |
| M1 | | 1200 | | | 1060 | |
| M2 | | 1030 | | | 934 | |
| M3 | | 724 | | | 777 | |
| M4 | | 635 | | | 644 | |
| M1D1 | 145 | 550 | 3.49 | 161 | 644 | 1.15 |
| M1D2 | 146 | 636 | 3.54 | 162 | 661 | 1.32 |
| M1D3 | 147 | 650 | 5.89 | 163 | 697 | 1.35 |
| M1D4 | 148 | 724 | 4.79 | 164 | 732 | 2.01 |
| M2D1 | 149 | 517 | 3.16 | 165 | 590 | 1.50 |
| M2D2 | 150 | 572 | 2.41 | 166 | 621 | 1.56 |
| M2D3 | 151 | 613 | 3.11 | 167 | 641 | 2.22 |
| M2D4 | 152 | 696 | 4.37 | 168 | 676 | 2.31 |
| M3D1 | 153 | 489 | 2.78 | 169 | 551 | 1.22 |
| M3D2 | 154 | 521 | 1.93 | 170 | 550 | 1.62 |
| M3D3 | 155 | 504 | 3.14 | 171 | 563 | 2.06 |
| M3D4 | 156 | 538 | 2.81 | 172 | 578 | 2.68 |
| M4D1 | 157 | 415 | 1.74 | 173 | 487 | 1.96 |
| M4D2 | 158 | 447 | 2.17 | 174 | 495 | 2.22 |
| M4D3 | 159 | 466 | 3.13 | 175 | 505 | 2.99 |
| M4D4 | 160 | 469 | 2.93 | 176 | 526 | 3.37 |

TABLE 20

| | N110/55 phr/0 | | | | | |
|---|---|---|---|---|---|---|
| | RSS1 | | | SMRCV | | |
| Code | Sample No. | $Mw_{sol}$ (K) | D (%) | Sample No. | $Mw_{sol}$ (K) | D (%) |
| M1 | | 937 | | | 730 | |
| M2 | | 764 | | | 653 | |
| M3 | | 569 | | | 541 | |
| M4 | | 449 | | | 463 | |
| M1D1 | 369 | 360 | 1.24 | 385 | 334 | 1.28 |
| M1D2 | 370 | 426 | 2.50 | 386 | 339 | 1.60 |
| M1D3 | 371 | 490 | 2.69 | 387 | 372 | 1.42 |
| M1D4 | 372 | 618 | 4.68 | 388 | 413 | 2.80 |
| M2D1 | 373 | 340 | 0.69 | 389 | 309 | 0.72 |
| M2D2 | 374 | 356 | 0.85 | 390 | 314 | 1.17 |
| M2D3 | 375 | 395 | 0.90 | 391 | 342 | 1.27 |
| M2D4 | 376 | 433 | 1.17 | 392 | 380 | 2.94 |
| M3D1 | 377 | 295 | 0.81 | 393 | 271 | 0.94 |
| M3D2 | 378 | 313 | 1.27 | 394 | 292 | 0.93 |
| M3D3 | 379 | 333 | 1.20 | 395 | 314 | 1.43 |
| M3D4 | 380 | 353 | 1.35 | 396 | 351 | 1.77 |
| M4D1 | 381 | 255 | 1.12 | 397 | 260 | 0.74 |
| M4D2 | 382 | 269 | 1.14 | 398 | 267 | 0.93 |
| M4D3 | 383 | 287 | 1.30 | 399 | 284 | 1.49 |
| M4D4 | 384 | 316 | 1.67 | 400 | 297 | 1.83 |

TABLE 21(B)

| | S6740/55 phr/0 SMRCV | | |
|---|---|---|---|
| Code | Sample No. | $Mw_{sol}$ (K) | D (%) |
| M1 | | 876 | |
| M2 | | 754 | |
| M3 | | 574 | |
| M4 | | 444 | |
| M1D1 | 428 | 433 | 0.25 |
| M1D2 | 429 | 441 | 0.36 |
| M1D3 | 430 | 467 | 0.34 |
| M1D4 | 431 | 540 | 0.84 |
| M2D1 | 432 | 399 | 0.35 |
| M2D2 | 433 | 399 | 0.41 |
| M2D3 | 434 | 422 | 0.62 |
| M2D4 | 435 | 469 | 0.44 |
| M3D1 | 436 | 340 | 0.44 |
| M3D2 | 437 | 363 | 0.81 |
| M3D3 | 438 | 377 | 0.89 |
| M3D4 | 439 | 403 | 0.86 |
| M4D1 | 440 | 363 | 0.65 |
| M4D2 | 441 | 328 | 1.05 |
| M4D3 | 442 | 342 | 1.52 |
| M4D4 | 443 | 360 | 1.99 |

TABLE 21(A)

| | S6740/55 phr/0 RSS1 | | |
|---|---|---|---|
| Code | Sample No. | $Mw_{sol}$ (K) | D (%) |
| M1 | | 1080 | |
| M2 | | 837 | |
| M3 | | 724 | |
| M4 | | 532 | |
| M1D1 | 412 | 515 | 1.24 |
| M1D2 | 413 | 556 | 1.32 |
| M1D3 | 414 | 633 | 1.41 |
| M1D4 | 415 | 732 | 1.43 |
| M2D1 | 416 | 433 | 0.86 |
| M2D2 | 417 | 451 | 0.90 |
| M2D3 | 418 | 495 | 1.53 |
| M2D4 | 419 | 542 | 2.15 |
| M3D1 | 420 | 405 | 0.25 |
| M3D2 | 421 | 418 | 0.50 |
| M3D3 | 422 | 447 | 0.75 |
| M3D4 | 423 | 469 | 0.73 |
| M4D1 | 424 | 371 | 0.21 |
| M4D2 | 425 | 387 | 0.42 |
| M4D3 | 426 | 382 | 0.30 |
| M4D4 | 427 | 396 | 0.56 |

TABLE 22(A)

| | Regal 660/55 phr/0 | | | | | | | | |
|---|---|---|---|---|---|---|---|---|---|
| | RSS1 | | | SMRCV | | | SMR10 | | |
| Code | Sample No. | Mw$_{sol}$ (K) | D (%) | Sample No. | Mw$_{sol}$ (K) | D (%) | Sample No. | Mw$_{sol}$ (K) | D (%) |
| M1 | | 1110 | | | 836 | | | 746 | |
| M2 | | 844 | | | 709 | | | 632 | |
| M3 | | 609 | | | 584 | | | 492 | |
| M4 | | 522 | | | 513 | | | 416 | |
| M1D1 | 177 | 674 | 8.35 | 193 | 564 | 1.87 | 209 | 501 | 9.54 |
| M1D2 | 178 | 792 | 7.89 | 194 | 611 | 2.50 | 210 | 572 | 6.68 |
| M1D3 | 179 | 891 | 8.53 | 195 | 708 | 3.08 | 211 | 681 | 7.37 |
| M1D4 | 180 | 676 | 7.46 | 196 | 671 | 2.31 | 212 | 594 | 7.18 |
| M2D1 | 181 | 598 | 8.56 | 197 | 520 | 5.28 | 213 | 463 | 2.82 |
| M2D2 | 182 | 602 | 3.89 | 198 | 558 | 4.85 | 214 | 483 | 4.57 |
| M2D3 | 183 | 697 | 6.40 | 199 | 603 | 2.88 | 215 | 565 | 3.92 |
| M2D4 | 184 | 659 | 5.71 | 200 | 541 | 4.25 | 216 | 550 | 5.68 |
| M3D1 | 185 | 473 | 2.03 | 201 | 486 | 2.79 | 217 | 395 | 2.13 |
| M3D2 | 186 | 506 | 1.66 | 202 | 482 | 2.76 | 218 | 393 | 1.98 |
| M3D3 | 187 | 562 | 1.94 | 203 | 504 | 3.54 | 219 | 443 | 2.49 |
| M3D4 | 188 | 559 | 4.33 | 204 | 526 | 2.41 | 220 | 449 | 1.90 |
| M4D1 | 189 | 401 | 2.18 | 205 | 415 | 3.16 | 221 | 335 | 1.49 |
| M4D2 | 190 | 426 | 1.72 | 206 | 418 | 2.92 | 222 | 345 | 1.71 |
| M4D3 | 191 | 466 | 1.48 | 207 | 446 | 2.80 | 223 | 363 | 1.78 |
| M4D4 | 192 | 449 | 3.57 | 208 | 465 | 3.13 | 224 | 374 | 2.35 |

TABLE 22(B)

| | Regal 660/45/0 RSS1 | | | Regal 660/65/0 RSS1 | | | Regal 660/65/10 RSS1 | | |
|---|---|---|---|---|---|---|---|---|---|
| Code | Sample No. | Mw$_{sol}$ (K) | D (%) | Sample No. | Mw$_{sol}$ (K) | D (%) | Sample No. | Mw$_{sol}$ (K) | D (%) |
| M1 | | 1245 | | | 1245 | | | 1245 | |
| M2 | | 876 | | | 876 | | | 876 | |
| M3 | | 625 | | | 625 | | | 625 | |
| M4 | | 482 | | | 482 | | | 482 | |
| M1D1 | 225 | 646 | 3.45 | 241 | 563 | 14.55 | 257 | 639 | 1.63 |
| M1D2 | 226 | 697 | 3.04 | 242 | 638 | 14.09 | 258 | 699 | 3.55 |
| M1D3 | 227 | 762 | 7.70 | 243 | 691 | 13.64 | 259 | 814 | 5.44 |
| M1D4 | 228 | 830 | 6.75 | 244 | 790 | 11.26 | 260 | 764 | 11.25 |
| M2D1 | 229 | 574 | 4.79 | 245 | 469 | 5.88 | 261 | 572 | 2.77 |
| M2D2 | 230 | 589 | 3.02 | 246 | 507 | 7.31 | 262 | 580 | 4.39 |
| M2D3 | 231 | 636 | 6.41 | 247 | 558 | 9.72 | 263 | 610 | 5.51 |
| M2D4 | 232 | 675 | 6.55 | 248 | 543 | 10.59 | 264 | 638 | 7.29 |
| M3D1 | 233 | 471 | 2.66 | 249 | 420 | 5.48 | 265 | 474 | 4.10 |
| M3D2 | 234 | 481 | 5.17 | 250 | 426 | 6.97 | 266 | 485 | 5.72 |
| M3D3 | 235 | 510 | 7.78 | 251 | 468 | 8.81 | 267 | 502 | 6.24 |
| M3D4 | 236 | 518 | 7.89 | 252 | 471 | 9.55 | 268 | 495 | 7.13 |
| M4D1 | 237 | 388 | 3.20 | 253 | 335 | 5.19 | 269 | 390 | 5.02 |
| M4D2 | 238 | 392 | 5.65 | 254 | 344 | 6.06 | 270 | 365 | 5.88 |
| M4D3 | 239 | 397 | 5.14 | 255 | 344 | 5.59 | 271 | 410 | 7.45 |
| M4D4 | 240 | 403 | 7.54 | 256 | 361 | 8.54 | 272 | 388 | 7.59 |

TABLE 23(A)

| | N234/55 phr/0 | | | | | | | | |
|---|---|---|---|---|---|---|---|---|---|
| | RSS1 | | | SMRCV | | | SMR10 | | |
| Code | Sample No. | Mw$_{sol}$ (K) | D (%) | Sample No. | Mw$_{sol}$ (K) | D (%) | Sample No. | Mw$_{sol}$ (K) | D (%) |
| M1 | | 1060 | | | 845 | | | 743 | |
| M2 | | 811 | | | 712 | | | 621 | |
| M3 | | 595 | | | 577 | | | 445 | |
| M4 | | 466 | | | 477 | | | 388 | |
| M1D1 | 273 | 350 | 1.88 | 289 | 312 | 0.61 | 305 | 325 | 0.78 |
| M1D2 | 274 | 476 | 3.40 | 290 | 317 | 0.64 | 306 | 363 | 1.66 |
| M1D3 | 275 | 459 | 2.70 | 291 | 361 | 1.03 | 307 | 400 | 1.89 |
| M1D4 | 276 | 665 | 2.70 | 292 | 419 | 1.56 | 308 | 459 | 1.73 |

TABLE 23(A)-continued

N234/55 phr/0

| | RSS1 | | | SMRCV | | | SMR10 | | |
|---|---|---|---|---|---|---|---|---|---|
| Code | Sample No. | Mw$_{sol}$ (K) | D (%) | Sample No. | Mw$_{sol}$ (K) | D (%) | Sample No. | Mw$_{sol}$ (K) | D (%) |
| M2D1 | 277 | 323 | 0.40 | 293 | 304 | 0.76 | 309 | 294 | 0.54 |
| M2D2 | 278 | 371 | 0.73 | 294 | 306 | 0.72 | 310 | 321 | 1.24 |
| M2D3 | 279 | 398 | 0.74 | 295 | 318 | 0.74 | 311 | 354 | 1.28 |
| M2D4 | 280 | 464 | 1.42 | 296 | 357 | 1.30 | 312 | 363 | 1.39 |
| M3D1 | 281 | 278 | 0.47 | 297 | 260 | 0.53 | 313 | 260 | 0.69 |
| M3D2 | 282 | 304 | 0.83 | 298 | 272 | 0.65 | 314 | 268 | 0.48 |
| M3D3 | 283 | 323 | 0.82 | 299 | 295 | 0.58 | 315 | 289 | 1.38 |
| M3D4 | 284 | 360 | 1.06 | 300 | 302 | 1.14 | 315 | 303 | 0.78 |
| M4D1 | 285 | 251 | 0.61 | 301 | 244 | 0.53 | 317 | 236 | 1.00 |
| M4D2 | 286 | 266 | 0.51 | 302 | 253 | 0.81 | 318 | 239 | 0.77 |
| M4D3 | 287 | 273 | 0.64 | 303 | 266 | 0.62 | 319 | 257 | 0.72 |
| M4D4 | 288 | 282 | 0.53 | 304 | 296 | 0.88 | 320 | 268 | 1.30 |

TABLE 23(B)

| | N234/45/0 RSS1 | | | N234/65/0 RSS1 | | | N234/65/10 RSS1 | | |
|---|---|---|---|---|---|---|---|---|---|
| Code | Sample No. | Mw$_{sol}$ (K) | D (%) | Sample No. | Mw$_{sol}$ (K) | D (%) | Sample No. | Mw$_{sol}$ (K) | D (%) |
| M1 | | 1185 | | | 1185 | | | 1185 | |
| M2 | | 828 | | | 828 | | | 828 | |
| M3 | | 623 | | | 623 | | | 623 | |
| M4 | | 462 | | | 462 | | | 462 | |
| M1D1 | 321 | 507 | 7.33 | 337 | 336 | 3.44 | 353 | 395 | 5.51 |
| M1D2 | 322 | 598 | 8.15 | 338 | 458 | 5.09 | 354 | 478 | 7.68 |
| M1D3 | 323 | 731 | 8.97 | 339 | 479 | 8.17 | 355 | 555 | 9.46 |
| M1D4 | 324 | 772 | 12.02 | 340 | 706 | 9.90 | 356 | 637 | 8.39 |
| M2D1 | 325 | 486 | 3.48 | 341 | 255 | 3.22 | 357 | 295 | 0.58 |
| M2D2 | 326 | 479 | 5.44 | 342 | 288 | 3.34 | 358 | 352 | 1.23 |
| M2D3 | 327 | 527 | 5.51 | 343 | 295 | 4.65 | 359 | 394 | 1.35 |
| M2D4 | 328 | 566 | 7.70 | 344 | 393 | 5.45 | 360 | 449 | 2.37 |
| M3D1 | 329 | 419 | 0.88 | 345 | 237 | 1.50 | 361 | 292 | 0.86 |
| M3D2 | 330 | 423 | 1.24 | 346 | 252 | 1.78 | 362 | 286 | 1.14 |
| M3D3 | 331 | 431 | 2.55 | 347 | 270 | 2.88 | 363 | 313 | 2.19 |
| M3D4 | 332 | 458 | 4.03 | 348 | 304 | 3.92 | 364 | 340 | 2.51 |
| M4D1 | 333 | 341 | 0.62 | 349 | 226 | 1.18 | 365 | 265 | 0.83 |
| M4D2 | 334 | 338 | 1.13 | 350 | 214 | 1.81 | 366 | 273 | 0.99 |
| M4D3 | 335 | 319 | 1.37 | 351 | 233 | 2.97 | 367 | 291 | 1.39 |
| M4D4 | 336 | 354 | 2.06 | 352 | 258 | 3.83 | 368 | 307 | 2.41 |

Preferred Embodiment Examples

Additional samples of elastomer composites in accordance with the present invention were prepared. Specifically, a series of natural rubber elastomer composites no. 1-32 in accordance with the present invention was produced using apparatus and procedures generally in accordance with those of Example A above. The elastomer composites comprised natural rubber field latex from Malaysia with the properties shown in Table 24 below. The elastomer composites each further comprised carbon black with morphological properties (structure and surface area) of Regions I, II or III in FIG. 8. Specifically, the following carbon blacks were used: Regal® 660, N234, N326, N110, Regal® 250, N330, Black Pearl® 800, Sterling® 6740 and N351. The carbon black loadings ranged from 30 to 75 phr, and extender oil loadings were in an amount from 0 to 20 phr. The production details for elastomer composite sample nos. 1-32 are shown below in Table 25.

As noted above, the apparatus and procedures used to prepare elastomer composites no. 1-32 were generally in accordance with those of Example A, including the masterbatch formulation additives shown in Table 2. A more detailed description of the apparatus and procedures used for elastomer composites no. 1-32 is set forth below.

1. Apparatus

Invention samples no. 1-32 were prepared using masterbatch production apparatus substantially in accordance with the invention apparatus described above with reference to FIGS. 1, 4 and 7. The diameter of the slurry nozzle tip (see item 167 in FIG. 7) and the length of the land (see item 168 in FIG. 7) are given in Table 25 for each of samples no. 1-32. The coagulum zone of the apparatus had four zones of progressively larger diameter from the mixing zone to the discharge end. The diameter and axial length of each of the four zones (the first zone being partly within the mix-head and partly within the extender sealed thereto) are set forth in Table 25. There were axially short, faired interconnections between the zones.

2. Carbon Black Slurry Preparation

Bags of carbon black were mixed with deionized water in a carbon black slurry tank equipped with an agitator. The agitator broke the pellets into fragments to form a crude carbon black slurry. The carbon black concentration (as weight percent) in the carbon black slurry for each of the sample is given in Table 25. During operation, this slurry was continually pumped by an air diaphragm pump to a grinder for initial dispersion. The slurry was then fed via an air diaphragm pump to a colloid mill which then fed into a progressing cavity pump to a homogenizer, specifically, Microfluidizer Model M210 from Microfluidics International Corporation. The microfluidizer produced a finely ground slurry. The slurry flow rate from the microfluidizer to the mixing zone was set by the microfluidizer pressure, the microfluidizer acting as a high-pressure positive displacement pump. Slurry flow rate was monitored with a Micromotion® mass flow meter. The pressure at which the carbon black slurry was fed to the homogenizer and the homogenizer output pressure (all pressures are psig) are set forth for each sample in Table 25. From the homogenizer the carbon black slurry was fed to an accumulator to reduce any fluctuation in slurry pressure at the slurry nozzle tip in the mixing zone. The slurry nozzle tip pressure and flow rate at which the slurry was fed to the mixing zone for each sample are given in Table 25.

3. Latex Delivery

The latex was charged to a 55 gallon feed drum. Antioxidant emulsion was then added to the latex and mixed in prior to charging. Antioxidants were added consisting of tris nonyl phenyl phosphite (TNPP) and Santoflex® 134 (alkylaryl p-phenylene diamine mixture) in the amounts shown in Table 25. Each of the antioxidants was prepared as a 40 wt. % emulsion using 4 parts potassium oleate per 100 parts antioxidant along with potassium hydroxide to adjust the emulsion to a pH of approximately 10. Extender oil, if any, was added in the amount shown in Table 25. A peristaltic pump was used to move the latex from the feed drum to the mixing zone of the coagulum reactor. The latex flow rate and velocity are shown in Table 25. Latex flow was automatically metered with a Endress+Hauser mass flow meter. The desired carbon black loading was obtained by maintaining proper ratio of the latex feed rate to the carbon black slurry feed rate.

4. Carbon Black and Latex Mixing

The carbon black slurry and latex were mixed by entraining the latex into the carbon black slurry. During entrainment, the carbon black was intimately mixed into the latex and the mixture coagulated. Soft, wet spongy "worms" of coagulum exited the coagulum reactor.

5. Dewatering

The water content of the wet crumb discharged from the coagulum reactor is shown in Table 25. The wet crumb was dewatered with a dewatering extruder (The French Oil Mill Machinery Company; 3½ in. diameter). In the extruder, the wet crumb was compressed and water squeezed form the crumb and through a slotted barrel of the extruder. The final crumb moisture content is shown in Table 25 for each of the invention samples.

5. Drying and Cooling

The dewatered crumb dropped into a second extruder where it was again compressed and heated. Water was flashed off upon expulsion of the crumb through the die plate of the extruder. Product exit temperature and moisture content are shown in Table 25. The hot, dry crumb was rapidly cooled (approximately 20 seconds) to about 100° F. by a forced air vibrating conveyor.

TABLE 24

Natural Rubber Latex Properties

| Latex Type | Source | Additives | % Dry Rubber | % Total Solids | % Ash | Nitrogen ppm | Volatile Fatty Acid |
|---|---|---|---|---|---|---|---|
| Concentrate | TITI Latex SDN. BHD. | 0.35% NH$_3$ ZnO, TMTD 0.1% HHS | 60 | 62.0 | 0.15 | 0.29 | 0.022 |
| Field Latex | RRIM[a], September 1994 | 0.15% HNS[c] 0.3% NH3, ZnO, TMTD[b] | 28.4 | 34.2 | 0.38 | 0.366 | 0.052 |

[a]RRIM is the Rubber Research Institute of Malaysia
[b]ZnO/TMTD: used for biological preservation, typical 0.025% of 1:1 mixture
[c]HNS: hydroxylamine neutral sulfate, Mooney viscosity stabilizer

TABLE 25

Invention Sample Production Details

| Invention Sample No. | Cabot Elastomer Composite | | | Slurry Nozzle Tip | | MicroFluidizer | |
|---|---|---|---|---|---|---|---|
| | Latex type | Carbon Black | | Oil loading (phr) | Dia. (in) | Land length (in) | Inlet pressure (psi) | Outlet pressure (psi) |
| | | Type | Loading (phr) | | | | | |
| 1 | field latex | N330 | 55 | 0 | 0.025 | 0.5 | 190 | 3000 |
| 2 | field latex | N330 | 55 | 0 | 0.039 | 1 | 300 | 0 |
| 3 | field latex | N330 | 55 | 0 | 0.039 | 1 | 300 | 0 |
| 4 | field latex | REGAL 250 | 55 | 0 | 0.025 | 0.5 | 180 | 3500 |
| 5 | field latex | REGAL 250 | 65 | 0 | 0.025 | 0.5 | 300 | 10000 |
| 6 | field latex | REGAL 250 | 75 | 0 | 0.025 | 0.5 | 200 | 13000 |
| 7 | field latex | REGAL 250 | 65 | 10 | 0.025 | 0.5 | 250 | 12000 |
| 8 | field latex | BLACK PEARL 800 | 55 | 0 | 0.025 | 0.5 | 200 | 4000 |

TABLE 25-continued

Invention Sample Production Details

| | | | | | | | | |
|---|---|---|---|---|---|---|---|---|
| 9 | field latex | N326 | 55 | 0 | 0.025 | 1 | 250 | 3000 |
| 10 | field latex | REGAL 660 | 55 | 0 | 0.025 | 1 | — | — |
| 11 | field latex | REGAL 660 | 45 | 0 | 0.025 | 0.5 | 200 | 12500 |
| 12 | field latex | REGAL 660 | 65 | 0 | 0.025 | 0.5 | 260 | 15000 |
| 13 | field latex | REGAL 660 | 65 | 10 | 0.025 | 0.5 | 200 | 12000 |
| 14 | field latex | N234 | 55 | 0 | 0.025 | 1 | 180 | 5500 |
| 15 | field latex | N234 | 55 | 0 | 0.025 | 0.5 | — | 14500 |
| 16 | field latex | N234 | 55 | 0 | 0.025 | 0.5 | — | 14500 |
| 17 | field latex | N234 | 55 | 0 | 0.025 | 0.5 | — | 14500 |
| 18 | field latex | N234 | 45 | 0 | 0.025 | 0.5 | 200 | 13000 |
| 19 | field latex | N234 | 65 | 0 | 0.025 | 0.5 | 220 | 13000 |
| 20 | field latex | N234 | 65 | 10 | 0.025 | 0.5 | 300 | 14500 |
| 21 | field latex | N110 | 55 | 0 | 0.025 | 1 | 120 | 4500 |
| 22 | latex concentrate | N351 | 33 | 20 | 0.025 | 0.5 | 250 | 12500 |
| 23 | field latex | STERLING 6740 | 55 | 0 | 0.025 | 0.5 | 250 | 12000 |
| 24 | field latex | N234 | 48 | 5 | 0.023 | 0.5 | 250 | 11000 |
| 25 | field latex | N234 | 53 | 5 | 0.023 | 0.5 | 250 | 11000 |
| 26 | field latex | N234 | 58 | 5 | 0.023 | 0.5 | 250 | 11000 |
| 27 | field latex | N234 | 63 | 5 | 0.023 | 0.5 | 250 | 11000 |
| 28 | field latex | N234 | 68 | 5 | 0.023 | 0.5 | 250 | 11000 |
| 29 | latex concentrate | N234 | 49 | 5 | 0.023 | 0.5 | — | — |
| 30 | latex concentrate | N234 | 54 | 5 | 0.023 | 0.5 | — | 11000 |
| 31 | latex concentrate | N234 | 63 | 5 | 0.023 | 0.5 | — | 11000 |
| 32 | latex concentrate | N234 | 65 | 5 | 0.023 | 0.5 | — | 11000 |

| | Coagulum Zone | | | | | | | | CB Slurry |
|---|---|---|---|---|---|---|---|---|---|
| Invention | 1st portion | | 2nd portion | | 3rd portion | | 4th portion | | CB conc. |
| Sample No. | Dia. (in) | Length (in) | Dia. (in) | Length (in) | Dia. (in) | Length (in) | Dia. (in) | Length (in) | (% wt) |
| 1 | 0.19 | 3.0 | 0.27 | 1.6 | 0.38 | 2.3 | 0.53 | 3.2 | 15.2 |
| 2 | 0.19 | 1.1 | 0.27 | 1.6 | 0.38 | 2.3 | 0.53 | 3.2 | 14.9 |
| 3 | 0.19 | 1.1 | 0.27 | 1.6 | 0.38 | 2.3 | 0.53 | 3.2 | 14.9 |
| 4 | 0.19 | 3.0 | 0.27 | 1.6 | 0.38 | 2.3 | 0.53 | 3.2 | 19.0 |
| 5 | 0.19 | 3.0 | 0.27 | 1.6 | 0.38 | 2.3 | 0.53 | 3.2 | 21.0 |
| 6 | 0.19 | 3.0 | 0.27 | 1.6 | 0.38 | 2.3 | 0.53 | 3.2 | 21.0 |
| 7 | 0.19 | 3.0 | 0.27 | 1.6 | 0.38 | 2.3 | 0.53 | 3.2 | 21.0 |
| 8 | 0.19 | 3.0 | 0.27 | 1.6 | 0.38 | 2.3 | 0.53 | 3.2 | 15.0 |
| 9 | 0.19 | 1.1 | 0.27 | 1.6 | 0.38 | 2.3 | 0.53 | 3.2 | 14.8 |
| 10 | 0.19 | 1.1 | 0.27 | 1.6 | 0.38 | 2.3 | 0.53 | 3.2 | 14.9 |
| 11 | 0.19 | 3.0 | 0.27 | 1.6 | 0.38 | 2.3 | 0.53 | 3.2 | 15.2 |
| 12 | 0.19 | 3.0 | 0.27 | 1.6 | 0.38 | 2.3 | 0.53 | 3.2 | 15.2 |
| 13 | 0.19 | 3.0 | 0.27 | 1.6 | 0.38 | 2.3 | 0.53 | 3.2 | 15.2 |
| 14 | 0.19 | 1.1 | 0.27 | 1.6 | 0.38 | 2.3 | 0.53 | 3.2 | 14.8 |
| 15 | 0.19 | 3.0 | 0.27 | 1.6 | 0.38 | 2.3 | 0.53 | 3.2 | 13.7 |
| 16 | 0.19 | 3.0 | 0.27 | 1.6 | 0.38 | 2.3 | 0.53 | 3.2 | 13.7 |
| 17 | 0.19 | 3.0 | 0.27 | 1.6 | 0.38 | 2.3 | 0.53 | 3.2 | 13.7 |
| 18 | 0.19 | 3.0 | 0.27 | 1.6 | 0.38 | 2.3 | 0.53 | 3.2 | 14.6 |
| 19 | 0.19 | 3.0 | 0.27 | 1.6 | 0.38 | 2.3 | 0.53 | 3.2 | 14.6 |
| 20 | 0.19 | 3.0 | 0.27 | 1.6 | 0.38 | 2.3 | 0.53 | 3.2 | 14.6 |
| 21 | 0.19 | 1.1 | 0.27 | 1.6 | 0.38 | 2.3 | 0.53 | 3.2 | 11.8 |
| 22 | 0.19 | 3.0 | 0.27 | 1.6 | 0.38 | 2.3 | 0.53 | 3.2 | 15.0 |
| 23 | 0.19 | 3.0 | 0.27 | 1.6 | 0.38 | 2.3 | 0.53 | 3.2 | 14.7 |
| 24 | 0.19 | 3.0 | 0.27 | 1.6 | 0.38 | 2.3 | 0.53 | 3.2 | 13.5 |
| 25 | 0.19 | 3.0 | 0.27 | 1.6 | 0.38 | 2.3 | 0.53 | 3.2 | 13.5 |
| 26 | 0.19 | 3.0 | 0.27 | 1.6 | 0.38 | 2.3 | 0.53 | 3.2 | 13.5 |
| 27 | 0.19 | 3.0 | 0.27 | 1.6 | 0.38 | 2.3 | 0.53 | 3.2 | 13.5 |
| 28 | 0.19 | 3.0 | 0.27 | 1.6 | 0.38 | 2.3 | 0.53 | 3.2 | 13.5 |
| 29 | 0.19 | 3.0 | 0.27 | 1.6 | 0.38 | 2.3 | 0.53 | 3.2 | 12.8 |
| 30 | 0.19 | 3.0 | 0.27 | 1.6 | 0.38 | 2.3 | 0.53 | 3.2 | 12.8 |
| 31 | 0.19 | 3.0 | 0.27 | 1.6 | 0.38 | 2.3 | 0.53 | 3.2 | 12.8 |
| 32 | 0.19 | 3.0 | 0.27 | 1.6 | 0.38 | 2.3 | 0.53 | 3.2 | 12.8 |

| | Slurry Nozzle | | | Mixing Zone | | | |
|---|---|---|---|---|---|---|---|
| Invention | Tip Pressure | Slurry flow rate | Slurry velocity | Antioxidant | | Latex flow rate | Latex velocity |
| Sample No. | (psi) | (lb/min) | (ft/sec) | TNPP (phr) | Santoflex (phr) | (lbs/min) | (ft/sec) |
| 1 | 1400 | 4.6 | 336 | 0.3 | 0.4 | 4.7 | 6.8 |
| 2 | 425 | 8.2 | 247 | 0.3 | 0.4 | 8.9 | 13.2 |
| 3 | 425 | 8.2 | 247 | 0.3 | 0.4 | 8.9 | 13.2 |
| 4 | 1500 | 4.8 | 344 | 0.3 | 0.4 | 6.7 | 9.7 |
| 5 | 1500 | 5.2 | 370 | 0.3 | 0.4 | 6.8 | 9.8 |
| 6 | 1575 | 5.2 | 370 | 0.3 | 0.4 | 5.9 | 8.5 |
| 7 | 1550 | 5.2 | 370 | 0.3 | 0.4 | 6.9 | 10.0 |

TABLE 25-continued

Invention Sample Production Details

| | | | | | | | |
|---|---|---|---|---|---|---|---|
| 8 | 1800 | 5.2 | 380 | 0.3 | 0.4 | 4.9 | 7.1 |
| 9 | 600 | 4.2 | 308 | 0.3 | 0.4 | 4.0 | 5.8 |
| 10 | — | 4.0 | 293 | 0.3 | 0.4 | 3.6 | 5.2 |
| 11 | 1500 | 5.1 | 373 | 0.3 | 0.4 | 7.0 | 10.1 |
| 12 | 1300 | 4.8 | 351 | 0.3 | 0.4 | 4.6 | 6.7 |
| 13 | 1375 | 4.9 | 358 | 0.3 | 0.4 | 4.8 | 6.9 |
| 14 | 900 | 5.3 | 388 | 0.3 | 0.4 | 4.8 | 6.9 |
| 15 | 1400 | 5.7 | 420 | 0.3 | 0.4 | 5.4 | 7.8 |
| 16 | 1400 | 5.7 | 420 | 0.3 | 0.4 | 5.4 | 7.8 |
| 17 | 1400 | 5.7 | 420 | 0.3 | 0.4 | 5.4 | 7.8 |
| 18 | 1600 | 5.2 | 381 | 0.3 | 0.4 | 6.5 | 9.4 |
| 19 | 1650 | 5.3 | 388 | 0.3 | 0.4 | 4.5 | 6.5 |
| 20 | 1625 | 5.3 | 388 | 0.3 | 0.4 | 4.6 | 6.7 |
| 21 | 900 | 5.3 | 394 | 0.3 | 0.4 | 4.1 | 5.9 |
| 22 | 1550 | 5.1 | 373 | 0.3 | 0.4 | 5.1 | 7.6 |
| 23 | 1550 | 5.2 | 381 | 0.3 | 0.4 | 5.7 | 8.3 |
| 24 | 2270 | 5.1 | 444 | 0.3 | 0.4 | 6.1 | 8.8 |
| 25 | 2250 | 5.1 | 444 | 0.3 | 0.4 | 5.5 | 7.9 |
| 26 | 2270 | 5.1 | 444 | 0.3 | 0.4 | 5.0 | 7.2 |
| 27 | 2260 | 5.1 | 444 | 0.3 | 0.4 | 4.6 | 6.6 |
| 28 | — | 5.1 | 444 | 0.3 | 0.4 | 4.2 | 6.1 |
| 29 | 2350 | 5.3 | 463 | 0.3 | 0.4 | 2.6 | 3.8 |
| 30 | 2360 | 5.3 | 463 | 0.3 | 0.4 | 2.3 | 3.4 |
| 31 | 2350 | 5.3 | 463 | 0.3 | 0.4 | 2.1 | 3.1 |
| 32 | 2420 | 5.3 | 463 | 0.3 | 0.4 | 2.0 | 3.0 |

| | Dewatering | | Drying and Cooling | |
|---|---|---|---|---|
| Invention Sample No. | Initial crumb moisture (%) | Final crumb moisture (%) | Product temperature (° F.) | Product moisture (%) |
| 1 | 77.6 | 6.5 | 312 | 0.3 |
| 2 | 78.7 | — | 450 | 0.2 |
| 3 | 78.7 | 7.8 | 400 | 0.2 |
| 4 | 74.9 | — | 350 | 0.3 |
| 5 | 76.2 | 7.9 | 310 | 0.2 |
| 6 | 76.4 | 11.4 | — | 0.2 |
| 7 | 75.6 | 8.8 | 335 | 0.3 |
| 8 | 77.7 | 6.5 | 310 | 0.2 |
| 9 | 77.9 | 8.9 | 345 | 0.2 |
| 10 | 77.8 | — | — | 0.4 |
| 11 | 78.7 | 9.7 | 285 | 0.5 |
| 12 | 79.7 | — | 335 | 0.2 |
| 13 | 79.1 | — | — | 0.9 |
| 14 | 77.9 | 8.4 | 330 | 0.1 |
| 15 | 79.2 | — | oven dried | — |
| 16 | 79.2 | 10.3 | oven dried | — |
| 17 | 79.2 | 11.2 | oven dried | — |
| 18 | 79.0 | 15.0 | 370 | 0.4 |
| 19 | 80.0 | 3.6 | 325 | 0.3 |
| 20 | 79.5 | 9.4 | 345 | 0.5 |
| 21 | 80.5 | 9.5 | 350 | 0.2 |
| 22 | 65.1 | 9.1 | 280 | 0.3 |
| 23 | 78.1 | 6 | 330 | 0.8 |
| 24 | 77.4 | — | 380 | 0.3 |
| 25 | 77.8 | — | 390 | 0.4 |
| 26 | 78.1 | — | 400 | 0.7 |
| 27 | 78.4 | — | 410 | 0.4 |
| 28 | 78.7 | — | 420 | 1.1 |
| 29 | 71.2 | — | 400 | 0.6 |
| 30 | 72.3 | — | 420 | 0.4 |
| 31 | 73.3 | — | 400-450 | 0.9 |
| 32 | 74.1 | — | 400-450 | 0.2 |

It should be noted that samples 2 and 3 were produced with approximately no outlet pressure at the Microfluidizer outlet, etc., to determine macro-dispersion under adverse process conditions.

The excellent carbon black dispersion in the resultant masterbatches is demonstrated by their macro-dispersion quality and molecular weight of the sol portion $MW_{sol}$. Table 26 below shows the $MW_{sol}$ and macro-dispersion values for invention samples 1-32, along with the carbon black and oil (if any) used in each of the samples. The carbon black loading and oil loading are shown as phr values in Table 26.

TABLE 26

Sol Molecular Weight and Undispersed Area of Invention Samples

| Invention Sample No. | CB/Loading/Oil | $Mw_{sol}$ (K) | D (%) |
|---|---|---|---|
| 1 | N330/55/0 | 305 | 0.26 |
| 2 | N330/55/0 | 726 | 0.54 |

TABLE 26-continued

Sol Molecular Weight and Undispersed Area of Invention Samples

| Invention Sample No. | CB/Loading/Oil | Mw$_{sol}$(K) | D (%) |
|---|---|---|---|
| 3 | N330/55/0 | 544 | 0.40 |
| 4 | R250/55/0 | 876 | 0.08 |
| 5 | R250/65/0 | 670 | 0.16 |
| 6 | R250/75/0 | 655 | 0.03 |
| 7 | R250/65/10 | 519 | 0.02 |
| 8 | BP800/55/0 | 394 | 0.14 |
| 9 | N326/55/0 | 666 | 0.20 |
| 10 | R660/55/0 | 678 | 0.12 |
| 11 | R660/45/0 | 733 | 0.05 |
| 12 | R660/65/0 | 568 | 0.04 |
| 13 | R660/65/10 | 607 | 0.02 |
| 14 | N234/55/0 | 433 | 0.15 |
| 15 | N234/55/0 | 1000 | 0.10 |
| 16 | N234/55/0 | 500 | 0.15 |
| 17 | N234/55/0 | 550 | 0.10 |
| 18 | N234/45/0 | 495 | 0.17 |
| 19 | N234/65/0 | 359 | 0.20 |
| 20 | N234/65/10 | 350 | 0.11 |
| 21 | N110/55/0 | 612 | 0.17 |
| 22 | N351/33/20 | 800 | 0.10 |
| 23 | S6740/55/0 | 630 | 0.10 |
| 24 | N234/48/5 | 569 | 0.05 |
| 25 | N234/53/5 | 485 | 0.12 |
| 26 | N234/58/5 | 447 | 0.12 |
| 27 | N234/63/5 | 403 | 0.13 |
| 28 | N234/68/5 | 378 | 0.16 |
| 29 | N234/49/5 | 618 | 0.12 |
| 30 | N234/54/5 | 482 | 0.16 |
| 31 | N234/63/5 | 390 | 0.17 |
| 32 | N234/65/5 | 325 | 0.20 |

The results for all invention samples having carbon black loading of 55 phr are shown in the semi-log slot of FIG. 9 along with macro-dispersion and MW$_{sol}$ values for a corresponding series of the above described natural rubber control samples produced by dry mixing techniques. At least one data point for an invention sample comprising 55 phr loading of each carbon black is shown in FIG. 9, along with all of the control samples having carbon black loading of 55 phr. (Control samples 401 to 412, also shown in FIG. 9, used 33 phr N351 carbon black and 20 parts extender oil.) It can be seen in Table 26 and in FIG. 9 that the invention samples have excellent macro-dispersion. Specifically, the invention samples have D(%) values generally below 0.2%, even at MW$_{sol}$ values above 0.85×10$^6$ whereas the control samples never achieve such excellent macro-dispersion at any MW$_{sol}$. Thus, the data shown in FIG. 9 clearly reveals that the macro-dispersion quality of the novel elastomer composites over a wide range of MW$_{sol}$ values is significantly superior to that achievable using comparable ingredients in prior-known dry mixing methods. The symbols used for the various data points shown in FIG. 9 and those used in subsequently discussed FIGS. 10-25 are explained in the legends below.

| Figure Captiopns | | |
|---|---|---|
| FIG. 9 | Dispersion Quality and MW Sol of NR Masterbatches | ✶ control samples 177 to 224<br>▲ control samples 273 to 320<br>✳ control samples 145 to 176<br>∆ control samples 369 to 400<br>○ control samples 33 to 64<br>✕ control samples 1 to 32<br>● control samples 113 to 144<br>◇ control samples 412 to 443<br>◆ control samples 401 to 412<br>■ invention samples |
| FIG. 10 | Dispersion Quality and MW Sol of NR Masterbatches (Region I) | ✶ control samples 177 to 224<br>✿ invention sample 10<br>✳ control samples 145 to 176<br>⁝⁝ invention sample 9<br>○ control samples 33 to 64<br>□ invention sample 4<br>✕ control samples 1 to 32<br>✿ invention sample 1<br>● control samples 113 to 144<br>■ invention sample 8 |
| FIG. 11 | Dispersion Quality and MW Sol of NR Masterbatches (Region II) | ▲ control samples 273 to 320<br>■ invention sample 14<br>∆ control samples 369 to 400<br>□ invention sample 21 |
| FIG. 12 | Dispersion Quality and MW Sol of NR Masterbatches (Region III) | ◆ control samples 401 to 412<br>■ invention sample 22<br>◇ control samples 412 to 443<br>□ invention sample 23 |
| FIG. 13 | Dispersion Quality and MW Sol of NR Masterbatches (N330 Carbon Black, 55 phr) | ● control samples 1 to 32<br>■ invention samples 1 to 3 |
| FIG. 14 | Dispersion Quality and MW Sol of NR Masterbatches (REGAL 250 Carbon Black) | ● control samples 33 to 64<br>■ invention sample 4<br>○ control sample 65 to 80<br>□ invention sample 5<br>◇ control samples 81 to 96<br>∆ invention sample 6 |

-continued

Figure Captions

| | | |
|---|---|---|
| FIG. 15 | Dispersion Quality and MW Sol of NR Masterbatches (BLACK PEARL 800 Carbon Black, 55 phr) | ◆ control samples 97 to 112<br>▲ invention sample 7<br>● control samples 113 to 144<br>■ invention sample 8 |
| FIG. 16 | Dispersion Quality and MW Sol of NR Masterbatches (N326 Carbon Black, 55 phr) | ● control samples 145 to 176<br>■ invention sample 9 |
| FIG. 17 | Dispersion Quality and MW sol of NR Masterbatches (REGAL 660 Carbon Black) | ● control samples 177 to 224<br>■ invention sample 10<br>○ control samples 225 to 240<br>□ invention sample 11<br>◇ control samples 241 to 256<br>△ invention sample 12<br>◆ control samples 257 to 272<br>▲ invention sample 13 |
| FIG. 18 | Dispersion Quality and MW sol of NR Masterbatches (N234 Carbon Black) | ● control samples 273 to 320<br>■ invention samples 14 to 17<br>○ control samples 337 to 352<br>□ invention sample 19<br>◇ control samples 321 to 336<br>△ invention sample 18<br>◆ control samples 353 to 368<br>▲ invention sample 20 |
| FIG. 19 | Dispersion Quality and MW Sol of NR Masterbatches (N110 Carbon Black, 55 phr) | ● control samples 369 to 400<br>■ invention sample 21 |
| FIG. 20 | Dispersion Quality and MW sol of NR Masterbatch (N351 Carbon Black, 33 phr) | ● control samples 401 to 412<br>■ invention sample 22 |
| FIG. 21 | Dispersion Quality and MW Sol of NR Masterbatches (STERLING 6740 Carbon Black, 55 phr) | ● control samples 412 to 443<br>■ invention sample 23 |
| FIG. 22 | MW sol Effect on Crack Growth Rate (NR Compounds Containing N234 Carbon Black @ 55 phr Loading) | ● control samples 273 to 288<br>□ invention sample 16 |
| FIG. 23 | MW sol Effect on Crack Growth Rate (NR Compounds Containing N326 Carbon Black @ 55 phr Loading) | ● control samples 145 to 160<br>○ invention sample 9 |
| FIG. 24 | MW sol Effect on Crack Growth Rate (NR Compounds Containing REGAL 660 Carbon Black @ 55 phr Loading) | ● control samples 177 to 192<br>□ invention sample 10 |
| FIG. 25 | Max. Tan δ (Strain Sweep @ 60 C.) of NR Compounds Containing N234 Black at Different Loadings | ● invention samples 24 to 28<br>○ invention samples 29 to 32<br>□ control sample 444 to 450 |
| FIG. 30 | Macro-dispersion Quality and MW of Sol Portion of NR Masterbatch Containing Dual Phase (Carbon Black/Silica) Aggregates | ● control samples 451 to 458<br>■ invention sample 33<br>○ control samples 459 to 466<br>□ invention sample 34 |
| FIG. 31 | Macro-dispersion Quality and MW of Sol Portion of NR Masterbatch Containing Blend of Carbon Black and Silica | ● control samples 491 to 498<br>■ invention sample 38<br>○ control samples 483 to 490<br>□ invention sample 37<br>○ control samples 475 to 482<br>□ invention sample 36<br>● control samples 467 to 474<br>■ invention sample 35 |

The macro-dispersion values for the elastomer composites of the invention shown in FIG. 9 are described by the following equations:

$$D(\%) < 0.2\% \quad (1)$$

when $MW_{sol}$ is less than $0.45 \times 10^6$; and $$\log(D) < \log(0.2) + 2.0 \times [MW_{sol} - (0.45 \times 10^6)] \times 10^{-6} \quad (2)$$

when $0.45 \times 10^6 < MW_{sol} < 1.1 \times 10^6$.

It will be recognized from the discussion above, that macro-dispersion D (%) in the above equation (1) is the percent undispersed area measured for defects greater than 10 microns. It can be seen in FIG. 9 that D(%) equal to 0.2% is the threshold macro-dispersion quality for all carbon blacks in Regions I, II and III for natural rubber dry masterbatches. That is, none of the dry masticated masterbatches achieved macro-dispersion quality of 0.2% at any $MW_{sol}$, even after mixing sufficiently to degrade $MW_{sol}$ below $0.45 \times 10^6$, as described by equation (1) above. When the $MW_{sol}$ of the dry masterbatch control samples shown in FIG. 9 is between $0.45 \times 10^6$ and $1.1 \times 10^6$, the dispersion quality is even poorer while, in contrast, the dispersion quality of the invention samples having $MW_{sol}$ in that range remains excellent. None of the preferred embodiments shown in FIG. 9 having $MW_{sol}$ between $0.45 \times 10^6$ and $1.1 \times 10^6$ exceeds the preferred macro-dispersion limit of 0.2%. In that regard, it should be understood that the data points for preferred embodiments which are seen in FIG. 9 (and in other Figures discussed below) to lie on the X axis (i.e., at D(%) value of 0.1%) may have macro-dispersion quality of 0.1% or an even better (i.e., lower) D(%) value.

Region I Carbon Black Samples

Invention samples comprising carbon blacks having morphological properties (i.e., structures and surface area) of Region I in FIG. 8, and corresponding control samples described above made with such Region I carbon blacks, are compared in the semi-log plot of FIG. 10. Specifically, FIG. 10 shows the macro-dispersion values and $MW_{sol}$ values of the invention samples and corresponding control samples comprising the carbon blacks Regal® 660, N326, Regal®

250, N330, and Black Pearl® 800, at carbon black loading ranging from 30 phr to 75 phr and extender oil loading ranging from 0 phr to 20 phr. Excellent carbon black dispersion is seen in FIG. 10 for all of the invention samples, representing preferred embodiments of elastomer composites in accordance with the present disclosure. All of the invention samples advantageously are below line 101 in FIG. 10, whereas all of the control samples have poorer dispersion, being above line 101. In fact, the preferred embodiments shown in FIG. 10, even through comprising carbon blacks from Region I, the most difficult to disperse, all fall below a D(%) value of 0.3%. The most preferred embodiments all have a D(%) value not exceeding 0.2% even at an $MW_{sol}$ value advantageously exceeding $0.7 \times 10^6$. The data shown in FIG. 10 clearly reveals that the macro-dispersion quality of the novel elastomer composites disclosed here comprising Region I carbon blacks, over a wide range of $MW_{sol}$ values, is significantly superior to that achievable using comparable ingredients by prior dry mastication mixing methods. The macro-dispersion values for the elastomer composites of the invention shown in FIG. 10 are described by the following equations:

$$D(\%) < 1.0\% \tag{3}$$

when $MW_{sol}$ is less than $0.7 \times 10^6$; and $$\log D < \log(1.0) + 2.5 \times [MW_{sol} - (0.7 \times 10^6)] \times 10^{-6} \tag{4}$$

when $0.7 \times 10^6 < MW_{sol} < 1.1 \times 10^6$

It will be recognized that D (%) is the percent undispersed area measured for defects greater than 10 microns and 1% is the threshold macro-dispersion quality for all carbon blacks in Region I for natural rubber masterbatches in accordance with the present invention. That is, none of the dry masticated masterbatches achieved macro-dispersion quality of 1.0% or better at any $MW_{sol}$, even after dry mixing sufficiently to degrade $MW_{sol}$ below $0.7 \times 10^6$, as described by Equation (3) above. When the $MW_{sol}$ of the dry masterbatch control samples shown in FIG. 10 is between $0.7 \times 10^6$ and $1.1 \times 10^6$, the dispersion quality is even poorer. In contrast, the dispersion quality of the invention samples having $MW_{sol}$ in that range remains excellent. The preferred embodiment shown in FIG. 10 having $MW_{sol}$ between $0.7 \times 10^6$ and $1.1 \times 10^6$ falls well below the preferred macro-dispersion limit of 0.2%. It can be seen that the elastomer composites of the invention comprising carbon blacks from Region I provide heretofore unachieved balance between macro-dispersion quality and $MW_{sol}$.

Region II Carbon Black Samples

Invention samples comprising carbon blacks having morphological properties (i.e., structure and surface area) of Region II in FIG. 8, and corresponding control samples described above made with such Region II carbon blacks are compared in the semi-log plot of FIG. 11. Specifically, FIG. 11 shows the macro-dispersion values and $MW_{sol}$ a values of the invention samples and corresponding control samples comprising the carbon blacks N234 and N110 at carbon black loading ranging from 40 phr to 70 phr and extender oil loading ranging from 0 phr to 10 phr. Excellent carbon black dispersion is seen in FIG. 11 for all of the invention samples, representing preferred embodiments of elastomer composites in accordance with the present disclosure. The invention samples advantageously are below line 111 in FIG. 11, whereas all of the control samples have poorer dispersion, being above line 111. In fact, the preferred embodiments shown in FIG. 11 comprising carbon blacks from Region II fall below a D(%) value of 0.3%. Most preferred embodiments have a D(%) value not exceeding 0.2% at any $MW_{sol}$ value. The data shown in FIG. 11 clearly reveal that the macro-dispersion quality of the novel elastomer composites disclosed here comprising Region II carbon blacks, over a wide range of $MW_{sol}$ values, is significantly superior to that achievable using comparable ingredients in prior dry mixing methods. The macro-dispersion values for the elastomer composites of the invention shown in FIG. 11 are described by the following equations:

$$D(\%) < 0.3\% \tag{5}$$

when $MW_{sol}$ is less than $0.35 \times 10^6$; and $$\log D < \log(0.3) + 2.8 \times [MW_{sol} - (0.35 \times 10^6)] \times 10^{-6} \tag{6}$$

when $0.35 \times 10^6 < MW_{sol} < 1.1 \times 10^6$.

It will be recognized that D (%) of 0.30% is the threshold macro-dispersion quality for all carbon blacks in Region II for natural rubber masterbatches in accordance with the present invention, and $0.35 \times 10^6$ is the threshold $MW_{sol}$ value. That is, none of the dry masterbatches achieved macro-dispersion quality of 0.30% or better at any $MW_{sol}$ even after dry mixing sufficiently to degrade $MW_{sol}$ below $0.35 \times 10^6$, as described by Equation (5) above. When the $MW_{sol}$ of the dry masterbatch control samples shown in FIG. 11 is between $0.35 \times 10^6$ and $1.1 \times 10^6$, the dispersion quality is even poorer. In contrast, the dispersion quality of the invention samples having $MW_{sol}$ in that range remains excellent. The preferred embodiments shown in FIG. 11 having $MW_{sol}$ between $0.35 \times 10^6$ and $1.1 \times 10^6$ fall well below the preferred macro-dispersion limit of 0.2%. It can be seen that the elastomer composites of the invention comprising carbon blacks from Region II provide heretofore unachieved balance between macro-dispersion quality and $MW_{sol}$.

Region III Carbon Black Samples

Invention samples comprising carbon blacks having morphological properties (i.e., structures and surface area) of Region III in FIG. 8, and corresponding control samples described above made with such Region III carbon blacks are compared in the semi-log plot of FIG. 12. Specifically, FIG. 12 shows the macro-dispersion values and $MW_{sol}$ values of the invention samples and corresponding control samples comprising the carbon blacks N351 and Sterling 6740, at carbon black loading ranging from 30 phr to 70 phr and extender oil loading ranging from 0 phr to 20 phr. Excellent carbon black dispersion is seen in FIG. 12 for all of the invention samples, representing preferred embodiments of elastomer composites in accordance with the present disclosure. All of the invention samples advantageously are below line 121 in FIG. 12, whereas all of the control samples have poorer dispersion, being above line 121. In fact, the preferred embodiments shown in FIG. 12, comprising carbon blacks from Region III, fall at or below a D(%) value of 0.1%, even at an $MW_{sol}$ value advantageously exceeding $0.3 \times 10^6$ and even $0.7 \times 10^6$. The data shown in FIG. 12 clearly reveals that the macro-dispersion quality of the novel elastomer composites disclosed here comprising Region III carbon black, over a wide range of $MW_{sol}$ values, is significantly superior to that achievable using comparable ingredients in prior dry mixing methods. The macro-dispersion values for the elastomer composites of the invention shown in FIG. 12 are described by the following equations:

$$D(\%) < 0.1\% \tag{7}$$

when $MW_{sol}$ is less than $0.35 \times 10^6$; and $$\log D<\log(0.1)+2.0\times[MW_{sol}-(0.30\times10^6)]\times10^{-6} \quad (8)$$

when $0.30\times10^6<MW_{sol}<1.1\times10^6$.

It will be recognized that D (%) of 0.1% is the threshold macro-dispersion quality for all carbon blacks in Region III for natural rubber masterbatches in accordance with the present invention, and $0.3\times10^6$ is the threshold $MW_{sol}$ value. That is, none of the dry masterbatches achieved macro-dispersion quality of 0.1% at any $MW_{sol}$, even after dry mixing sufficiently to degrade $MW_{sol}$ below $0.35\times10^6$, as described by Equation (7) above. When the $MW_{sol}$ of the dry masterbatch control samples shown in FIG. 12 is between $0.30\times10^6$ and $1.1\times10^6$, the dispersion quality is even poorer. In contrast, the dispersion quality of the invention samples having $MW_{sol}$ in that range remains excellent. The preferred embodiments shown in FIG. 12 having $MW_{sol}$ between $0.30\times10^6$ and $1.1\times10^6$ fall well below the preferred macro-dispersion limit of 0.2%, and, in fact, are at or below D(%) value of 0.1%. It can be seen that the elastomer composites of the present invention comprising carbon blacks from Region III provide heretofore unachieved balance between macro-dispersion quality and $MW_{sol}$.

Additional Sample Comparisons

The macro-dispersion values for the invention samples are shown graphically in the semi-long plots of FIGS. 13 through 21, as a function of their $MW_{sol}$, values, as in FIGS. 8 through 12 discussed above. More specifically, in FIGS. 13 through 21 all invention samples described above comprising a particular carbon black (being limited to those of a specific carbon black loading when so indicated) are shown together in a single semi-log plot together with the corresponding control samples. (See the legends above giving the reference numbers of the invention samples and control samples included in each figure.) Thus, FIG. 13 shows the dispersion quality and $MW_{sol}$ of invention and control samples described above comprising 55 phr N330 carbon black. The data shown in FIG. 13 clearly reveals that the macro-dispersion quality of the novel elastomer composites of the invention, comprising N330 carbon black, over a wide range of $MW_{sol}$ values, is significantly superior to that of the control samples. Macro-dispersion for elastomer composites of the invention comprising N330 carbon black, as shown in FIG. 13 is described by the following equations:

$$D(\%)<1\% \quad (9)$$

when $MW_{sol}<0.6\times10^6$; and $$\log(D)<\log(1)+2.5\times[MW_{sol}-(0.6\times10^6)]\times10^{-6} \quad (10)$$

when $0.6\times10^6<MW_{sol}<1.1\times10^6$.

None of the dry masticated masterbatches achieved macro-dispersion quality of 1.0% at any $MW_{sol}$, even after dry mixing sufficiently to degrade $MW_{sol}$ below $0.6\times10^6$ (see Equation 9, above). In control samples comprising 55 phr N330 carbon black in which the $MW_{sol}$ was maintained between $0.6\times10^6$ and $1.1\times10^6$, the D(%) value is even higher, such as more than 4% undispersed area.

FIG. 14 shows the dispersion quality and $MW_{sol}$ of the invention and control samples described above comprising REGAL® 250 carbon black. Selected invention and control samples shown in FIG. 14 comprised oil, as set forth above. The data shown in FIG. 14 clearly reveals that the macro-dispersion quality of the novel elastomer composites of the invention comprising REGAL® 250 carbon black, over a wide range of $MW_{sol}$ values, is significantly superior to that of the control samples. The macro-dispersion values for the elastomer composites of the invention comprising REGAL®D 250 carbon black, as shown in FIG. 14 are described by the following equations:

$$D(\%)<1\% \quad (9)$$

when $MW_{sol}<0.6\times10^6$; and $$\log(D)<\log(1)+2.5\times[MW_{sol}-(0.6\times10^6)]\times10^{-6} \quad (10)$$

when $0.6\times10^6<MW_{sol}<1.1\times10^6$.

None of the control samples achieved macro-dispersion quality of 1.0% or better at any $MW_{sol}$, even after dry mixing sufficiently to degrade $MW_{sol}$ below $0.6\times10^6$. In contrast, elastomer composites of the invention comprising Regal® 250 carbon black and having $MW_{sol}$ above $0.6\times10^6$ have excellent macro-dispersion, such as D(%) less than 0.2%. Compound properties and performance characteristics for the invention and control samples shown in FIG. 14, comprising REGAL® 250 carbon black, are set forth in Table 27 below. It can be seen that invention sample No. 4 has exceptionally good resistance to crack growth, as indicated by its very low crack growth rate value of only 0.92 cm/million cycles. In fact, the invention sample is far superior to the corresponding control samples. This is believed to be due largely to the better $MW_{sol}$ and macro-dispersion of carbon black in the invention sample, as discussed above.

TABLE 27

Compound Properties of NR Compounds Containing REGAL 250 Carbon Black at 55 phr Loading

| Sample No. | Mooney ML(1 + 4) @ 100 C. | Hardness | E100 (psi) | E300 (psi) | Tensile (psi) | EB (%) |
|---|---|---|---|---|---|---|
| control 33 | 60.63 | 55.35 | 181.26 | 999.82 | 4090.24 | 675.0 |
| control 34 | 73.58 | 57.80 | 235.14 | 1293.88 | 3978.24 | 595.0 |
| control 35 | 81.49 | 58.65 | 243.66 | 1265.26 | 4103.41 | 613.0 |
| control 36 | 84.04 | 59.95 | 244.23 | 1215.87 | 3960.32 | 614.0 |
| control 37 | 57.35 | 56.75 | 218.70 | 1259.99 | 4119.85 | 502.0 |
| control 38 | 60.10 | 57.05 | 216.75 | 1206.60 | 4023.65 | 620.0 |
| control 39 | 68.28 | 57.25 | 225.44 | 1256.23 | 4134.06 | 621.0 |
| control 40 | 77.40 | 59.10 | 255.15 | 1330.87 | 4059.01 | 597.0 |
| control 41 | 44.40 | 56.25 | 216.00 | 1214.78 | 4038.68 | 618.0 |
| control 42 | 47.96 | 56.50 | 214.53 | 1202.93 | 3944.05 | 613.0 |
| control 43 | 49.84 | 57.05 | 221.26 | 1229.07 | 4018.24 | 611.0 |
| control 44 | 50.10 | 56.60 | 210.50 | 1140.90 | 4058.33 | 638.0 |
| control 45 | 36.82 | 52.90 | 177.47 | 982.86 | 3790.56 | 533.0 |
| control 46 | 38.23 | 54.50 | 198.63 | 1111.04 | 3860.56 | 629.0 |

TABLE 27-continued

Compound Properties of NR Compounds
Containing REGAL 250 Carbon Black at 55 phr Loading

| control 47 | 35.35 | 54.60 | 199.03 | 1110.00 | 3871.49 | 505.0 |
|---|---|---|---|---|---|---|
| control 48 | 40.58 | 55.50 | 204.52 | 1139.94 | 3961.06 | 632.0 |
| invention 4 | 71.97 | 57.00 | 218.18 | 1230.30 | 4036.30 | 611.0 |

| Sample No. | Rebound | Crack Growth Rate (cm/million cycles) | Abrasion loss (g) | Tan δ @ 0° C. | Tan δ @ 60° C. |
|---|---|---|---|---|---|
| control 33 | 64.50 | 2.00 | 0.191 | 0.167 | 0.091 |
| control 34 | 64.55 | 1.83 | 0.182 | 0.155 | 0.083 |
| control 35 | 63.75 | 2.38 | 0.192 | 0.150 | 0.091 |
| control 36 | 63.30 | 1.42 | 0.180 | 0.162 | 0.091 |
| control 37 | 64.65 | 3.00 | 0.168 | 0.176 | 0.100 |
| control 38 | 63.45 | 2.99 | 0.163 | 0.184 | 0.099 |
| control 39 | 63.90 | 2.17 | 0.186 | 0.170 | 0.092 |
| control 40 | 62.30 | 1.69 | 0.182 | 0.175 | 0.093 |
| control 41 | 64.20 | 2.84 | 0.190 | 0.189 | 0.102 |
| control 42 | 64.20 | 3.24 | 0.182 | 0.168 | 0.103 |
| control 43 | 64.50 | 3.52 | 0.177 | 0.183 | 0.101 |
| control 44 | 63.90 | 3.50 | 0.179 | 0.185 | 0.104 |
| control 45 | 63.80 | 3.86 | 0.199 | 0.197 | 0.104 |
| control 46 | 64.30 | 3.94 | 0.191 | 0.184 | 0.107 |
| control 47 | 64.35 | 3.81 | 0.192 |  | 0.106 |
| control 48 | 63.65 | 3.46 | 0.180 | 0.182 | 0.110 |
| invention 4 | 64.70 | 0.92 | 0.190 | 0.148 | 0.096 |

FIG. 15 shows the dispersion quality and $MW_{sol}$ of the invention and control samples described above comprising BLACK PEARL® 800 carbon black at 55 phr loading. The data shown in FIG. 15 clearly reveals that the macro-dispersion quality of the novel elastomer composites of the invention comprising Black Pearl® 800 carbon black, is significantly superior to that of the control samples. The macro-dispersion values for elastomer composites of the invention comprising Black Pearl® 800 carbon black, as shown in FIG. 15, are described by the following equations:

$$D(\%) < 1.5\% \tag{11}$$

when $MW_{sol} < 0.65 \times 10^6$; and $$\log(D) < \log(1.5) + 2.5 \times [MW_{sol} - (0.65 \times 10^6)] \times 10^{-6} \tag{12}$$

when $0.65 \times 10^6 < MW_{sol} < 1.1 \times 10^6$.

None of the control samples achieved macro-dispersion quality of 1.0% or better at any $MW_{sol}$, even after dry mixing sufficiently to degrade $MW_{sol}$ below $0.65 \times 10^6$. In contrast, elastomer composites of the invention comprising Black Pearl® 800 carbon black and having $MW_{sol}$ above $0.65 \times 10^6$ have excellent macro-dispersion, such as D(%) less than 0.2%. Compound properties and performance characteristics for the invention and control samples shown in FIG. 15, comprising Black Pearl® 800 carbon black, are set forth in Table 28 below. It can be seen that invention sample No. 8 has exceptionally good resistance to crack growth, as indicated by its very low crack growth rate value of only 0.27 cm/million cycles. In fact, the invention samples are far superior to the corresponding control samples. This is believed to be due largely to the better $MW_{sol}$ and macro-dispersion of carbon black in the invention sample, as discussed above.

TABLE 28

Compound Properties of NR Compounds
Containing BLACK PEARL 800 Carbon Black at 55 phr Loading

| Sample No. | Mooney ML(1 + 4) @ 100 C. | Hardness | E100 (psi) | E300 (psi) | Tensile (psi) | EB (%) |
|---|---|---|---|---|---|---|
| control 113 | 110.5 | 66.4 | 345.0 | 1333.0 | 3878.0 | 598 |
| control 114 | 109.0 | 67.3 | 367.0 | 1427.0 | 4033.0 | 606 |
| control 115 | 106.4 | 67.2 | 363.0 | 1311.0 | 3896.0 | 610 |
| control 116 | 105.7 | 69.0 | 322.0 | 1202.0 | 3856.0 | 626 |
| control 117 | 110.6 | 67.1 | 316.0 | 1400.0 | 4180.0 | 616 |
| control 118 | 118.9 | 67.1 | 310.0 | 1395.0 | 3967.0 | 607 |
| control 119 | 111.9 | 67.7 | 309.0 | 1323.0 | 4149.0 | 634 |
| control 120 | 110.6 | 67.6 | 373.0 | 1188.0 | 4199.0 | 653 |
| control 121 | 114.7 | 66.3 | 287.0 | 1262.0 | 4329.0 | 667 |
| control 122 | 110.6 | 65.8 | 288.0 | 1223.0 | 4217.0 | 659 |
| control 123 | 115.0 | 67.5 | 280.0 | 1282.0 | 4071.0 | 624 |
| control 124 | 116.5 | 66.5 | 309.0 | 1388.0 | 4166.0 | 623 |
| control 125 | 113.4 | 65.4 | 281.0 | 1274.0 | 3978.0 | 631 |
| control 126 | 101.4 | 66.8 | 280.0 | 1222.0 | 4206.0 | 656 |
| control 127 | 105.5 | 66.4 | 262.0 | 1150.0 | 4167.0 | 670 |
| control 128 | 110.7 | 66.8 | 292.0 | 1301.0 | 4209.0 | 643 |
| invention 8 | 131.3 | 62.5 | 227.0 | 1291.0 | 3418.0 | 532 |

TABLE 28-continued

Compound Properties of NR Compounds
Containing BLACK PEARL 800 Carbon Black at 55 phr Loading

| Sample No. | Rebound | Crack Growth Rate (cm/million cycles) | Abrasion loss (g) | Tan δ @ 0° C. | Tan δ @ 60° C. |
|---|---|---|---|---|---|
| control 113 | 44.7 | 3.14 | 0.148 | 0.281 | 0.184 |
| control 114 | 45.0 | 2.72 | 0.125 | 0.274 | 0.185 |
| control 115 | 47.0 | 2.54 | 0.163 | 0.233 | 0.171 |
| control 116 | 46.6 | 2.41 | 0.194 | 0.244 | 0.163 |
| control 117 | 40.9 | 4.56 | 0.086 | 0.327 | 0.214 |
| control 118 | 41.8 | 2.80 | 0.112 | 0.335 | 0.225 |
| control 119 | 41.7 | 4.33 | 0.091 | 0.321 | 0.216 |
| control 120 | 42.1 | 3.89 | 0.095 | 0.301 | 0.207 |
| control 121 | 39.2 | 3.38 | 0.075 | 0.312 | 0.256 |
| control 122 | 38.7 | 4.58 | 0.108 | 0.344 | 0.236 |
| control 123 | 40.2 | 4.79 | 0.103 | 0.329 | 0.232 |
| control 124 | 41.7 | 3.78 | 0.102 | 0.321 | 0.209 |
| control 125 | 38.9 | 3.40 | 0.076 | 0.352 | 0.248 |
| control 126 | 38.1 | 5.57 | 0.070 | 0.355 | 0.241 |
| control 127 | 38.2 | 4.79 | 0.073 | 0.346 | 0.254 |
| control 128 | 39.4 | 3.40 | 0.113 | 0.357 | 0.23 |
| invention 8 | 44.8 | 0.27 | 0.130 | 0.297 | 0.199 |

FIG. 16 shows the dispersion quality and $MW_{sol}$ of the invention and control samples described above comprising N326 carbon black at 55 phr loading. The data shown in FIG. 16 clearly reveals that the macro-dispersion quality of the novel elastomer composites of the invention comprising N326 carbon black is significantly superior to that of the control samples. The macro-dispersion values for the elastomer composites of the invention comprising N326 carbon black, as shown in FIG. 16, are described by the following equations:

$$D(\%) < 1\% \tag{13}$$

when $MW_{sol} < 0.7 \times 10^6$; and $$\log(D) < \log(1) + 2.5 \times [MW_{sol} - (0.7 \times 10^6)] \times 10^{-6} \tag{14}$$

when $0.7 \times 10^6 < MW_{sol} < 1.1 \times 10^6$.

None of the control samples achieved macro-dispersion quality of 1.0% or better at any $MW_{sol}$, even after dry mixing sufficiently to degrade $MW_{sol}$ below $0.7 \times 10^6$. In contrast, elastomer composites of the invention comprising N326 carbon black and having $MW_{sol}$ above $0.7 \times 10^6$ have excellent macro-dispersion, such as D(%) not greater than 0.2%. Compound properties and performance characteristics for the invention and control samples shown in FIG. 16, comprising N326 carbon black are set forth in Table 29 below. It can be seen that invention sample No. 9 has exceptionally good resistance to crack growth, as indicated by its very low crack growth rate value of only 0.77 cm/million cycles. In fact, the invention sample is far superior to the corresponding control samples. This is believed to be due largely to the better $MW_{sol}$ and macro-dispersion of carbon black in the invention sample, as discussed above.

TABLE 29

Compound Properties of NR Compounds
Containing N326 Carbon Black at 55 phr Loading

| Sample No. | Mooney ML(1 + 4) @ 100° C. | Hardness | E100 (psi) | E300 (psi) | Tensile (psi) | EB (%) |
|---|---|---|---|---|---|---|
| control 145 | 64.6 | 60.5 | 289 | 1713 | 3921 | 548 |
| control 146 | 88.2 | 62.4 | 340 | 1802 | 4094 | 553 |
| control 147 | 91.7 | 63.3 | 391 | 1917 | 3991 | 528 |
| control 148 | 96.8 | 64.3 | 326 | 1664 | 4045 | 572 |
| control 149 | 62.4 | 61.5 | 310 | 1763 | 4029 | 552 |
| control 150 | 67.7 | 62.6 | 326 | 1855 | 4055 | 551 |
| control 151 | 76.5 | 60.6 | 287 | 1641 | 4015 | 575 |
| control 152 | 79.4 | 63.6 | 329 | 1720 | 3980 | 559 |
| control 153 | 57.2 | 60.1 | 282 | 1623 | 3968 | 579 |
| control 154 | 57.2 | 62.8 | 354 | 1889 | 3879 | 525 |
| control 155 | 57.3 | 62.2 | 323 | 1763 | 3975 | 556 |
| control 156 | 60.1 | 61.9 | 310 | 1667 | 3918 | 564 |
| control 157 | 45.1 | 61.2 | 328 | 1748 | 3768 | 533 |
| control 158 | 50.1 | 60.6 | 315 | 1740 | 3817 | 546 |
| control 159 | 53.2 | 61.3 | 306 | 1675 | 3886 | 563 |
| control 160 | 50.5 | 62.6 | 331 | 1752 | 3884 | 549 |
| invention 9 | 77.8 | 60.9 | 277 | 1563 | 4167 | 593 |

| Sample No. | Rebound | Crack Growth Rate (cm/million cycles) | Abrasion loss (g) | Tan δ @ 0° C. | Tan δ @ 60° C. |
|---|---|---|---|---|---|
| control 145 | 57.8 | 2.84 | 0.0952 | 0.225 | 0.129 |
| control 146 | 58.1 | 2.52 | 0.0887 | 0.217 | 0.126 |

TABLE 29-continued

Compound Properties of NR Compounds
Containing N326 Carbon Black at 55 phr Loading

| | | | | | |
|---|---|---|---|---|---|
| control 147 | 57.6 | 2.03 | 0.0946 | 0.205 | 0.123 |
| control 148 | 56.3 | 1.63 | 0.0927 | 0.221 | 0.129 |
| control 149 | 57.2 | 3.39 | 0.0827 | 0.234 | 0.142 |
| control 150 | 56.8 | 2.77 | 0.0866 | 0.234 | 0.150 |
| control 151 | 55.6 | 2.61 | 0.0933 | 0.241 | 0.149 |
| control 152 | 54.5 | 2.79 | 0.0857 | 0.249 | 0.155 |
| control 153 | 55.4 | 3.12 | 0.0911 | 0.258 | 0.170 |
| control 154 | 56.0 | 3.35 | 0.0858 | 0.241 | 0.147 |
| control 155 | 55.4 | 3.63 | 0.0811 | 0.254 | 0.152 |
| control 156 | 54.9 | 3.55 | 0.0906 | 0.261 | 0.153 |
| control 157 | 55.5 | 3.02 | 0.0931 | 0.254 | 0.149 |
| control 158 | 55.4 | 3.81 | 0.0914 | 0.249 | 0.150 |
| control 159 | 54.9 | 3.23 | 0.0933 | 0.240 | 0.158 |
| control 160 | 55.2 | 3.19 | 0.0942 | 0.246 | 0.163 |
| invention 9 | 58.4 | 0.77 | 0.0939 | 0.225 | 0.136 |

FIG. 17 shows the dispersion quality and $MW_{sol}$ of the invention and control samples described above comprising REGAL (trademark) 660 carbon black. Selected invention and control samples shown in FIG. 17 comprised oil, as set forth above. The data shown in FIG. 17 clearly reveals that the macro-dispersion quality of the novel elastomer composites of the invention comprising REGAL® 660 carbon black, over a wide range of $MW_{sol}$ values, is significantly superior to that of the control samples. The macro-dispersion values for the elastomer composites of the invention comprising REGAL® 660 carbon black, as shown in FIG. 17 are described by the following equations:

$$D(\%) < 1\% \quad (15)$$

when $MW_{sol} < 0.6 \times 10^6$; and $$\log(D) < \log(1) + 2.5 \times [MW_{sol} - (0.6 \times 10^6)] \times 10^{-6} \quad (16)$$

when $0.6 \times 10^6 < MW_{sol} < 1.1 \times 10^6$.

None of the control samples achieved macro-dispersion quality of 1.0% or better at any $MW_{sol}$, even after dry mixing sufficiently to degrade $MW_{sol}$ below $0.6 \times 10^6$. In contrast, elastomer composites of the invention comprising Regale 660 carbon black and having $MW_{sol}$ above $0.6 \times 10^6$ have excellent macro-dispersion, such as D(%) less than 0.2%. Compound properties and performance characteristics for the invention sample No. 10 and various control samples shown in FIG. 17, comprising Regale 660 carbon black, are set forth in Table 30 below. It can be seen that invention sample No. 10 has exceptionally good resistance to crack growth, as indicated by its very low crack growth rate value of only 0.69 cm/million cycles. In fact, the invention samples are far superior to the corresponding control samples. This is believed to be due largely to the better $MW_{sol}$ and macro-dispersion of carbon black in the invention sample, as discussed above.

TABLE 30

Compound Properties of NR Compounds
Containing REGAL 660 Carbon Black at 55 phr Loading

| Sample No. | Mooney ML(1 + 4) @ 100° C. | Hardness | E100 (psi) | E300 (psi) | Tensile (psi) | EB (%) |
|---|---|---|---|---|---|---|
| control 177 | | 61.0 | 213 | 942 | | 702 |
| control 178 | 87.6 | 63.2 | 232 | 943 | 4002 | 694 |
| control 179 | 87.1 | 64.9 | 285 | 1134 | 4016 | 644 |
| control 180 | 85.6 | 64.0 | 271 | 1198 | 4058 | 618 |
| control 181 | 80.1 | 61.0 | 206 | 945 | 4098 | 661 |
| control 182 | 93.4 | 59.0 | 192 | 835 | 3924 | 733 |
| control 183 | 89.0 | 61.0 | 215 | 920 | 4134 | 698 |
| control 184 | 83.4 | 62.4 | 223 | 996 | 4236 | 694 |
| control 185 | 70.1 | 60.0 | 178 | 794 | 3768 | 717 |
| control 186 | 69.8 | 60.3 | 196 | 920 | 4051 | 666 |
| control 187 | 76.7 | 63.5 | 166 | 866 | 4157 | 720 |
| control 188 | 72.1 | 62.0 | 191 | 883 | 4182 | 704 |
| control 189 | 54.3 | 61.2 | 222 | 1079 | 4240 | 674 |
| control 190 | 55.7 | 61.1 | 193 | 942 | 4125 | 692 |
| control 191 | | 65.0 | | | | |
| control 192 | 61.1 | 60.4 | 191 | 902 | 4189 | 710 |
| invention 10 | 88.1 | 62.9 | 249 | 1202 | 4292 | 634 |

| Sample No. | Rebound | Crack Growth Rate (cm/million cycles) | Abrasion loss (g) | Tan δ @ 0° C. | Tan δ @ 60° C. |
|---|---|---|---|---|---|
| control 177 | 54.6 | | | | 0.131 |
| control 178 | 55.6 | 2.34 | 0.1649 | 0.194 | 0.129 |
| control 179 | 53.7 | 2.78 | 0.1620 | 0.200 | 0.140 |

TABLE 30-continued

Compound Properties of NR Compounds
Containing REGAL 660 Carbon Black at 55 phr Loading

| control 180 | 52.9 | 2.98 | 0.1385 | 0.220 | 0.153 |
| control 181 | 51.0 | 3.41 | 0.1189 | 0.267 | 0.185 |
| control 182 | 49.9 | 3.11 | 0.1076 | 0.270 | 0.194 |
| control 183 | 50.1 | 3.15 | 0.1086 | 0.264 | 0.192 |
| control 184 | 48.0 | 3.11 | 0.1085 | 0.284 | 0.208 |
| control 185 | 47.5 | 4.59 | 0.0937 | 0.306 | 0.209 |
| control 186 | 48.5 | 4.06 | 0.1008 | 0.295 | 0.211 |
| control 187 | 47.7 | 3.53 | 0.1041 | 0.297 | 0.198 |
| control 188 | 47.8 | 3.79 | 0.0985 | 0.285 | 0.207 |
| control 189 | 47.5 | 3.71 | 0.0957 | 0.306 | 0.203 |
| control 190 | 46.8 | 4.14 | 0.0962 | 0.300 | 0.200 |
| control 191 | 47.4 | | | | 0.226 |
| control 192 | 46.5 | 4.78 | 0.0897 | 0.301 | 0.226 |
| invention 10 | 48.2 | 0.69 | 0.0942 | 0.271 | 0.178 |

FIG. 18 shows the dispersion quality and $MW_{sol}$ of the invention and control samples described above comprising N234 carbon black. Selected invention and control samples shown in FIG. 18 comprised oil, as set forth above. The data shown in FIG. 18 clearly reveals that the macro-dispersion quality of the novel elastomer composites of the invention comprising N234 carbon black, over a wide range of $MW_{sol}$ values, is significantly superior to that of the control samples. The macro-dispersion values for the elastomer composites of the invention comprising N234 carbon black, as shown in FIG. 18 are described by the following equations:

$$D(\%) < 0.3\% \quad (17)$$

when $MW_{sol} < 0.35 \times 10^6$; and $$\log(D) < \log(0.3) + 2.8 \times [MW_{sol} - (0.35 \times 10^6)] \times 10^{-6} \quad (18)$$

when $0.35 \times 10^6 < MW_{sol} < 1.1 \times 10^6$.

None of the control samples achieved macro-dispersion quality of 0.3% or better at any $MW_{sol}$, even after dry mixing sufficiently to degrade $MW_{sol}$ below $0.35 \times 10^6$ In contrast, elastomer composites of the invention comprising N234 carbon black and having $MW_{sol}$ greater than $0.35 \times 10^6$ have excellent macro-dispersion, such as D(%) not more than 0.3% or even 0.2%. Compound properties and performance characteristics for invention sample No. 14 and various control samples shown in FIG. 18, comprising N234 carbon black, are set forth in Table 31 below. It can be seen that invention sample No. 14 has good resistance to crack growth, as indicated by its crack growth rate value of only 2.08 cm/million cycles.

TABLE 31

Compound Properties of NR Compounds
Containing N234 Carbon Black at 55 phr Loading

| Sample No. | Mooney ML(1 + 4) @ 100° C. | Hardness | E100 (psi) | E300 (psi) | Tensile (psi) | EB (%) |
|---|---|---|---|---|---|---|
| control 273 | 94.5 | 68.0 | 386 | 2077 | 3718 | 511 |
| control 274 | 121.6 | 69.6 | 464 | 2299 | 3925 | 501 |
| control 275 | 121.4 | 72.5 | 564 | 2545 | 3994 | 472 |
| control 276 | 132.2 | 71.9 | 511 | 2259 | 3964 | 520 |
| control 277 | 79.6 | 68.5 | 468 | 2453 | 3857 | 469 |
| control 278 | 96.3 | 70.0 | 531 | 2499 | 3874 | 469 |
| control 279 | 108.6 | 69.0 | 406 | 2131 | 3863 | 532 |
| control 280 | 120.3 | 71.5 | 476 | 2273 | 3852 | 502 |
| control 281 | 76.4 | 69.7 | 556 | 2723 | 4027 | 451 |
| control 282 | 89.8 | 69.8 | 553 | 2574 | 3896 | 465 |
| control 283 | 93.6 | 69.6 | 506 | 2416 | 3867 | 475 |
| control 284 | 106.7 | 71.8 | 526 | 2384 | 3788 | 484 |
| control 285 | 73.3 | 69.3 | 529 | 2586 | 3831 | 444 |
| control 286 | 79.2 | 69.5 | 531 | 2574 | 3856 | 456 |
| control 287 | 77.8 | 70.7 | 544 | 2486 | 3834 | 461 |
| control 288 | 82.8 | 71.2 | 485 | 2295 | 3799 | 499 |
| invention 14 | 82.6 | 71.5 | 500 | 2440 | 3883 | 531 |

| Sample No. | Rebound | Crack Growth Rate (cm/million cycles) | Abrasion loss (g) | Tan δ @ 0° C. | Tan δ @ 60° C. |
|---|---|---|---|---|---|
| control 273 | 45.9 | 2.14 | 0.0563 | 0.285 | 0.183 |
| control 274 | 47.2 | 1.84 | 0.0583 | 0.274 | 0.173 |
| control 275 | 46.1 | 1.70 | 0.0538 | 0.284 | 0.172 |
| control 276 | 46.9 | 1.21 | 0.0620 | 0.270 | 0.173 |
| control 277 | 47.1 | 2.22 | 0.0628 | 0.305 | 0.173 |
| control 278 | 45.8 | 2.40 | 0.0634 | 0.299 | 0.196 |

TABLE 31-continued

Compound Properties of NR Compounds
Containing N234 Carbon Black at 55 phr Loading

| control 279 | 45.4 | 2.00 | 0.0680 | 0.306 | 0.198 |
| control 280 | 44.2 | 1.81 | 0.0646 | 0.298 | 0.198 |
| control 281 | 46.3 | 3.10 | 0.0598 | 0.293 | 0.174 |
| control 282 | 46.5 | 2.33 | 0.0537 | 0.307 | 0.182 |
| control 283 | 46.4 | 2.41 | 0.0594 | 0.309 | 0.186 |
| control 284 | 44.2 | 1.99 | 0.0579 | 0.304 | 0.190 |
| control 285 | 47.0 | 2.99 | 0.0554 | 0.295 | 0.178 |
| control 286 | 45.6 | 2.85 | 0.0551 | 0.294 | 0.172 |
| control 287 | 45.4 | 2.93 | 0.0569 | 0.305 | 0.187 |
| control 288 | 44.0 | 2.39 | 0.0647 | 0.316 | 0.198 |
| invention 14 | 45.1 | 2.08 | 0.0698 | 0.310 | 0.198 |

FIG. 19 shows the dispersion quality and $MW_{sol}$ of the invention and control samples described above comprising N110 carbon black at 55 phr loading. The data shown in FIG. 19 clearly reveals that the macro-dispersion quality of the novel elastomer composites of the invention comprising N110 carbon black, over a wide range of $MW_{sol}$ values, is significantly superior to that of the control samples. The macro-dispersion values for the elastomer composites of the invention comprising N110 carbon black, as shown in FIG. 19, are described by the following equations:

$$D(\%) < 0.5\% \quad (19)$$

when $MW_{sol} < 0.35 \times 10^6$; and $$\log(D) < \log(0.5) + 2.5 \times [MW_{sol} - (0.6 \times 10^6)] \times 10^- \quad (20)$$

when $0.35 \times 10^6 < MW_{sol} < 1.1 \times 10^6$.

None of the control samples achieved macro-dispersion quality of 0.5% at any $MW_{sol}$, even after dry mixing sufficiently to degrade $MW_{sol}$ below $0.35 \times 10^6$. In contrast, elastomer composites of the invention comprising N110 carbon black and having $MW_{sol}$ above $0.35 \times 10^6$ have excellent macro-dispersion, such as D(%) less than 0.2%.

FIG. 20 shows the dispersion quality and $MW_{sol}$ of invention sample 22 and the control samples described above comprising N351 carbon black at 33 phr loading. The data shown in FIG. 20 clearly reveals that the macro-dispersion quality of the novel elastomer composites of the invention comprising N351 carbon black, over a wide range of $MW_{sol}$ values, is significantly superior to that of the control samples. The macro-dispersion values for the elastomer composites of the invention comprising N351 carbon black, as shown in FIG. 20, are described by the following equations:

$$D(\%) < 0.3\% \quad (21)$$

when $MW_{sol} < 0.55 \times 10^6$; and $$\log(D) < \log(0.3) + 2.0 \times [MW_{sol} - (0.55 \times 10^6)] \times 10^{-6} \quad (22)$$

when $0.55 \times 10^6 < MW_{sol} < 1.1 \times 10^6$.

None of the control samples achieved macro-dispersion quality of 1.0% at any $MW_{sol}$, even after dry mixing sufficiently to degrade $MW_{sol}$ below $0.35 \times 10^6$. In contrast, elastomer composites of the invention comprising N351 carbon black and having $MW_{sol}$ above $0.35 \times 10^6$ have excellent macro-dispersion, such as D(%) less than 0.2%.

FIG. 21 shows the dispersion quality and $MW_{sol}$ of the invention sample No. 23 and control samples described above comprising STERLING® 6740 carbon black at 55 phr loading. The data shown in FIG. 21 clearly reveals that the macro-dispersion quality of the novel elastomer composites of the invention comprising STERLING® 6740 carbon black, over a wide range of $MW_{sol}$ values, is significantly superior to that of the control samples. The macro-dispersion values for the elastomer composites of the invention comprising STERLING® 6740 carbon black, as shown in FIG. 21 are described by the following equations:

$$D(\%) < 0.1\% \quad (23)$$

when $MW_{sol} < 0.3 \times 10^6$; and $$\log(D) < \log(0.1) + 2.0 \times [MW_{sol} - (0.3 \times 10^6)] \times 10^{-6} \quad (24)$$

when $0.3 \times 10^6 < MW_{sol} < 1.1 \times 10^6$.

None of the control samples achieved macro-dispersion quality of 0.1% or even 0.2% at any $MW_{sol}$, even after dry mixing sufficiently to degrade $MW_{sol}$ below $0.3 \times 10^6$. In contrast, elastomer composites of the invention comprising STERLING® 6740 carbon black and having $MW_{sol}$ above $0.3 \times 10^6$ have excellent macro-dispersion, such as D(%) less than 0.2% and even less than 0.1%. Compound properties and performance characteristics for invention sample No. 23 and the control samples shown in FIG. 21, comprising STERLING® 6740 carbon black, are set forth in Table 32 below. It can be seen that invention sample No. 23 has good resistance to crack growth, as indicated by its crack growth rate value of only 0.91 cm/million cycles. In fact, the invention sample is far superior to the corresponding control samples. This is believed to be due largely to the better $MW_{sol}$ and macro-dispersion of carbon black in the invention sample, as discussed above.

TABLE 32

Compound Properties of NR Compounds
Containing STERLING 6740 Carbon Black at 55 phr Loading

| Sample No. | Mooney ML(1 + 4) @ 100° C. | Hardness | E100 (psi) | E300 (psi) | Tensile (psi) | EB (%) |
| --- | --- | --- | --- | --- | --- | --- |
| control 412 | 75.50 | 65.1 | 467.0 | 2308.0 | 3519 | 451 |
| control 413 | 85.70 | 65.7 | 469.0 | 2314.0 | 3655 | 479 |

TABLE 32-continued

Compound Properties of NR Compounds
Containing STERLING 6740 Carbon Black at 55 phr Loading

| control 414 | 92.70  | 67.7 | 462.0 | 2243.0 | 3613 | 472 |
|---|---|---|---|---|---|---|
| control 415 | 99.60  | 66.9 | 492.0 | 2260.0 | 3572 | 477 |
| control 416 | 74.50  | 65.8 | 521.0 | 2468.0 | 3584 | 445 |
| control 417 | 78.20  | 67.1 | 502.0 | 2372.0 | 3445 | 436 |
| control 418 | 82.00  | 66.0 | 534.0 | 2418.0 | 3604 | 453 |
| control 419 | 86.10  | 67.8 | 540.0 | 2330.0 | 3620 | 475 |
| control 420 | 66.70  | 66.0 | 515.0 | 2382.0 | 3468 | 444 |
| control 421 | 76.30  | 67.8 | 488.0 | 2310.0 | 3375 | 440 |
| control 422 | 78.30  | 65.8 | 548.6 | 2440.0 | 3549 | 442 |
| control 423 | 82.10  | 66.5 | 487.0 | 2219.0 | 3452 | 466 |
| control 424 | 64.80  | 66.5 | 541.0 | 2448.0 | 3397 | 425 |
| control 425 | 67.50  | 66.5 | 524.0 | 2374.0 | 3474 | 445 |
| control 426 | 70.30  | 66.9 | 546.0 | 2351.0 | 3428 | 446 |
| control 427 | 71.00  | 68.1 | 554.0 | 2340.0 | 3322 | 435 |
| invention 23 | 110.50 | 64.8 | 453.6 | 2241.0 | 3324 | 443 |

| Sample No. | Rebound | Crack Growth Rate (cm/million cycles) | Abrasion loss (g) | Tan δ @ 0° C. | Tan δ @ 60° C. |
|---|---|---|---|---|---|
| control 412 | 59.8 | 5.04 | 0.127 | 0.202 | 0.107 |
| control 413 | 60.0 | 3.63 | 0.128 | 0.203 | 0.108 |
| control 414 | 59.3 | 3.96 | 0.126 | 0.208 | 0.114 |
| control 415 | 58.8 | 4.56 | 0.12  | 0.217 | 0.118 |
| control 416 | 60.3 | 5.67 | 0.117 | 0.188 | 0.094 |
| control 417 | 60.0 | 4.67 | 0.112 | 0.202 | 0.104 |
| control 418 | 59.3 | 4.23 | 0.125 | 0.204 | 0.105 |
| control 419 | 57.5 | 3.22 | 0.122 | 0.218 | 0.117 |
| control 420 | 60.0 | 4.23 | 0.131 | 0.204 | 0.099 |
| control 421 | 58.8 | 3.84 | 0.127 | 0.206 | 0.105 |
| control 422 | 59.8 | 3.98 | 0.126 | 0.210 | 0.106 |
| control 423 | 56.8 | 3.85 | 0.12  | 0.213 | 0.117 |
| control 424 | 58.3 | 4.54 | 0.131 | 0.200 | 0.104 |
| control 425 | 58.8 | 3.65 | 0.129 | 0.207 | 0.100 |
| control 426 | 58.0 | 3.07 | 0.134 | 0.211 | 0.110 |
| control 427 | 56.9 | 3.25 | 0.126 | 0.217 | 0.115 |
| invention 23 | 57.3 | 0.91 | 0.1642 | 0.204 | 0.124 |

Addition Examples

Cured Samples

A number of the masterbatch samples described above, including both selected invention samples and corresponding control samples, were cured and tested. Specifically, samples were mixed accordingly to Stage II in Table 8, above, using the formulation of Table 9, to produce a final compound. The final compound in each case was then cured in a mold using standard techniques at about 150° C. until substantially complete cure was achieved. Performance characteristics of the cured samples were determined by measuring their respective crack growth rates in accordance with the measurement technique set forth above, i.e., using a rotating flexing machine per ASTM D3629-94. The rotating type flexing machine used to measure crack growth is commercially available and well known. It is discussed, for example, in the Proceedings of the International Rubber Conference, 1995 (Kobe, Japan), Paper No. 27A-6 (p. 472-475). The compounds were tested at 100° C. and at a 45° flexing angle. It is generally accepted by those skilled in the art that crack growth rate in such compounds is affected by the molecular weight of the natural rubber and the dispersion quality of the carbon black i.e., by the $MW_{sol}$ and D(%) values of the compounds. Higher $MW_{sol}$ and lower D(%) correlate well with reduced crack growth rate. The crack growth rate and other information for invention samples nos. 9, 10 and 16 are set forth in Table 33 below. The corresponding test results for corresponding control samples is set forth in Table 34 below, grouped by choice of carbon black. Also, Tan $\delta_{max}$ @ 60° C. was measured for invention samples nos. 24-32 and for corresponding control samples. The Tan $\delta_{max}$ @ 60° C. values for the invention samples are set forth in Table 35 below. The corresponding test results for control samples is set forth in Table 36 below.

Control samples No. 444-450 shown in Table 36 were made in accordance with the procedures described above for control sample code M2D1 using RSS1 natural rubber. All used carbon black N234 at the loading level (phr) shown in Table 36, along with 5 phr extender oil.

TABLE 33

Crack Growth Rate of Invention Samples

| Invention Sample No. | CB/Loading/Oil | $MW_{sol}$(K) | CGR (cm/million cycles) |
|---|---|---|---|
| 9  | N326/55/0 | 666 | 0.77 |
| 10 | R660/55/0 | 678 | 0.69 |
| 16 | N234/55/0 | 500 | 0.88 |

TABLE 34

Crack Growth Rate of Control Samples

| Code | Sample No. | $Mw_{sol}$ (K) | CGR (cm/million cycles) | Code | Sample No. | $Mw_{sol}$ (K) | CGR (cm/million cycles) |
|---|---|---|---|---|---|---|---|
| | | N234/55 phr/0 RSS1 | | | | N326/55 phr/0 RSS1 | |
| M1D1 | 273 | 585 | 2.14 | M1D1 | 145 | 550 | 2.84 |
| M1D2 | 274 | 669 | 1.84 | M1D2 | 146 | 636 | 2.52 |
| M1D3 | 275 | 759 | 1.70 | M1D3 | 147 | 650 | 2.03 |
| M1D4 | 276 | 896 | 1.21 | M1D4 | 148 | 724 | 1.63 |
| M2D1 | 277 | 580 | 2.22 | M2D1 | 149 | 517 | 3.39 |
| M2D2 | 278 | 602 | 2.40 | M2D2 | 150 | 572 | 2.77 |
| M2D3 | 279 | 631 | 2.00 | M2D3 | 151 | 613 | 2.61 |
| M2D4 | 280 | 667 | 1.81 | M2D4 | 152 | 696 | 2.79 |
| M3D1 | 281 | 457 | 3.10 | M3D1 | 153 | 489 | 3.12 |
| M3D2 | 282 | 476 | 2.33 | M3D2 | 154 | 521 | 3.35 |
| M3D3 | 283 | 493 | 2.41 | M3D3 | 155 | 504 | 3.63 |
| M3D4 | 384 | 495 | 1.99 | M3D4 | 156 | 538 | 3.55 |
| M4D1 | 285 | 372 | 2.99 | M4D1 | 157 | 415 | 3.02 |
| M4D2 | 286 | 382 | 2.85 | M4D2 | 158 | 447 | 3.81 |
| M4D3 | 287 | 381 | 2.93 | M4D3 | 159 | 466 | 3.23 |
| M4D4 | 288 | 403 | 2.39 | M4D4 | 160 | 469 | 3.19 |
| | | Regal 660/55 phr/0 RSS1 | | | | Regal 660/55 phr/0 RSS1 | |
| M1D1 | 177 | 674 | | M3D1 | 185 | 473 | 4.59 |
| M1D2 | 178 | 792 | 2.34 | M3D2 | 186 | 506 | 4.06 |
| M1D3 | 179 | 891 | 2.78 | M3D3 | 187 | 562 | 3.53 |
| M1D4 | 180 | 676 | 2.98 | M3D4 | 188 | 559 | 3.79 |
| M2D1 | 181 | 598 | 3.41 | M4D1 | 189 | 401 | 3.71 |
| M2D2 | 182 | 602 | 3.11 | M4D2 | 190 | 426 | 4.14 |
| M2D3 | 183 | 697 | 3.15 | M4D3 | 191 | 466 | |
| M2D4 | 184 | 659 | 3.11 | M4D4 | 192 | 449 | 4.78 |

TABLE 35

Tan δ at 60° C. for Invention Samples

| Invention Sample No. | N234 Loading/ Oil (phr) | $Mw_{sol}$ (K) | Max.Tan δ @ 60° C. |
|---|---|---|---|
| 24 | 48/5 | 569 | 0.169 |
| 25 | 53/5 | 485 | 0.176 |
| 26 | 58/5 | 447 | 0.191 |
| 27 | 63/5 | 403 | 0.219 |
| 28 | 68/5 | 378 | 0.227 |
| 29 | 49/5 | 618 | 0.159 |
| 30 | 54/5 | 482 | 0.171 |
| 31 | 63/5 | 390 | 0.228 |
| 32 | 65/5 | 325 | 0.224 |

TABLE 36

Tan δ at 60° C. for Control Samples

| Sample No. | Mw (K) | D (%) | N234 Loading/ Oil (phr) | Max.Tan D (@60° C.) |
|---|---|---|---|---|
| 444 | 428 | 0.25 | 37/5 | 0.154 |
| 445 | 409 | 0.37 | 42/5 | 0.170 |
| 446 | 379 | 0.42 | 48/5 | 0.179 |
| 447 | 361 | 0.58 | 51/5 | 0.195 |
| 448 | 366 | 0.27 | 53/5 | 0.212 |
| 449 | 290 | 0.39 | 58/5 | 0.215 |
| 450 | 296 | 0.64 | 63/5 | 0.245 |

It can be seen from a comparison of Table 33 and 34 that advantageously lower crack growth rate is achieved by the invention samples, compared to the control samples. Lower crack growth rate correlates with good durability and related characteristics for numerous applications, including tire applications and the like. In addition, it can be seen from a comparison of Tables 35 and 36 that better Tan $δ_{max}$ values are achieved by the invention samples, that is, values which are lower than the values of the control sample. Accordingly, improved performance is achieved by the invention samples for numerous product applications including, for example, tire applications and the like requiring low hysteresis for correspondingly low rolling resistance.

The advantageous performance characteristics of the elastomer composites of the invention are exemplified by the crack growth rate of invention sample no. 16 comprising N234 carbon black and corresponding test results for control samples nos. 273 to 288 shown graphically in FIG. 22. Specifically, FIG. 22 clearly demonstrates a correlation between $MW_{sol}$ and crack growth rate for the control samples, as well as the advantageous impact of excellent macro-dispersion in the elastomer composites of the present invention. It should be understood that the $MW_{sol}$ values shown in FIGS. 22-24 and in Tables 33-36 are for the masterbatch materials prior to cure. The molecular weight of the cured material is understood to correlate well to the $MW_{sol}$ value of the uncured masterbatch. The crack growth rate of the control samples over an $MW_{sol}$ range of about $0.25 \times 10^6$ to $0.6 \times 10^6$ is seen to fit well along a straight line correlation to $MW_{sol}$. In contrast, the invention sample no. 16 at $MW_{sol}$ $0.5 \times 10^6$ has significantly better (i.e., lower) crack growth rate than any of the corresponding control samples, due to the better macro-dispersion D(%) of the invention sample. This is further established by the similar showing in FIG. 23, wherein the crack growth rate of invention sample no. 9 comprising N326 carbon black is seen to be significantly lower than that of any of the corresponding control samples nos. 145 to 160, and is well below the correlation line. Likewise in FIG. 24 the excellent macro-dispersion of invention sample no. 10 is seen to result again in a crack growth value which lies far below the correlation line between crack growth rate and $MW_{sol}$ established by the corresponding control samples nos. 177 to 192. In FIG. 25, the max tan δ at 60° C. is shown graphically to be better, i.e., lower, for invention samples nos. 24 to 28 and invention samples nos. 29 to 32 than for corresponding control samples nos. 444 to 450.

The superior crack growth results discussed above for elastomer composites of the present invention not only demonstrates advantageous fatigue properties, but also indicates advantageous fracture properties, such as excellent tear and cut-and-chip resistance. The superior hysteresis results discussed above for the elastomer composites of this invention not only demonstrate advantageously low rolling resistance (and correspondingly higher fuel economy) for motor vehicle tire applications, but also indicates advantageous improvement in related performance properties, such as reduced heat build-up. One or more of these superior properties, fatigue and fracture resistance, low hysteresis, low heat build-up, etc., render elastomer composites of the present invention well suited for use in commercial applications such as tire applications and in industrial rubber products. Regarding tire applications, various preferred embodiments of the invention are particularly well-suited for use as: tire tread, especially in tread for radial and bias truck tires, off-the-road ("OTR") tires, airplane tires and the like; sub-tread; wire skim; sidewalls; cushion gum for retread tires; and similar tire applications. The superior performance characteristics achieve by various preferred embodiments of the invention can provide improved tire durability, tread life and casing life, better fuel economy for the motor vehicle and other advantages. Regarding industrial rubber products, various preferred embodiments of the invention are particularly well-suited for use as: engine mounts, hydro-mounts, bridge bearings and seismic isolators, tank tracks or tread, mining belts and similar products applications. The superior performance characteristics achieved by various preferred embodiments of the invention can provide improved fatigue life, durability and other advantages for such product applications.

FIGS. 26-29 are graphical representations of carbon black morphology, structure (DBPA) and surface area (CTAB), corresponding generally to FIG. 8. Carbon black morphology region 261 in FIG. 26 includes carbon blacks currently in commercial use for OTR tire tread applications. Arrow 262 indicates the direction in which region 261 can be advantageously extended in accordance with the present invention. Performance characteristics such as cut-and-chip resistance, crack growth resistance and tear resistance are understood to improve generally in the direction of trend arrow 262 subject, however, in the past, to offsetting degradation of these and other characteristics due to reduced molecular weight of the natural rubber and/or poorer macro-dispersion resulting from the use of such higher surface area, lower structure carbon blacks. Elastomer composites of the present invention can employ such lower structure, higher surface area carbon black indicated by trend arrow 262 to achieve significantly improved OTR trend materials, in view of their excellent macro-dispersion and $MW_{sol}$.

Similarly, carbon black morphology region 271 in FIG. 27 includes carbon blacks currently in commercial use for truck and bus (T/B) tire tread applications. Arrow 272 indicates the direction in which region 271 can be advantageously extended in accordance with the present invention. Performance characteristics, such as wear resistance, are understood to improve generally in the direction of trend arrow 272 subject, however, in the past, to offsetting degradation of these and other characteristics due to reduced molecular weight of the rubber and/or poorer macro-dispersion resulting from use of such higher surface area carbon blacks. Elastomer composites of the present invention can employ such higher surface area carbon blacks indicated by trend arrow 272 to achieve improved T/B tread materials, in view of their excellent macro-dispersion and $MW_{sol}$.

Similarly, carbon black morphology regions 281 and 283 in FIG. 28 show carbon blacks currently in commercial use for tread base and passenger car (PC) tire tread, respectively. Trend arrows 282 and 284 indicate the direction in which region 281 and 283, respectively, can be advantageously extended in accordance with the present invention. Performance characteristics such as heat build-up (HBU) and rolling resistance are understood to improve for tread base in the direction of trend arrow 282 subject, however, in the past, to offsetting degradation of these and other characteristics due to reduced molecular weight of the rubber and/or poorer macro-dispersion resulting from use of such higher surface area, lower structure carbon blacks. Likewise, performance characteristics such as rolling resistance are understood to improve for PC tread in the direction of trend arrow 284 subject, however, in the past, to offsetting degradation of these and other characteristics due to reduced molecular weight of the rubber and/or poorer macro-dispersion resulting from use of such higher surface area, lower structure carbon blacks. Elastomer composites of the present invention can employ higher surface area, lower structure carbon blacks indicated by arrows 282 and 284 to achieve improved tread base and PC tread, respectively, in view of the excellent macro-dispersion and the optional preservation of high molecular weight in such elastomer composites.

Similarly, carbon black morphology regions 291, 293 and 294 in FIG. 29 show carbon blacks currently in commercial use for sidewall, apex and steel belt tire applications, respectively. Trend arrows 292 and 295 indicate the direction in which region 291 and 294, respectively, can be advantageously extended in accordance with the present invention. Performance characteristics such as heat build-up (HBU) and fatigue life are understood to improve for sidewall in the direction of trend arrow 292 subject, however, in the past, the offsetting degradation of these and other characteristics due to reduced molecular weight of the rubber and/or poorer macro-dispersion resulting from use of such lower structure carbon blacks. Likewise, performance characteristics such as heat buildup, processing and wire adhesion are understood to improve for steel belt elastomeric materials in the direction of trend arrow 295 subject, however, in the past, to offsetting degradation of these and other characteristics due to reduced molecular weight of the rubber and/or poorer macro-dispersion resulting from use of such higher surface area, lower structure carbon blacks. Elastomer composites of the present invention can employ higher surface area and/or lower structure carbon blacks as indicated by arrows 292 and 295 to achieve improved sidewall and steel belt rubber materials, respectively, in view of the excellent macro-dispersion and the optional preservation of high molecular weight in such elastomer composites.

Additional Examples

Preferred Embodiment and Control Samples Comprising Other Fillers

Additional samples of elastomer composites in accordance with certain preferred embodiments of the present invention, and corresponding control samples, were prepared. A first group of these employed a multiphase aggregate filler of the type referred to above as a silicon-treated carbon black.

Specifically, invention samples nos. 33-34 employed ECOBLACK® silicon-treated carbon black commercially available from Cabot Corporation (Billerica, Mass.). Such ECOBLACK® filler has morphological properties, i.e., structure and surface area, similar to that of carbon black N234. Sample no. 33 employed 45 phr ECOBLACK® filler and no extender oil. Sample no. 34 employed 68 phr ECOBLACK® filler and no extender oil. Typical filler and extender oil usage for various product applications are shown in Table 37, for elastomer composites of the invention comprising natural rubber and a blend of carbon black and silica filler. It should be understood that the use of silica filler in the compositions shown in Table 37 would typically replace a like amount of the carbon black filler.

TABLE 37

Typical NR Formulations for Tire Applications

| Application | Carbon Black Type | Carbon Black Loading | Oil Loading | Silica Loading |
|---|---|---|---|---|
| Truck/Bus Tread | N110, N115, N121, N134, N220, N299 | 40-60 phr | 0-20 phr | 0-10 phr |
| OTR Tread | N110, N115, N220, N231 | 45-55 phr | 5-10 phr | 5-20 phr |
| Steel Belt | N326 | 50-75 phr | 0-5 phr | 0-20 phr |
| Truck/Bus Tread Base | N330, N550 | 40-60 phr | 0-20 phr | |
| Carcass Ply | N326, N330, N550 | 40-60 phr | 5-30 phr | |
| Sidewall | N330, N351, N550 | 30-60 phr | 5-30 phr | |
| Apex | N326, N330, N351 | 50-90 phr | 0-20 phr | |

TABLE 37-continued

Typical NR Formulations for Tire Applications

| Application | Carbon Black Type | Carbon Black Loading | Oil Loading | Silica Loading |
|---|---|---|---|---|
| LRR PC Tread | N234, N299, N339, N343, N347, N351 | 40-60 phr | 0-30 phr | |

A second group of samples employed a blend or mixture of silica and carbon black. In embodiments of the present invention employing a blend of carbon black and silica fillers, it is generally preferred that they be used in weight ratio of at least about 60:40. That is, the carbon black preferably comprises at least about 60 weight percent of the filler to achieve good coagulation of the elastomer and to reduce or eliminate reagglomeration of the silica in the masterbatch. In particular, in examples nos. 35-38, as shown in Table 40, carbon black is used together with particulate $SiO_2$ filler HiSil® 233 available from PPG Industries (Pittsburgh, Pa., USA), having surface area BET of 150 $m^2/g$, surface area DBPA of 190 mils/100 g, pH of 7 and a primary particulate size of 19 nanometers.

All of the invention samples, i.e., additional invention samples nos. 33-38, were prepared in accordance with the procedures and apparatus used for invention samples 1-32, as described above. Process and apparatus details for each of invention samples nos. 33-38 is given in Table 38, below. The field latex or concentrate employed in samples nos. 33-38, as the case may be, is the same as described above with reference to Table 24. It will be appreciated that the data in Table 38 parallels that provided in Table 25, above, for invention samples nos. 1-32. The carbon black filler "CRX2000" listed in Table 38 is the ECOBLACK® silicon-treated carbon black described above.

TABLE 38

Invention Sample Production Details

| Invention Sample No. | Latex type | Cabot Elastomer Composite | | | | Slurry Nozzle Tip | | CB Slurry |
| | | Carbon Black | | HiSil 233 | Oil loading | Dia. | Land length | CB conc. |
| | | Type | Loading (phr) | Loading (phr) | (phr) | (in) | (in) | (% wt) |
|---|---|---|---|---|---|---|---|---|
| 33 | field latex | CRX2000 | 46 | 0 | 0 | 0.020 | 0.5 | 14.5 |
| 34 | field latex | CRX2000 | 58 | 0 | 0 | 0.020 | 0.5 | 14.5 |
| 35 | field latex | N220 | 43 | 10 | 5 | 0.025 | 0.5 | 13.9 |
| 36 | field latex | N234 | 41 | 9 | 0 | 0.020 | 0.5 | 13.5 |
| 37 | field latex | N234 | 31 | 20 | 0 | 0.020 | 0.5 | 14.0 |
| 38 | latex concentrate | STERLING 6740 | 29 | 20 | 0 | 0.020 | 0.5 | 15.5 |

| Invention Sample No. | Coagulum Zone | | | | | | | |
| | 1st portion | | 2nd portion | | 3rd portion | | 4th portion | |
| | Dia. (in) | Length (in) | Dia. (in) | Length (in) | Dia. (in) | Length (in) | Dia. (in) | Length (in) |
|---|---|---|---|---|---|---|---|---|
| 33 | 0.19 | 3.0 | 0.27 | 1.6 | 0.38 | 2.3 | 0.53 | 3.2 |
| 34 | 0.19 | 3.0 | 0.27 | 1.6 | 0.38 | 2.3 | 0.53 | 3.2 |
| 35 | 0.19 | 3.0 | 0.27 | 1.6 | 0.38 | 2.3 | 0.53 | 3.2 |
| 36 | 0.19 | 3.0 | 0.27 | 1.6 | 0.38 | 2.3 | 0.53 | 3.2 |
| 37 | 0.19 | 3.0 | 0.27 | 1.6 | 0.38 | 2.3 | 0.53 | 3.2 |
| 38 | 0.19 | 3.0 | 0.27 | 1.6 | 0.38 | 2.3 | 0.53 | 3.2 |

TABLE 38-continued

Invention Sample Production Details

| | Mixing Zone | | | | | | MicroFluidizer | |
|---|---|---|---|---|---|---|---|---|
| Invention Sample No. | Slurry flow rate (lb/min) | Slurry velocity (ft/sec) | Antioxidant TNPP (phr) | Antioxidant Santoflex(phr) | Latex flow rate (lbs/min) | Latex velocity (ft/sec) | Inlet pressure (psi) | Outlet pressure (psi) |
| 33 | 6.2 | 710 | 0.3 | 0.4 | Field | 7.4 | 10.7 | 17000 |
| 34 | 6.2 | 710 | 0.3 | 0.4 | Field | 5.8 | 8.3 | 17000 |
| 35 | 5.2 | 380 | 0.3 | 0.4 | Field | 4.9 | 7.1 | 14500 |
| 36 | 5.0 | 576 | 0.3 | 0.4 | Field | 4.3 | 6.2 | 10000 |
| 37 | 4.8 | 550 | 0.3 | 0.4 | Field | 4.1 | 5.9 | 9500 |
| 38 | 5.1 | 580 | 0.3 | 0.4 | Conc | 2.2 | 3.2 | 9000 |

| | Slurry Nozzle | Dewatering | | Drying and Cooling | | Production | | |
|---|---|---|---|---|---|---|---|---|
| Invention Sample No. | Tip Pressure (psi) | Initial crumb moisture (%) | Final crumb moisture (%) | Product temp. (° F.) | Product moisture (%) | Mixer Type | Rate (lb/hr) | Invention Sample No. |
| 33 | — | 77.5 | >8.0 | 435 | 0.2 | T-block | 66 | 33 |
| 34 | — | 78.0 | 1.6 | 470 | 0.3 | T-block | 52 | 34 |
| 35 | 1650 | 77.9 | >4.0 | 360 | 0.4 | T-block | 54 | 35 |
| 36 | 3000 | 79.2 | 1.0 | 475 | 0.5 | T-block | 39 | 36 |
| 37 | 2930 | 78.9 | 12.3 | 435 | 0.4 | T-block | 34 | 37 |
| 38 | 2600 | 69.7 | 4.2 | 455 | 0.2 | T-block | 48 | 38 |

The control samples 451-498 were prepared in accordance with the procedures and apparatus described above for control samples nos. 1-450. The processing code (see Table 13 above), filler loading, rubber, $MW_{sol}$ and macro-dispersion for masterbatches 451-466 are set forth below in Table 39. The processing code, filler loading, rubber, $MW_{sol}$ and macro-dispersion values of the invention samples nos. 33-38 (along with the filler and oil loadings for convenient reference) are shown in Table 40. It will be seen from Table 39 that control samples 451-466 correspond in composition to invention samples nos. 33 and 34. Similarly, control samples nos. 467-498 correspond to invention samples nos. 35-38.

TABLE 39

| | CRX 2000/44/0 RSS1 | | | CRX 2000/58/0 RSS1 | | |
|---|---|---|---|---|---|---|
| Code | Sample No. | $Mw_{sol}$ (K) | D (%) | Sample No. | $Mw_{sol}$ (K) | D (%) |
| M2 | | 909 | | | 909 | |
| M3 | | 590 | | | 590 | |
| M2D1 | 451 | 461 | 3.48 | 459 | 333 | 8.61 |
| M2D2 | 452 | 474 | 3.68 | 460 | 392 | 5.71 |
| M2D3 | 453 | 489 | 7.17 | 461 | 388 | 9.48 |
| M2D4 | 454 | 515 | 6.28 | 462 | 394 | 8.05 |
| M3D1 | 455 | 393 | 2.89 | 463 | 280 | 2.23 |
| M3D2 | 456 | 422 | 2.87 | 464 | 298 | 2.13 |
| M3D3 | 457 | 435 | 4.15 | 465 | 350 | 4.05 |
| M3D4 | 458 | 449 | 3.23 | 466 | 379 | 7.22 |

TABLE 40

Sol Molecular Weight and Undispersed Area of Invention Samples

| Invention Sample No. | CB/Loading/Oil | $Mw_{sol}$ (K) | D (%) |
|---|---|---|---|
| 33 | CRX 2000/44/0 | 380 | 0.18 |
| 34 | CRX 2000/58/0 | 448 | 0.10 |
| 35 | N220/Hilsil 233/43/10/5 | 500 | 0.14 |
| 36 | N234/Hilsil 233/40/10/0 | 490 | 0.36 |

TABLE 40-continued

Sol Molecular Weight and Undispersed Area of Invention Samples

| Invention Sample No. | CB/Loading/Oil | $Mw_{sol}$ (K) | D (%) |
|---|---|---|---|
| 37 | N234/Hilsil 233/30/20/0 | 399 | 0.23 |
| 38 | STERLING 6740/Hilsil 233/30/20/0 | 354 | 0.39 |

TABLE 41

| | Sample No. | $Mw_{sol}$ (K) | D (%) | Sample No. | $Mw_{sol}$ (K) | D (%) |
|---|---|---|---|---|---|---|
| Code | N220/Hilsil 233/43/10/5 RSS1 | | | N234/Hilsil 233/40/10/0 RSS1 | | |
| M2 | | 803 | | | 909 | |
| M3 | | 601 | | | 590 | |
| M2D1 | 467 | 493 | 1.51 | 475 | 443 | 8.74 |
| M2D2 | 468 | 537 | 2.61 | 476 | 517 | 10.9 |
| M2D3 | 469 | 523 | 2.82 | 477 | 569 | 12.5 |
| M2D4 | 470 | 615 | 2.95 | 478 | 592 | 8.25 |
| M3D1 | 471 | 417 | 0.95 | 479 | 358 | 6.65 |
| M3D2 | 472 | 438 | 1.40 | 480 | 420 | 13.8 |
| M3D3 | 473 | 433 | 2.15 | 481 | 516 | 13.9 |
| M3D4 | 474 | 485 | 2.22 | 482 | 447 | 7.25 |
| | N234/Hilsil 233/30/20/0 RSS1 | | | STERLING 6740/Hilsil 233/30/20/0 RSS1 | | |
| M2 | | 909 | | | 909 | |
| M3 | | 590 | | | 590 | |
| M2D1 | 483 | 394 | 4.37 | 491 | 430 | 3.77 |
| M2D2 | 484 | 507 | 5.66 | 492 | 488 | 4.39 |
| M2D3 | 485 | 526 | 4.7 | 493 | 517 | 5.37 |
| M2D4 | 486 | 568 | 5.94 | 494 | 563 | 4.66 |
| M3D1 | 487 | 377 | 8.39 | 495 | 375 | 3.5 |
| M3D2 | 488 | 363 | 4.49 | 496 | 380 | 2.73 |
| M3D3 | 489 | 376 | 5.07 | 497 | 419 | 2.72 |
| M3D4 | 490 | 432 | 5.26 | 498 | 448 | 3.29 |

The excellent carbon black dispersion in the masterbatches of invention samples 33-38 is demonstrated by comparison of the macro-dispersion quality and $MW_{sol}$ values shown in Tables 39-41. The invention samples nos. 33-34 made with ECOBLACK® silicon-treated carbon black, and the corresponding control samples are compared in the semi-log plot of FIG. 30. Excellent carbon black dispersion is seen in FIG. 30 for the invention samples, representing preferred embodiments of elastomer composites in accordance with the present disclosure. The invention samples advantageously are below line 301 in FIG. 30, whereas all of the control samples have poorer dispersion, being above line 301. In fact, the preferred embodiments shown in FIG. 30 fall below a D(%) value of 0.2% even at an $MW_{sol}$ value advantageously exceeding $0.4 \times 10^6$. The data shown in FIG. 30 clearly reveals that the macro-dispersion quality of the novel elastomer composites, disclosed here, comprising silicon-treated carbon black is significantly superior to that achievable using comparable ingredients in prior dry mixing methods. The macro-dispersion values for the elastomer composites of the invention shown in FIG. 30 are described by the following equations:

$$D(\%) < 1.0\% \quad (25)$$

when $MW_{sol}$ is less than $0.4 \times 10^6$; and $$\log(D) < \log(1.0) + 2.0 \times [MW_{sol} - (0.4 \times 10^6)] \times 10^{-6} \quad (26)$$

when $0.4 \times 10^6 < MW_{sol} < 1.1 \times 10^6$

It will be recognized that D(%) is the percent undispersed area measured for defects greater than 10 microns and 1% is the threshold macro-dispersion quality for the masterbatches in accordance with these preferred embodiments of the present invention. That is, none of the dry masticated masterbatches achieved macro-dispersion quality of 1.0% or better at any $MW_{sol}$, even after dry mixing sufficiently to degrade $MW_{sol}$ below $0.4 \times 10^6$. The preferred embodiments shown in FIG. 30 fall well below the threshold. It can be seen that the elastomer composites of the invention comprising silicon-treated carbon black provide heretofore unachieved balance between macro-dispersion quality and $MW_{sol}$.

Invention samples nos. 35-38 comprising carbon black blended with silica filler and corresponding control samples are compared in the semi-log plot of FIG. 31. Specifically, FIG. 31 shows the macro-dispersion values and $MW_{sol}$ values of the invention samples nos. 35-38 and corresponding control samples nos. 467-498. Excellent carbon black dispersion is seen in FIG. 31 for the invention samples, representing preferred embodiment of elastomer composites in accordance with the present disclosure. The invention samples advantageously are below line 311 in FIG. 31, whereas all of the control samples have poorer dispersion, being above line 311. In fact, all of the preferred embodiments shown in FIG. 31 fall below a D(%) value of 0.4%. The data shown in FIG. 31 clearly reveals that the macro-dispersion quality of the novel elastomer composites, disclosed here, comprising carbon black/silica blends over a range of $MW_{sol}$ values, is significantly superior to that achievable using comparable ingredients in prior dry mastication mixing methods. The macro-dispersion values for the elastomer composites of the invention shown in FIG. 31 are described by the following equations:

$$D(\%) < 0.8\% \quad (27)$$

when $MW_{sol}$ is less than $0.5 \times 10^6$; and $$\log(D) < \log(0.8) + 2.2 \times [MW_{sol} - (0.5 \times 10^6)] \times 10^{-6} \quad (28)$$

when $0.5 \times 10^6 < MW_{sol} < 1.1 \times 10^6$

It will be recognized that D(%) is the percent undispersed area measured for defects greater than 10 microns and 0.8% is the threshold macro-dispersion quality for masterbatches in accordance with these preferred embodiments of the present invention. That is, none of the dry masticated masterbatches achieved macro-dispersion quality of 0.8% or better at any $MW_{sol}$, even after dry mixing sufficiently to degrade $MW_{sol}$ below $0.4 \times 10^6$. The preferred embodiments shown in FIG. 31 fall well below the threshold macro-dispersion value of 0.8%, and even below 0.4%. It can be seen that the elastomer composites of the invention comprising carbon black/silica blend filler provide heretofore unachieved balance between macro-dispersion quality and $MW_{sol}$.

In view of the foregoing disclosure, it will be apparent to those skilled in the art that various additions, modifications, etc. can be made without departing from the true scope and spirit of the invention. All such additions and modifications are intended to be covered by the following claims.

We claim:

1. A method of producing elastomer composite, comprising:
feeding a continuous flow of first fluid comprising elastomer latex to a mixing zone of a coagulum reactor defining an elongate coagulum zone extending from the mixing zone to a discharge end;
feeding as a continuous jet a continuous flow of second fluid comprising particulate filler under pressure to the mixing zone of the coagulum reactor to form a mixture with the elastomer latex, the mixture passing as a continuous flow to the discharge end and the particulate filler being effective to coagulate the elastomer latex, wherein feeding of the second fluid against the first fluid within the mixing zone is sufficiently energetic to substantially completely coagulate the elastomer latex with the particulate filler prior to the discharge end; and
discharging a substantially continuous flow of elastomer composite from the discharge end of the coagulum reactor.

2. The method of claim 1 wherein the elastomer latex comprises SBR.

3. The method of claim 1 wherein the elastomer latex has a glass transition temperature (Tg) as measured by differential scanning calorimetry (DSC) from −120 degree C. to 0 degree C.

4. The method of claim 1 wherein the elastomer latex is selected from the group consisting of copolymers of styrene and butadiene, polymers and copolymers of conjugated dienes, and copolymers of conjugated dienes with an ethylenic group-containing monomer copolymerizable therewith.

5. The method of claim 4 in which the polymers and copolymers of conjugated dienes are selected from the group consisting of polybutadiene, polyisoprene, and polychloroprene.

6. The method of claim 4 in which the ethylenic group-containing monomer copolymerizable therewith is selected from the group consisting of styrene, methyl styrene, chiorostyrene, acrylonitrile, 2-vinyl-pyridine 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and esters and amides thereof.

7. The method of claim 1 in which the elastomer composite further comprises curing agent.

8. The method of claim 7 wherein curing agent is fed as a continuous flow to the mixing zone of the coagulum reactor simultaneously with the first fluid and the second fluid.

9. The method of claim 1 in which the elastomer composite further comprises coupling agent.

10. The method of claim 9 wherein the coupling agent is fed as a continuous flow to the mixing zone of the coagulum reactor simultaneously with the first fluid and the second fluid.

11. The method of claim 1 in which the elastomer composite further comprises antidegradent.

12. The method of claim 11 wherein antidegradent is fed as a continuous flow to the mixing zone of the coagulum reactor simultaneously with the first fluid and the second fluid.

13. The method of claim 1 wherein the particulate filler comprises clay.

14. The method of claim 1 wherein the particulate filler comprises glass.

15. The method of claim 1 wherein the particulate filler comprises fibers.

16. The method of claim 15 wherein the fibers have an L/D aspect ratio less than 40.

17. The method of claim 15 wherein the fibers are aramid fibers.

18. The method of claim 15 wherein the fibers are conductive.

19. The method of claim 1 in which the elastomer composite is in the form of pellets.

20. The method of claim 1 in which the elastomer composite further comprises hydrocarbon additive.

21. The method of claim 20 wherein hydrocarbon additive is fed as a continuous flow to the mixing zone of the coagulum reactor simultaneously with the first fluid and the second fluid.

22. The method of claim 1 in which the elastomer composite further comprises non-water miscible additive.

23. The method of claim 22 wherein non-water miscible additive is fed as a continuous flow to the mixing zone of the coagulum reactor simultaneously with the first fluid and the second fluid.

24. An elastomer composite comprising particulate filler dispersed in elastomer, the macro-dispersion D(%) of the particulate filler in the elastomer composite being less than 0.1% undispersed area.

25. The elastomer composite of claim 24 wherein the elastomer comprises SBR.

26. The elastomer composite of claim 24 wherein the elastomer has a glass transition temperature (Tg) as measured by differential scanning calorimetry (DSC) from −120 degree C. to 0 degree C.

27. The elastomer composite of claim 24 wherein the elastomer is selected from the group consisting of copolymers of styrene and butadiene, polymers and copolymers of conjugated dienes, and copolymers of conjugated dienes with an ethylenic group-containing monomer copolymerizable therewith.

28. The elastomer composite of claim 27 in which the polymers and copolymers of conjugated dienes are selected from the group consisting of polybutadiene, polyisoprene, and polychloroprene.

29. The elastomer composite of claim 27 in which the ethylenic group-containing monomer copolymerizable therewith is selected from the group consisting of styrene, methyl styrene, chlorostyrene, acrylonitrile, 2-vinyl-pyridine 5-methyl-2-vinylpyridine, 5-ethyl-2-vmylpyridine, 2-rnethyl-5-vinylpyridine, alkyl-substituted actylates, vinyl ketone, methyl isopropenyl ketone, methyl vinyl either, aiphamethylene carboxylic acids and esters and amides thereof.

30. The elastomer composite of claim 24 further comprising curing agent

31. The elastomer composite of claim 24 further comprising coupling agent.

32. The elastomer composite of claim 24 further comprising antidegradent.

33. The elastomer composite of claim 24 wherein the particulate filler comprises clay.

34. The elastomer composite of claim 24 wherein the particulate filler comprises glass.

35. The elastomer composite of claim 24 wherein the particulate filler comprises fibers.

36. The elastomer composite of claim 35 wherein the fibers have an L/D aspect ratio less than 40.

37. The elastomer composite of claim 35 wherein the fibers are aramid fibers.

38. The elastomer composite of claim 35 wherein the fibers are conductive.

39. The elastomer composite of claim 24 in the form of pellets.

40. The elastomer composite of claim 24 further comprising hydrocarbon additive.

41. The elastomer composite of claim 24 further comprising non-water miscible additive.

42. An elastomer composite comprising elastomer in which particulate filler has been dispersed by:
    feeding a continuous flow of first fluid comprising SBR to a mixing zone of a coagulum reactor defining an elongate coagulum zone extending from the mixing zone to a discharge end;
    feeding as a continuous jet of second fluid comprising particulate filler under pressure to the mixing zone of the coagulum reactor to form a mixture with the elastomer latex, the mixture passing as a continuous flow to the discharge end, and the particulate filler being effective to coagulate the elastomer latex, wherein feeding of the second fluid against the first fluid within the mixing zone is sufficiently energetic to substantially completely coagulate the SBR with the particulate filler prior to the discharge end; and
    discharging a substantially continuous flow of elastomer composite from the discharge end of the coagulum reactor.

43. The elastomer composite of claim 42 wherein the elastomer has a glass transition temperature (Tg) as measured by differential scanning calorimetry (DSC) from −120 degree C. to 0 degree C.

44. The elastomer composite of claim 42 in which the elastomer composite further comprises curing agent.

45. The elastomer composite of claim 44 wherein curing agent is fed as a continuous flow to the mixing zone of the coagulum reactor simultaneously wit the first fluid and the second fluid.

46. The elastomer composite of claim 42 in which the elastomer composite further comprises coupling agent.

47. The elastomer composite of claim 46 wherein the coupling agent is fed as a continuous flow to the mixing zone of the coagulum reactor simultaneously with the first fluid and the second fluid.

48. The elastomer composite of claim 42 in which the elastomer composite further comprises antidegradent.

49. The elastomer composite of claim 48 wherein antidegradent is fed as a continuous flow to the mixing zone of the coagulum reactor simultaneously with the first fluid and the second fluid.

50. The elastomer composite of claim 42 wherein the particulate filler comprises clay.

51. The elastomer composite of claim 42 wherein the particulate filler comprises glass.

52. The elastomer composite of claim 42 wherein the particulate filler comprises fibers.

53. The elastomer composite of claim 52 wherein the fibers have an LID aspect ratio less than 40.

54. The elastomer composite of claim 52 wherein the fibers are aramid fibers.

55. The elastomer composite of claim 52 wherein the fibers are conductive.

56. The elastomer composite of claim 42 in which the elastomer composite is in the form of pellets.

57. The elastomer composite of claim 42 in which the elastomer composite further comprises hydrocarbon additive.

58. The elastomer composite of claim 57 wherein hydrocarbon additive is fed as a continuous flow to the mixing zone of the coagulum reactor simultaneously with the first fluid and the second fluid.

59. The elastomer composite of claim 42 in which the elastomer composite further comprises non-water miscible additive.

60. The elastomer composite of claim 59 wherein non-water miscible additive is fed as a continuous flow to the mixing zone of the coagulum reactor simultaneously with the first fluid and the second fluid.

61. A method of producing styrene-butadiene rubber composite, comprising:
    feeding a continuous flow of first fluid comprising styrene-butadiene rubber and a liquid carrier to a mixing zone of a coagulum reactor;
    feeding a continuous flow of second fluid comprising particulate filler under pressure to the mixing zone of the coagulum reactor to form a mixture with the styrene-butadiene rubber, the particulate filler being effective to coagulate the styrene-butadiene rubber and the mixing of the first fluid and the second fluid within the mixing zone being sufficiently energetic to substantially completely coagulate the styrene-butadiene rubber with the particulate filler in the coagulum reactor;
    discharging a substantially continuous flow of elastomer composite from the coagulum reactor.

62. The method of claim 61, wherein said liquid carrier is a hydrocarbon solvent.

63. The method of claim 61, wherein said second fluid further comprises a non-aqueous liquid carrier.

64. The method of claim 61, wherein said liquid carrier is a hydrocarbon solvent and said second fluid further comprises a non-aqueous liquid carrier.

65. The method of claim 61, wherein the particulate filler is carbon black.

66. The method of claim 62, wherein the particulate filler is carbon black.

67. The method of claim 63, wherein the particulate filler is carbon black.

68. The method of claim 64, wherein the particulate filler is carbon black.

* * * * *